(12) United States Patent
Walker et al.

(10) Patent No.: US 12,472,461 B2
(45) Date of Patent: Nov. 18, 2025

(54) HIGH SURFACE-AREA CONTACTOR MEDIA FOR IMPROVED GAS-LIQUID CONTACTORS

(71) Applicant: Intrnls, Inc, Wales, WI (US)

(72) Inventors: David A. Walker, Wales, WI (US); Matthew N. Pearlson, Wales, WI (US)

(73) Assignee: Intrls, Inc., Wales, WI (US)

( * ) Notice: Subject to any disclaimer, the term of this patent is extended or adjusted under 35 U.S.C. 154(b) by 0 days.

(21) Appl. No.: 18/986,605

(22) Filed: Dec. 18, 2024

(65) Prior Publication Data
US 2025/0196056 A1 Jun. 19, 2025

Related U.S. Application Data

(60) Provisional application No. 63/611,489, filed on Dec. 18, 2023.

(51) Int. Cl.
*B01D 53/14* (2006.01)

(52) U.S. Cl.
CPC ..... *B01D 53/1493* (2013.01); *B01D 53/1475* (2013.01); *B01D 2257/504* (2013.01); *B01D 2259/124* (2013.01)

(58) Field of Classification Search
CPC ............ B01D 53/1493; B01D 53/1475; B01D 2257/504; B01D 2259/124
USPC ........................................................ 423/220
See application file for complete search history.

(56) References Cited

U.S. PATENT DOCUMENTS

| | | | |
|---|---|---|---|
| 8,119,091 B2 | 2/2012 | Keith et al. | |
| 8,431,100 B2 | 4/2013 | Constantz et al. | |
| 8,852,322 B2 | 10/2014 | Gupta et al. | |
| 8,871,008 B2 | 10/2014 | Henderson et al. | |
| 9,527,747 B2 | 12/2016 | Wright et al. | |
| 9,616,375 B2 | 4/2017 | Wright et al. | |

(Continued)

FOREIGN PATENT DOCUMENTS

| | | |
|---|---|---|
| AU | 2021100294 A4 | 4/2021 |
| CA | 3230360 A1 | 3/2023 |

(Continued)

OTHER PUBLICATIONS

CN-110102244-A English translation (Year: 2019).*

(Continued)

*Primary Examiner* — Anita Nassiri-Motlagh
(74) *Attorney, Agent, or Firm* — Quarles & Brady LLP

(57) ABSTRACT

A contactor media includes continuous surface segments, wherein a first continuous surface segment has at least 50% of its surface area follow at least one of: (a) a contour of a first zero-thickness surface having a Gaussian curvature ("$G_c$") of $-400 \text{ mm}^{-2} \leq G_c < -0.01 \text{ mm}^{-2}$; and (b) a contour of a second zero-thickness surface having at least one principal curvature ($k_t$) of $-20 \text{ mm}^{-1} \leq k_t < -0.1 \text{ mm}^{-1}$; and wherein the first continuous surface segment provides at least: (a) a total liquid hold-up of between about 1 kg/m³ to about 800 kg/m³ or (b) a static liquid hold-up of about 0.1 kg/m³ to about 800 kg/m³.

20 Claims, 37 Drawing Sheets

(56) References Cited

U.S. PATENT DOCUMENTS

| | | |
|---|---|---|
| 9,919,267 B2 | 3/2018 | Tanaka et al. |
| 9,975,100 B2 | 5/2018 | Heidel et al. |
| 10,300,430 B2 | 5/2019 | Nguyen et al. |
| 11,014,043 B2 | 5/2021 | Heidel et al. |
| 11,305,226 B2 | 4/2022 | Nguyen et al. |
| 11,389,765 B2 | 7/2022 | Roy et al. |
| 11,638,907 B2 | 5/2023 | Campbell et al. |
| 11,655,421 B2 | 5/2023 | Heidel et al. |
| 11,801,476 B2 | 10/2023 | Scherpbier et al. |
| 11,885,568 B2 | 1/2024 | Iyer et al. |
| 12,017,179 B1 | 6/2024 | Scherpbier et al. |
| 12,276,459 B2 | 4/2025 | Iyer et al. |
| 2011/0240916 A1 | 10/2011 | Constantz et al. |
| 2017/0036372 A1 | 2/2017 | Sandberg et al. |
| 2018/0272273 A1 | 9/2018 | Aines et al. |
| 2019/0083954 A1 | 3/2019 | Rezaei et al. |
| 2021/0101107 A1 | 4/2021 | Heidel et al. |
| 2021/0284545 A1 | 9/2021 | Heidel et al. |
| 2021/0354106 A1 | 11/2021 | Bhatelia et al. |
| 2021/0363473 A1 | 11/2021 | Knipe et al. |
| 2021/0380475 A1 | 12/2021 | Heidel et al. |
| 2022/0096991 A1 | 3/2022 | Jones et al. |
| 2022/0118424 A1 | 4/2022 | Knipe et al. |
| 2022/0176312 A1 | 6/2022 | Olmstead et al. |
| 2022/0193606 A1 | 6/2022 | Nold et al. |
| 2022/0362707 A1 | 11/2022 | Kemp et al. |
| 2022/0362737 A1 | 11/2022 | Staufcik et al. |
| 2023/0158446 A1 | 5/2023 | Keith et al. |
| 2023/0286858 A1 | 9/2023 | Velay Lizancos et al. |
| 2023/0303445 A1 | 9/2023 | Kumar et al. |
| 2023/0322554 A1 | 10/2023 | McCahill et al. |
| 2023/0390736 A1 | 12/2023 | Bootland et al. |
| 2024/0024850 A1 | 1/2024 | Pang et al. |
| 2024/0075457 A1 | 3/2024 | Lanigan-Atkins et al. |
| 2024/0139705 A1 | 5/2024 | Gupta et al. |

FOREIGN PATENT DOCUMENTS

| | | | |
|---|---|---|---|
| CA | 3237538 A1 | | 5/2023 |
| CA | 3238394 A1 | | 6/2023 |
| CN | 105719336 A | | 6/2016 |
| CN | 110102244 A | * | 8/2019 |
| CN | 113968750 B | | 3/2023 |
| CN | 116177959 A | | 5/2023 |
| CN | 116589246 A | | 8/2023 |
| CN | 117205708 A | | 12/2023 |
| CN | 117282260 A | | 12/2023 |
| CN | 117603569 A | | 2/2024 |
| EP | 2 160 234 B1 | | 3/2017 |
| EP | 3 328 519 A1 | | 6/2018 |
| EP | 4 249 113 A1 | | 9/2023 |
| EP | 4 408 567 A1 | | 8/2024 |
| IN | 202421057533 A | | 8/2024 |
| JP | 2009-154497 A | | 7/2009 |
| JP | 2023-170840 A | | 12/2023 |
| KR | 20240021391 A | | 2/2024 |
| KR | 20240076431 A | | 5/2024 |
| KR | 20240076433 A | | 5/2024 |
| KR | 20240076434 A | | 5/2024 |
| KR | 20240076436 A | | 5/2024 |
| KR | 20240076437 A | | 5/2024 |
| KR | 102689636 B1 | | 7/2024 |
| SA | 516371440 B1 | | 10/2018 |
| TW | 201533009 A | | 9/2015 |
| WO | WO-2020/152488 A1 | | 7/2020 |
| WO | WO-2022/174279 A1 | | 8/2022 |
| WO | WO-2023/039021 A1 | | 3/2023 |
| WO | WO-2023/107578 A1 | | 6/2023 |
| WO | WO-2023/114297 A1 | | 6/2023 |
| WO | WO-2023/205671 A2 | | 10/2023 |
| WO | WO-2024/102480 A1 | | 5/2024 |

OTHER PUBLICATIONS

Al-Shimmery Abouther et al: "30 printed porous contactors for enhanced oil droplet coalescence", Journal of Membrane Science, Elsevier BV, NL, vol. 590, Jul. 19, 2019 (Jul. 19, 2019), XP085775002, ISSN: 0376-7388, DOI: 10.1016/J.MEMSCI.2019.117274 [retrieved on Jul. 19, 2019].

Dutkowski Krzysztof-et al: "Review of the State-of-the-Art Uses of Minimal Surfaces in Heat Transfer", Energies, vol. 15, No. 21, Oct. 27, 2022 (Oct. 27, 2022), pp. 1-25, XP093093619, DOI: 10.3390/en15217994 Retrieved from the Internet: URL:https://www.mdpi.com/1996-1073/15/21 /7994.

Fee Conan: "30-printed porous bed structures", Current Opinion in Chemical Engineering, vol. 18, Nov. 1, 2017 (Nov. 1, 2017), pp. 10-15, XP055801013, Netherlands, ISSN: 2211-3398, DOI: 10.1016/j.coche.2017.07.003.

International Search Report and Written Opinion in PCT/US2024/060869 dated Apr. 8, 2025 (19 pages).

D. Mahmoud et al., Enhancement of heat exchanger performance using additive manufacturing of gyroid lattice structures, The International Journal of Advanced Manufacturing Technology (2023) 126:4021, vol. (0123456789)1 3https://doi.org/10.1007/s00170-023-11362-9.

Dudukovic, N.A., Fong, E.J., Gemeda, H.B. et al. Cellular fluidics. Nature 595, 58? (2021). https://doi.org/10.1038/s41586-021-03603-2.

Nurmiyanto, Awaluddin & Ohashi, Akiyoshi. (2019). Downflow Hanging Sponge (DHS) Reactor for Wastewater Treatment—A Short Review. MATEC Web of Conferences. 280. 05004. 10.1051/matecconf/201928005004.

P. Schonhofer, et al. Purely entropic self-assembly of the bicontinuous la3? gyroid phase in equilibrium hard-pear systems; Interface Focus, 2017, 7(4) 20160161, DOI:10.1098/rsfs.2016.0161.

Ribeiro, et al., Experimental Evaluation of Novel Gas Liquid Contactor Packing Based on Triply Periodic Minimal Surfaces (TPMS), Chemical Engineering Science 301 (2025) 120690;https://www.sciencedirect.com/science/article/pii/S0009250924009904#bib177.

Tyagi, V.K., Ali, M., Tawfik, A. et al. Future perspectives of energy saving down-flow hanging sponge (DHS) technology for wastewater valorization?? review. Rev Environ Sci Biotechnol 20, 389 (2021). https://doi.org/10.1007/s11157-021-09573-1.

Milestone Report, CFD Study of Countercurrent Flow in Triply Periodic Minimal Surfaces with CO2BOL Solvent, prepared by Pacific Northwest National Laboratory, Dec. 2019, 28 pages.

* cited by examiner

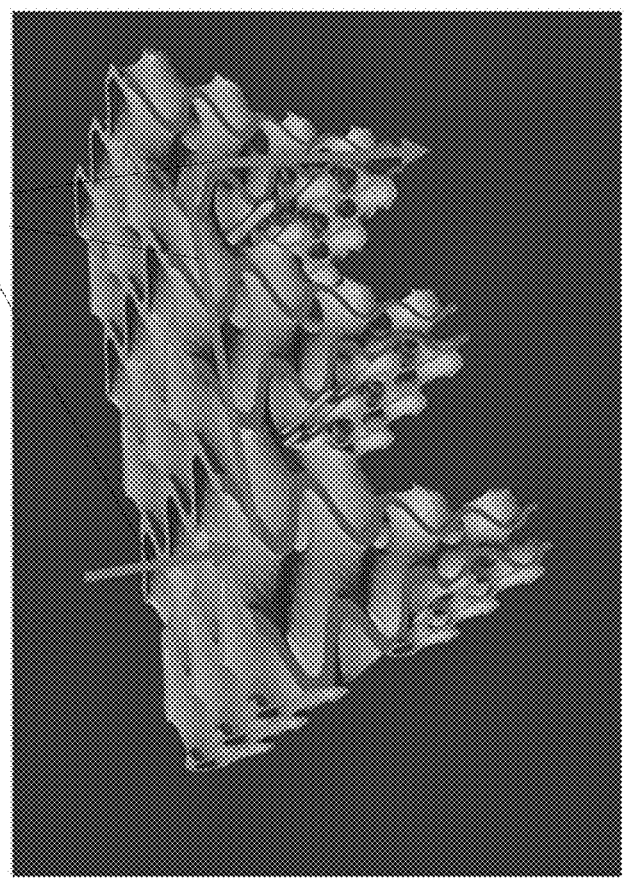
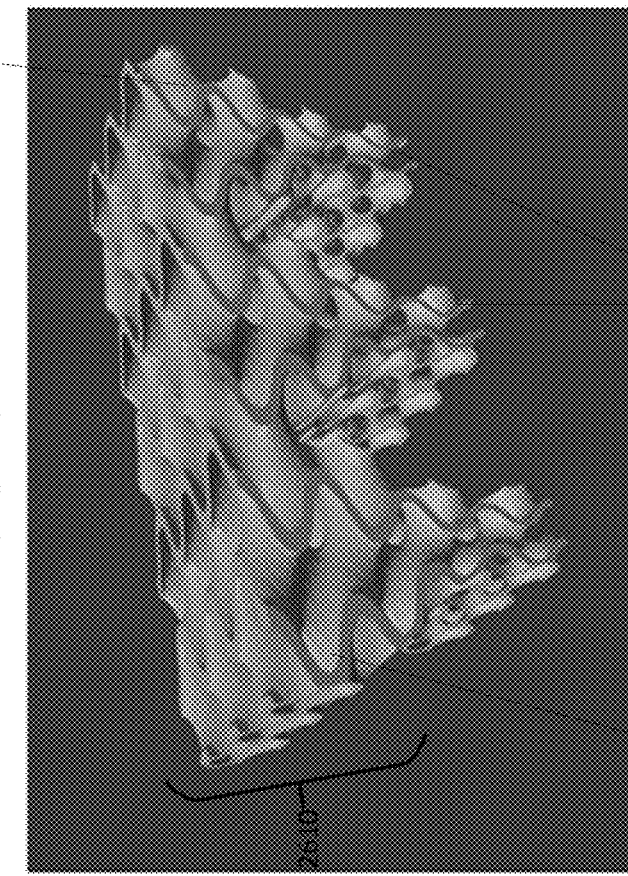
FIG. 26A
FIG. 26B

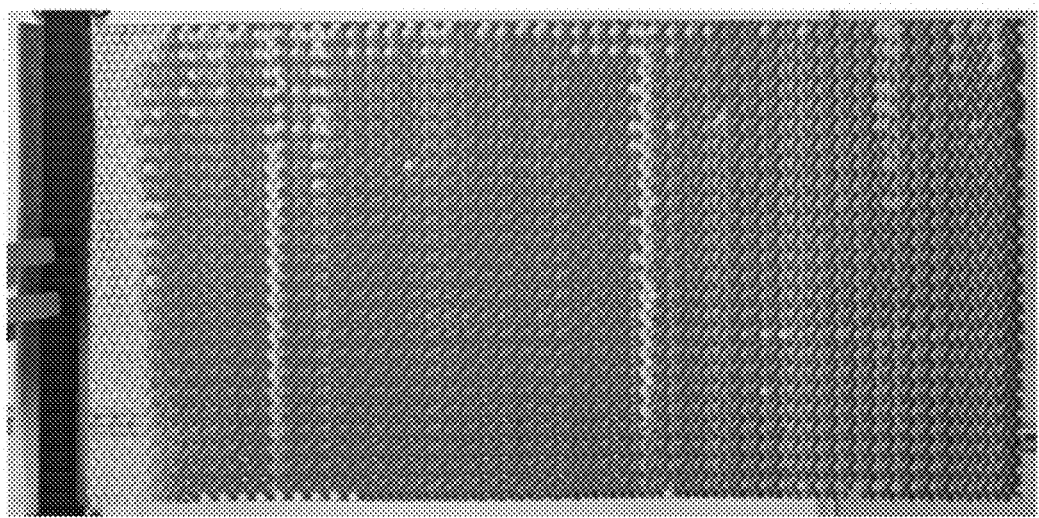
FIG. 31C  t = 1.58 hr
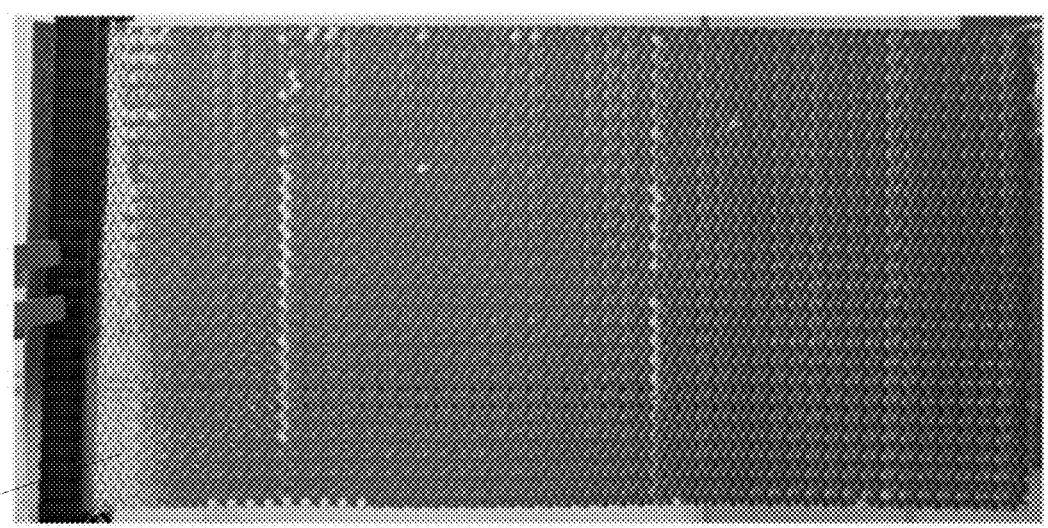
FIG. 31B  t = 0.75 hr
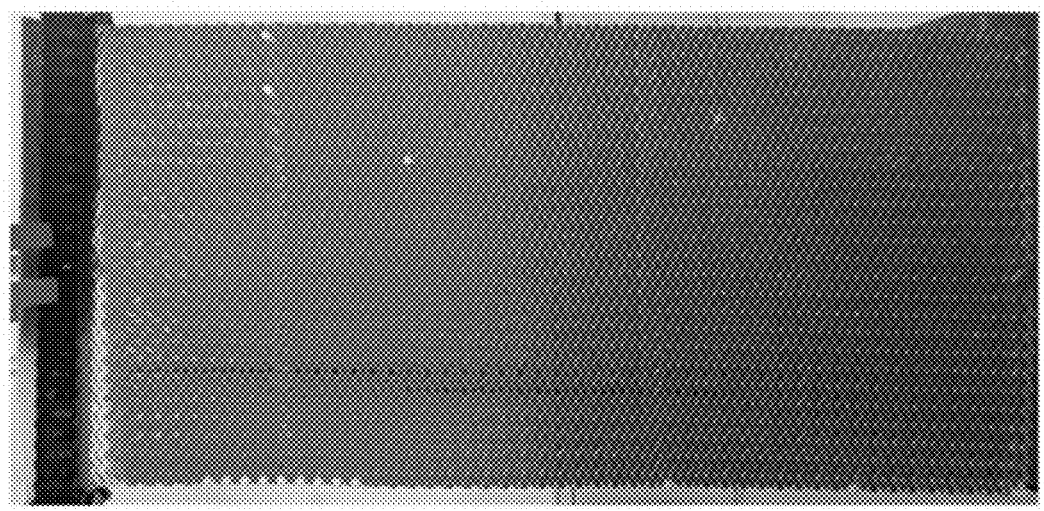
FIG. 31A  t = 0 min

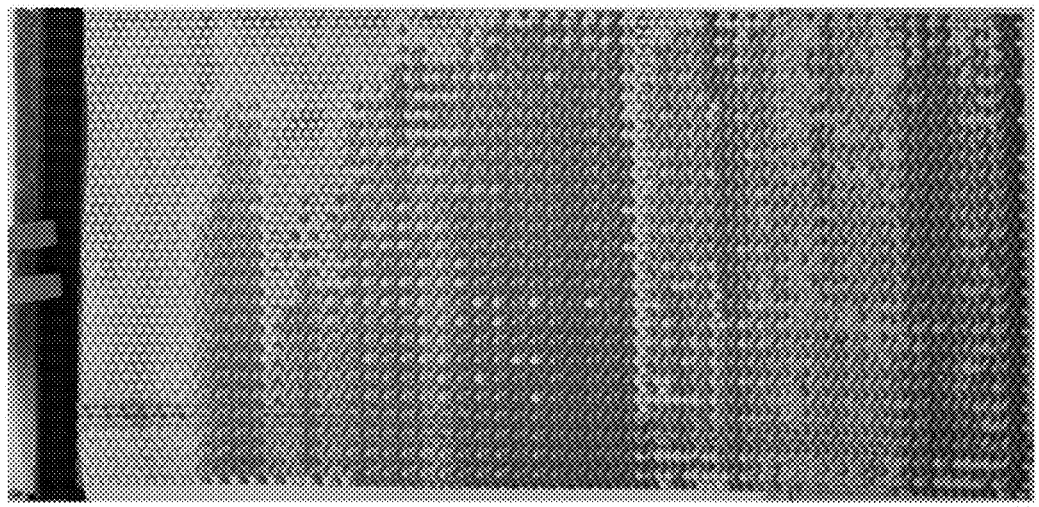
FIG. 31D  t = 2.33 hr
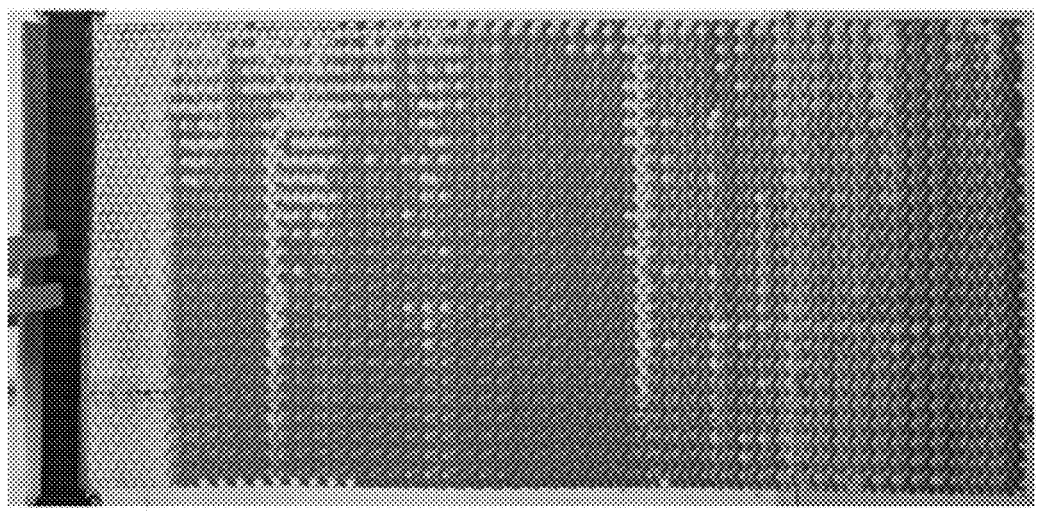
FIG. 31E  t = 3.42 hr

HIGH SURFACE-AREA CONTACTOR MEDIA FOR IMPROVED GAS-LIQUID CONTACTORS

CROSS REFERENCE TO RELATED APPLICATIONS

This application claims the benefit of and priority to U.S. Provisional Application No. 63/611,489 filed Dec. 18, 2023, the content contents of which is incorporated herein by reference in its entirety.

FIELD

The present technology is generally related to fluid contactors and contactor media for gas-liquid contactors, and more specifically is related to phase-phase contactors (e.g., gas-liquid contactors and liquid-liquid contactors).

BACKGROUND

Gas-liquid contactors are utilized in industrial processes to help facilitate mass exchange between gas and liquid phases. Sometimes, gas-liquid contactors are as rudimentary as simple evaporative processes (e.g., a 'swamp cooler' in which water evaporates into the air); but the same technologies can be leveraged for more complex processes (e.g., carbon dioxide scrubbing and capture).

SUMMARY

There may exist a desire to increase phase-phase (e.g., gas-liquid or liquid-liquid) contact surface area of a contactor media while also using a geometry that decreases operational costs. In this context, operating costs may be driven by the electricity needed to operate fans and pumps that induce motion in the different phases, respectively. For example, fans may move the gas phase through the densely packed media, while pumps may recirculate the liquid phase to the top of the packed media stack to continually wet the media surface, where the liquid phase trickles down through the media due to gravity. The selection of appropriate gas-liquid contactor media may seek to increase mass transfer rates while decreasing these costs. As such, the pressure drop of the gas stream moving through the media and hold-up of the liquid stream trickling down through the media are parameters of interest to decrease and increase, respectively. Furthermore, conventional contactor media is typically physically manipulated (e.g., thermoformed into corrugated architectures) in order to assist in wetting of the contactor media by the liquid and usually necessitates higher flow rates of the liquid phase; consequently, these factors typically increase pressure drop of the gas stream moving through the media.

The systems and methods disclosed herein include contactor media with continuous surfaces to structure the liquid phase via surface wetting (e.g., capillary action) which occur in designed regions of curvature. The high surface area of the contactor media, along with appropriate regions of curvature, can hold more liquid, increasing liquid phase hold-up, while also structuring the liquid phase over large spans that increase gas-liquid exchange, as compared to conventional contactor media.

In one aspect, a contactor media is disclosed. The contactor media includes continuous surface segments, wherein a first continuous surface segment has at least 50% of its surface area follow at least one of: (a) a contour of a first zero-thickness surface having a Gaussian curvature ("$G_c$") of $-400$ mm$^{-2} \leq G_c < -0.01$ mm$^{-2}$; and (b) a contour of a second zero-thickness surface having at least one principal curvature ($k_i$) of $-20$ mm$^{-1} \leq k_i < -0.1$ mm$^{-1}$. The first continuous surface segment provides at least: (a) a total liquid hold-up of between about 1 kg/m$^3$ to about 800 kg/m$^3$ or (b) a static liquid hold-up of about 0.1 kg/m$^3$ to about 800 kg/m$^3$.

The first continuous surface segment may have a geometry that is different from that of a second continuous surface segment. At least 80% of the first continuous surface segment may follow the contour of the first zero-thickness surface having the Gaussian curvature of $-100$ mm$^{-2} \leq G_c < 0$ mm$^{-2}$. The first continuous surface segment may have a thickness of about 1 μm to about 100 mm. The contactor medium may further include a second continuous surface segment joined to the first continuous surface segment, wherein the second continuous surface segment has a thickness different from that of the first continuous surface segment. The contactor medium may further include a second continuous surface segment that has at least 50% of its surface area follow at least one of: (a) a contour of a third zero-thickness surface having a Gaussian curvature ("$G_c$") of $-400$ mm$^{-2} \leq G_c < -0.01$ mm$^{-2}$; and (b) a contour of a fourth zero-thickness surface having at least one principal curvature ($k_i$) of $-20$ mm$^{-1} \leq k_i < -0.1$ mm$^{-1}$.

At least some of the continuous surface segments may include a periodic surface geometry. The periodic surface geometry may be a triply periodic surface geometry. The first continuous surface segment may include a sheet gyroid. The first continuous surface segment may form a tube. The contactor medium may include a plurality of the tubes arranged in a hexagonal packing structure. The first continuous surface segment may form a rectangular prism. The contactor medium may include a plurality of the rectangular prisms arranged parallel to one another.

Each continuous surface segment may include a unit cell; and the contactor media may include a plurality of the unit cells arranged in a repeating pattern. The first continuous surface segment may include a first repeating unit cell, a second continuous surface segment may include a second repeating unit cell, and a third continuous surface segment may include a third repeating unit cell. The first continuous surface segment and the third continuous surface segment may be disposed directly on opposite sides of the second continuous surface segment, forming an I-beam shape.

The contactor media may further include a $CO_2$ capture liquid. The $CO_2$ capture liquid may include MEA (monoethanolamine), DEA (diethanolamine), TEA (triethanolamine), MDEA (methyl diethanolamine), piperazine, glycine, $KVO_3$ (potassium metavanadate), KOH (potassium hydroxide), NaOH (sodium hydroxide), LiOH (lithium hydroxide), $Ca(OH)_2$ (calcium hydroxide), an amino acid, or a combination of any two or more thereof. The contactor media may include $CO_2$ capture liquid flow in a first direction and gas flow in a second direction, the second direction being cross-flow, counter-flow, or concurrent flow to the first direction. The first continuous surface segment may include a surface with surface features of about 1 μm to about 500 μm.

In another aspect, a contactor media is disclosed. The contactor media includes a gyroidal continuous surface segment forming a channel with a bilobed-shaped cross-section; wherein the gyroidal continuous surface segment has at least 50% of its surface area follow at least one of: (a) a contour of a first zero-thickness surface having a Gaussian curvature ("$G_c$") of $-400$ mm$^{-2} \leq G_c < -0.01$ mm$^{-2}$; and (b) a contour of a second zero-thickness surface having at least one principal curvature ($k_i$) of $-20$ mm$^{-1} \leq k_i \leq -0.1$ mm$^{-1}$; and wherein the gyroidal continuous surface segment provides at least: (a) a total liquid hold-up of between about 1 kg/m$^3$ to about 800 kg/m$^3$ or (b) a static liquid hold-up of about 0.1 kg/m$^3$ to about 800 kg/m$^3$.

BRIEF DESCRIPTION OF THE DRAWINGS

FIG. 26A is an illustration of a contactor media distribution inlet configured to direct second phase laterally through the distributor layer.

FIG. 26B is an illustration of the contactor media distribution inlet in FIG. 26A showing the potential for lateral second phase flow directions.

FIG. 31A is a photograph of a gyroidal contactor media comprising a continuous surface that provides liquid hold-up through surface wetting at saturation with the liquid. Areas of static liquid hold-up are indicated in blue (alternatively identified by darker grey shading) due to the blue dye in the liquid included for visualization.

FIG. 31B is a photograph of the gyroidal contactor media of FIG. 31A retaining liquid 45 minutes after saturation.

FIG. 31C is a photograph of the gyroidal contactor media of FIG. 31A retaining liquid 95 minutes after saturation demonstrating the contactor media has a static liquid hold-up in excess of 75% of the total liquid hold-up at times greater than 60 minutes following saturation.

FIG. 31D is a photograph of the gyroidal contactor media of FIG. 31A 135 minutes after saturation.

FIG. 31E is a photograph of the gyroidal contactor media of FIG. 31A retaining liquid 205 minutes after saturation.

DETAILED DESCRIPTION

Figure 1:
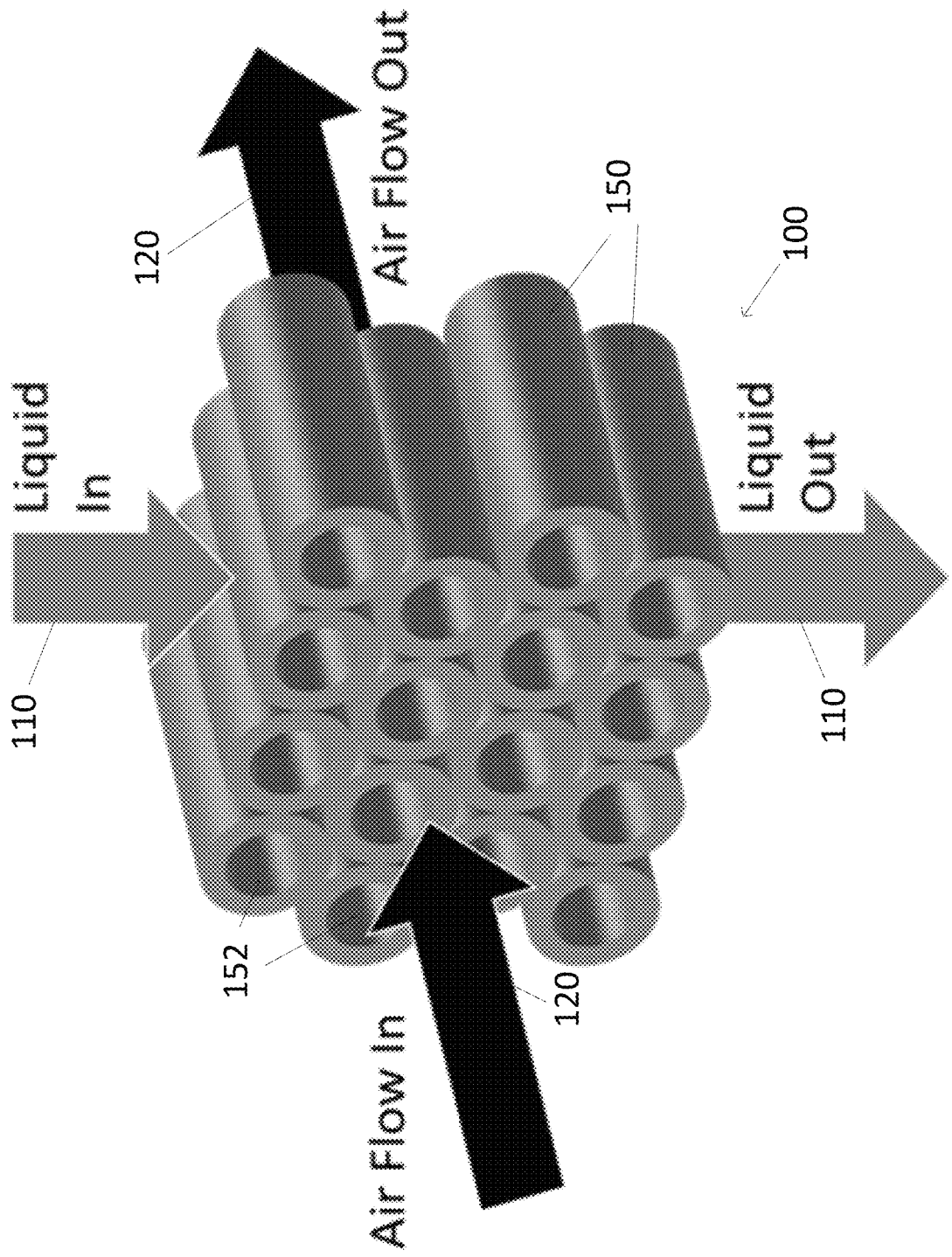
FIG. 1 is an illustration of a first phase (e.g., a gas) flow and a second phase (e.g., a liquid) flow through an array of tube-shaped contactor media comprising a continuous surface that provides second phase hold-up through surface wetting.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Definitions

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "active surface area" as used herein refers to areas of the contactor media where surface wetting (e.g., capillary action) and/or static liquid hold-up may occur or is favored due to the local Gaussian curvature or due to a principal curvature of the domain of the contactor media.

The term "contactor media" (also referred to herein as "contact media") as used herein refers to objects configured to facilitate phase-phase interactions. The phase-phase interaction may include an interaction of a gas phase and a liquid phase, a first gas phase and a second gas phase, a first liquid phase and a second liquid phase, a first gas phase and a second gas phase, or a combination of any two or more thereof. For example, contactor media may include structures that provide flow through of a first phase and hold-up of a second phase to facilitate phase-phase interactions. For example, contactor media may include structures that provide liquid hold-up to facilitate gas-liquid interactions. For example, contactor media may include sponges, geometric structures, other porous structures, or a combination of any two or more thereof.

The term "phase-phase contact area" as used herein refers to the area of phase-phase interaction. The phase-phase interaction may include an interaction of a gas phase and a liquid phase, a first gas phase and a second gas phase, a first liquid phase and a second liquid phase, or a combination of any two or more thereof. The phase-phase contact area may be determined by the geometry of the contactor media. For example, phase-phase contact area may include pores, cavities, voids, caverns, concave geometry, structures with negative Gaussian curvature, or a combination of any two or more thereof.

The term "gas-liquid contact area" as used herein refers to the area of gas-liquid interaction. The gas-liquid contact area may be determined by the geometry of the contactor media. For example, gas-liquid contact area may include pores, cavities, voids, caverns, concave geometry, structures with negative Gaussian curvature, or a combination of any two or more thereof.

The term "axial" as used herein refers to a parallel direction or vector with respect to a plane of an object, or the plane of a phase (e.g., a liquid or a gas). For example, the object may include the contactor media.

The term "radial" as used herein refers to a perpendicular direction or vector with respect to a plane of an object, or the plane of a phase (e.g., a liquid or a gas). For example, the object may include the contactor media.

The term "continuous surface" as used herein refers to an uninterrupted three-dimensional object that possesses a predetermined thickness, where an approximate midpoint of the predetermined thickness follows the contour of a zero-thickness two-dimensional surface. The zero-thickness surface serves as the underlying structure or shape that the continuous surface conforms to. While the surface is continuous, it does not have to be uniformly thick or consistently angled. For example, the continuous surface may include surface features (e.g., texture) or be embossed, which may provide nonuniform thickness or include angle changes, respectively. As another example, the continuous surface may have a gradient change in thickness across its extent.

The term "zero-thickness surface" as used herein refers to the two-dimensional surface located at the center of the continuous surface's thickness. The zero-thickness surface serves as the midpoint between the outer boundaries of the continuous surface's thickness, effectively dividing it into two equal volumes. The zero-thickness surface does not have a thickness. The zero-thickness surface is a conceptual plane that marks the central reference point of the continuous surface's thickness, providing a basis for understanding the geometry of the continuous surface. For example, the zero-thickness surface can be two-dimensional surface at the center of the thickness of the three-dimensional sheet gyroid.

The term "Gaussian curvature" ($G_c$) as used herein refers to a product of two principal curvatures, $K_1$ and $K_2$, defined at a given point on a two-dimensional surface as $G_c=K_1 \cdot K_2$. The Gaussian curvature has units of length$^{-2}$.

The term "mean curvature" (H) as used herein refers to the mean of two principal curvatures, $K_1$ and $K_2$, defined at a given point on a two-dimensional surface as $H=(K_1+K_2)/2$. The mean curvature has units of length$^{-1}$.

The term "principal curvature" as used herein refers to two values, a first value, $K_1$, for the maximum curvature and a second value, $K_2$, for the minimum curvature of a two-dimensional surface region. The principal curvature values are defined as $K_1=1/r1$ and $K_2=1/r_2$, where $r_1$ and $r_2$ are the radii of curvature for the plane of maximal and minimal curvature, respectively. The principal curvature has units of length-1.

The term "negative principal curvature" as used herein refers generally to a concave domain. For example, all points on the inner surface of a cylindrical pipe has at least one negative principal curvature, as this is a concave domain from the viewpoint of the observer.

The term "follow" as used herein means to follow the same overall trend or path as the defined curve or zero-thickness surface, even if the trend or path includes sharp angles, smooth bends, or combinations thereof. For example, follow may mean approximating the trend or path in which a series of flat and/or angled surfaces are utilized to approximate a smooth curvature. For example, follow may include representing complex curvatures with a large number of flat triangular surfaces (e.g., using a CAD (computer assisted design) process). For example, follow may include approximating the overall trend or path of a defined smooth three-dimensional curve with 3D printing processes which produce three dimensional pixels (voxels), and may include flat and/or jagged edges (e.g., having surface features of about 50 μm in size) which approximate the smooth three dimensional curve on the millimeter length scale.

The term "total liquid hold-up" as used herein refers to the sum of the static liquid hold-up and the dynamic liquid hold-up in units of mass per volume (e.g., kg/m$^3$). The total liquid hold-up is dependent upon the liquid viscosity, the surface tension of adhesion (which is dependent on the material chosen for the contactor media and the gas flowing through the contactor media) the geometry of the contactor media, the fluid flow and material being pushed into the system, and the gas flow and material being pushed into the system. The term "static liquid hold-up" as used herein refers to the amount of liquid measured in the contactor media, with no liquid or gas being actively being pushed into the system, measured in units of mass per volume (e.g., kg/m$^3$). The static liquid hold-up can be measured at any point in time after the liquid ceases being pushed into the contactor media. The static liquid hold-up is dependent on factors including the liquid properties (e.g., viscosity, surface tension, density, and three-phase contact angle) the surface tension of adhesion (which is dependent on the material chosen for the contactor media, surface treatment of the contactor media, and the gas flowing through the contactor media) and the geometry of the contactor media. For example, the static liquid hold-up may be measured by taking a dry contactor media of a known weight and volume, (1) fully immersing the contactor media in a container of liquid until wetted to saturation, (2) removing the contactor media from the container of liquid and allowing the contactor media to drain for a period of time (e.g., 5 minutes, 45 minutes, 60 minutes, 90 minutes, 120 minutes, 140 minutes, or 200 minutes) at a predetermined temperature and relative humidity (e.g., 20° C. to 25° C. and 100% relative humidity to decrease the effects of evaporation on the measurement), and then (3) measuring the weight of the contactor media, where the static liquid hold-up is the amount of liquid remaining in the contactor media measured by subtracting the weight of the dry contactor media from the weight of the wet contactor media measured in step (3).

The term "dynamic liquid hold-up" as used herein refers to the amount of liquid measured in the contactor media with liquid actively being pushed into the system, and air flow being applied to the contactor media, measured in units of mass per volume (e.g., kg/m$^3$). The dynamic liquid hold-up is dependent upon the geometry of the contactor media, the fluid flow and material being pushed into the system, and the gas flow and material being pushed into the system.

Contactor Media

Disclosed herein are phase-phase (e.g., gas-liquid, liquid-liquid, gas-gas) contactor media with continuous surfaces to structure the phase-phase via surface wetting (e.g., capillary action). The contactor media may provide flow through of a first phase with a substantially lower or similar pressure drop as compared to conventional contactor media. Concurrently, the high surface area surfaces of the contactor media can hold more of a second phase, increasing second phase hold-up, while also structuring the second phase over large spans that increase phase-phase exchange, as compared to conventional contactor media. The contactor media may control second phase flow by using surface wetting to retain the second phase in the contactor media balanced against the force of gravity to pull the second phase down through the contactor media. As described herein, the first phase may be a phase that may flow through the contactor media, and the second phase may be a phase that is configured to capture the first-phase component from the first phase.

The contactor media may have increased active surface area for surface wetting (e.g., capillary action) and/or static liquid hold-up relative to inactive surface area, as compared to conventional contactor media. 'Inactive' surface areas are substantially unable to hold liquid, generally contributing substantially nothing to mass transport. For example, media with a higher total surface area, where a greater percentage of the total surface area is inactive, may provide less efficient mass transport than media with lower total surface area where a greater percentage of the total surface area is active surface area. The contactor media disclosed herein may, by having a greater percentage of active surface area, have a higher probability of capturing and holding a droplet of fluid within the contactor media to facilitate mass transport.

The first phase may include a component and the second phase may be a phase that is configured to capture the component from the first phase. The component may be mass (where the contactor facilitates mass transfer) or may be heat transfer (where the contactor facilitates heat transfer). Nonlimiting examples of the mass transfer components include $CO_2$, $NH_3$, $H_2$, $O_2$, $CH_4$, $SO_2$, $NO_2$, $O_3$, $CO$, $CH_3SH$, $NO_x$, $SO_x$, or a combination of any two or more thereof. In the case of heat transfer, the transfer may occur via actual transfer of thermal energy between the two phases, or by the evaporation of one phase (e.g., water evaporating). Unless otherwise specified, reference to gas-liquid contactor media may similarly apply to liquid-liquid contactor media and gas-gas contactor media.

The contactor media may be used as a gas-liquid contactor media. For example, the contactor media may be used for $CO_2$ capture or scrubbing applications. For example, the contactor media may be used for point source capture to reduce $CO_2$ emissions from flue gas from industrial facilities. As another example, the contactor media may be used in direct air capture (DAC) technologies to remove $CO_2$ from ambient air. In another example, the contractor media may be used in the scrubbing of $CO_2$, or other gasses, from a natural gas stream as means of purifying the stream.

For example, the contactor media may include one or multiple continuous surface segments. The continuous surface segments may be joined to form a larger continuous surface segment (e.g., seamless joined during manufacturing or joined together with adhesive following manufacturing). The continuous surface segments may be disposed on one another to form an array of continuous surface segments. The continuous surface segments may include network of flow paths, a network of flow directing structures, or a combination of these; such networks can define a regular or periodic geometry. The material of the continuous surface segments and the geometry of the continuous surface segments may increase (e.g., maximize) a Gibbs free energy of adhesion of the liquid phase to the continuous surface segments.

The contactor media may also include surface segments arranged in an array, where each surface segment is a separate continuous surface segment. The segments may be arranged directly disposed on one another or with spacing between segments. The segments may be arranged with even spacing between segments, or with uneven spacing. Spacing between two segments may be even across the space or may be different across the space (e.g., increasing gradient, sine-wave shaped). Spacing may be about 1 mm to about 100 mm (e.g., about 1 mm to about 90 mm, about 1 mm to about 80 mm, about 1 mm to about 70 mm, about 1 mm to about 60 mm, about 1 mm to about 50 mm, about 1 mm to about 40 mm, about 1 mm to about 30 mm, about 1 mm to about 20 mm, or about 1 mm to about 10 mm). For example, the segments may be arranged radially around a central object (e.g., a fan), as shown in FIG. 16B.

In an aspect, a contactor media includes continuous surface segments that provides liquid hold-up through surface wetting. A first continuous surface segment may have at least 50% of its surface area follow at least one of: (a) a contour of a first zero-thickness surface having a Gaussian curvature ("$G_c$") of $-400$ mm$^{-2} \leq G_c < -0.01$ mm$^{-2}$; and (b) a contour of a second zero-thickness surface having at least one principal curvature ($k_t$) of $-20$ mm$^{-1} \leq k_t < -0.1$ mm$^{-1}$. Continuous surface segments are real, three-dimensional structures that may follow the contour of a theoretical two-dimensional mathematical surface. As non-limiting examples, these two-dimensional mathematical surfaces may include various types of 'minimal surfaces' which are defined by being a surface where at all points the mean curvature is zero.

The first continuous surface segment may have a portion of its surface area follow a contour of a first zero-thickness surface having a Gaussian curvature, $G_c$, of $-400$ mm$^{-2} \leq G_c < -0.0001$ mm$^{-2}$. For example, the portion of the surface may be at least 20%, at least 30%, at least 40%, at least 50%, at least 60%, at least 70%, at least 80%, or at least 90% of the continuous surface segment surface area. For example, the first zero-thickness surface may have a $G_c$ of $-400$ mm$^{-2} \leq G_c < -0.0001$ mm$^{-2}$, $-200$ mm$^{-2} \leq G_c < -0.0001$ mm$^{-2}$, $-100$ mm$^{-2} \leq G_c < -0.0001$ mm$^{-2}$, $-50$ mm$^{-2} \leq G_c < -0.0001$ mm$^{-2}$, $-25$ mm$^{-2} \leq G_c < -0.0001$ mm$^{-2}$, $-10$ mm$^{-2} \leq G_c < -0.0001$ mm$^{-2}$, $-4$ mm$^{-2} \leq G_c < -0.0001$ mm$^{-2}$, $-1$ mm$^{-2} \leq G_c < -0.0001$ mm$^{-2}$, $-0.25$ mm$^{-2} \leq G_c < -0.0001$ mm$^{-2}$, $-0.04$ mm$^{-2} \leq G_c < -0.0001$ mm$^{-2}$, $-0.01$ mm$^{-2} \leq G_c < -0.0001$ mm$^{-2}$, $-400$ mm$^{-2} \leq G_c < -0.004$ mm$^{-2}$, $-200$ mm$^{-2} \leq G_c < -0.004$ mm$^{-2}$, $-100$ mm$^{-2} \leq G_c < -0.004$ mm$^{-2}$, $-50$ mm$^{-2} \leq G_c < -0.004$ mm$^{-2}$, $-25$ mm$^{-2} \leq G_c < -0.004$ mm$^{-2}$, $-10$ mm$^{-2} \leq G_c < -0.004$ mm$^{-2}$, $-4$ mm$^{-2} < G_c < -0.004$ mm$^{-2}$, $-1$ mm$^{-2} \leq G_c < -0.004$ mm$^{-2}$, $-0.25$ mm$^{-2} \leq G_c < -0.004$ mm$^{-2}$, $-0.04$ mm$^{-2} \leq G_c < -0.004$ mm$^{-2}$, $-0.01$ mm$^{-2} \leq G_c < -0.004$ mm$^{-2}$, $-400$ mm$^{-2} \leq G_c < -0.01$ mm$^{-2}$, $-200$ mm$^{-2} \leq G_c < -0.01$ mm$^{-2}$, $-50$ mm$^2 \leq G_c < -0.01$ mm$^{-2}$, $-25$ mm$^{-2} \leq G_c < -0.01$ mm$^2$, $-10$ mm$^2 \leq G_c < -0.01$ mm$^{-2}$, $-4$ mm$^{-2} \leq G_c < -0.01$ mm$^{-2}$, $-1$ mm$^{-2} \leq G_c < -0.01$ mm$^{-2}$, $-0.25$ mm$^{-2} \leq G_c < -0.01$ mm$^{-2}$, $-0.04$ mm$^{-2} \leq G_c < -0.01$ mm$^{-2}$, $-400$ mm$^{-2} \leq G_c < -0.04$ mm$^{-2}$, $-200$ mm$^{-2} \leq G_c < -0.04$ mm$^{-2}$, $-50$ mm$^{-2} \leq G_c < -0.04$ mm$^{-2}$, $-25$ mm$^{-2} \leq G_c < -0.04$ mm$^{-2}$, $-10$ mm$^{-2} \leq G_c < -0.04$ mm$^{-2}$, $-4$ mm$^{-2} \leq G_c < -0.04$ mm$^{-2}$, $-1$ mm$^{-2} \leq G_c < -0.04$ mm$^{-2}$, $-0.25$ mm$^{-2} \leq G_c < -0.04$ mm$^{-2}$, $-400$ mm$^{-2} \leq G_c < -0.25$ mm$^{-2}$, $-200$ mm$^{-2} \leq G_c < -0.25$ mm$^{-2}$, $-50$ mm$^{-2} \leq G_c < -0.25$ mm$^{-2}$, $-25$ mm$^{-2} \leq G_c < -0.25$ mm$^{-2}$, $-10$ mm$^{-2} \leq G_c < -0.25$ mm$^{-2}$, $-4$ mm$^{-2} \leq G_c < -0.25$ mm$^{-2}$, $-1$ mm$^{-2} \leq G_c < -0.25$ mm$^{-2}$, $-400$ mm$^{-2} \leq G_c < -1$ mm$^{-2}$, $-200$ mm$^{-2} \leq G_c < -1$ mm$^{-2}$, $-50$ mm$^{-2} \leq G_c < -1$ mm$^{-2}$, $-25$ m$^{-2} \leq G_c < -1$ mm$^{-2}$, $-10$ mm$^{-2} \leq G_c < -1$ mm$^{-2}$, or $-4$ mm$^{-2} \leq G_c < -1$ mm$^{-2}$. For example, at least 80% of the first continuous surface segment may follow the contour of the first zero-thickness surface having the Gaussian curvature of $-100$ mm$^{-2} \leq G_c < 0$ mm$^{-2}$.

The first continuous surface segment may have a portion of its surface area follow a contour of a second zero-thickness surface having at least one of its principal curvatures, $k_t$, of $-40$ mm$^{-1} \leq k_t < -0.002$ mm$^{-1}$. For example, the portion of the surface may be at least 20%, at least 30%, at least 40%, at least 50%, at least 60%, at least 70%, at least 80%, or at least 90% of the continuous surface segment surface area. For example, the second zero-thickness surface may have at least one $k_i$ of $-20$ mm$^{-1} \leq k_i < -0.002$ mm$^{-1}$, $-10$ mm$^{-1} \leq k_i < -0.002$ mm$^{-1}$, $-5$ mm$^{-1} \leq k_i < -0.002$ mm$^{-1}$, $-2$ mm$^{-1} \leq k_i < -0.002$ mm$^{-1}$, $-1$ mm$^{-1} \leq k_i < -0.002$ mm$^{-1}$, $-0.5$ mm$^{-1} \leq k_i < -0.002$ mm$^{-1}$, $-0.2$ mm$^{-1} \leq k_i < -0.002$ mm$^{-1}$, $-40$ mm$^{-1} \leq k_i < -0.01$ mm$^{-1}$, $-20$ mm$^{-1} \leq k_i < -0.01$ mm$^{-1}$, $-10$ mm$^{-1} \leq k_i < -0.01$ mm$^{-1}$, $-5$ mm$^{-1} \leq k_i < -0.01$ mm$^{-1}$, $-2$ mm$^{-1} \leq k_i < -0.01$ mm$^{-1}$, $-1$ mm$^{-1} \leq k_i < -0.01$ mm$^{-1}$, $-0.5$ mm$^{-1} \leq k_i < -0.01$ mm$^{-1}$, $-0.2$ mm$^{-1} \leq k_i < -0.01$ mm$^{-1}$, $-40$ mm$^{-1} \leq k_i < -0.02$ mm$^{-1}$, $-20$ mm$^{-1} \leq k_i < -0.02$ mm$^{-1}$, $-10$ mm$^{-1} \leq k_i < -0.02$ mm$^{-1}$, $-5$ mm$^{-1} \leq k_i < -0.02$ mm$^{-1}$, $-2$ mm$^{-1} \leq k_i < -0.02$ mm$^{-1}$, $-1$ mm$^{-1} \leq k_i < -0.02$ mm$^{-1}$, $-0.5$ mm$^{-1} \leq k_i < -0.02$ mm$^{-1}$, $-0.2$ mm$^{-1} \leq k_i < -0.02$ mm$^{-1}$, $-40$ mm$^{-1} \leq k_i < -0.1$ mm$^{-1}$, $-20$ mm$^{-1} \leq k_i < -0.1$ mm$^{-1}$, $-10$ mm$^{-1} \leq k_i < -0.1$ mm$^{-1}$, $-5$ mm$^{-1} \leq k_i < -0.1$ mm$^{-1}$, $-2$ mm$^{-1} \leq k_i < -0.1$ mm$^{-1}$, $-1$ mm$^{-1} \leq k_i < -0.1$ mm$^{-1}$, $-0.5$ mm$^{-1} \leq k_i < -0.1$ mm$^{-1}$, $-0.2$ mm$^{-1} \leq k_i < -0.1$ mm$^{-1}$, $-40$ mm$^{-1} \leq k_i < -0.2$ mm$^{-1}$, $-20$ mm$^{-1} \leq k_i < -0.2$ mm$^{-1}$, $-10$ mm$^{-1} \leq k_i < -0.2$ mm$^{-1}$, $-5$ mm$^{-1} \leq k_i < -0.2$ mm$^{-1}$, $-2$ mm$^{-1} \leq k_i < -0.2$ mm$^{-1}$, $-1$ mm$^{-1} \leq k_i < -0.2$ mm$^{-1}$, $-0.5$ mm$^{-1} \leq k_i < -0.2$ mm$^{-1}$, $-40$ mm$^{-1} \leq k_i < -0.5$ mm$^{-1}$, $-20$ mm$^{-1} \leq k_i < -0.5$ mm$^{-1}$, $-10$ mm$^{-1} \leq k_i < -0.5$ mm$^{-1}$, $-5$ mm$^{-1} \leq k_i < -0.5$ mm$^{-1}$, $-2$ mm$^{-1} \leq k_i < -0.5$ mm$^{-1}$, $-1$ mm$^{-1} \leq k_i < -0.5$ mm$^{-1}$, $-40$ mm$^{-1} \leq k_i < -1$ mm$^{-1}$, $-20$ mm$^{-1} \leq k_i < -1$ mm$^{-1}$, $-10$ mm$^{-1} \leq k_i < -1$ mm$^{-1}$, $-5$ mm$^{-1} \leq k_i < -1$ mm$^{-1}$, or $-2$ mm$^{-1} \leq k_i < -1$ mm$^{-1}$.

The first continuous surface segment may have a portion of its surface area follow both a first zero-thickness surface having a $G_c$ of $-400$ mm$^{-2} \leq G_c < -0.0001$ mm$^{-2}$ and a second zero-thickness surface having at least one $k_i$ of $-40$ mm$^{-1} \leq k_i < -0.002$. For example, the portion of the surface may be at least 20%, at least 30%, at least 40%, at least 50%, at least 60%, at least 70%, at least 80%, or at least 90% of the continuous surface segment surface area. For example, the first zero-thickness surface may have a $G_c$ of $-400$ mm$^{-2} \leq G_c < -0.0001$ mm$^{-2}$, $-200$ mm$^{-2} \leq G_c < -0.0001$ mm$^{-2}$, $-100$ mm$^{-2} \leq G_c < -0.0001$ mm$^{-2}$, $-50$ mm$^{-2} \leq G_c < -0.0001$ mm$^{-2}$, $-25$ mm$^{-2} \leq G_c < -0.0001$ mm$^{-2}$, $-10$ mm$^{-2} \leq G_c < -0.0001$ mm$^{-2}$, $-4$ mm$^{-2} \leq G_c < -0.0001$ mm$^{-2}$, $-1$ mm$^{-2} \leq G_c < -0.0001$ mm$^{-2}$, $-0.25$ mm$^{-2} \leq G_c < -0.0001$ mm$^{-2}$, $-0.04$ mm$^{-2} \leq G_c < -0.0001$ mm$^{-2}$, $-0.01$ mm$^{-2} \leq G_c < -0.0001$ mm$^{-2}$, $-400$ mm$^{-2} \leq G_c < -0.004$ mm$^{-2}$, $-200$ mm$^{-2} \leq G_c < -0.004$ mm$^{-2}$, $-100$ mm$^{-2} \leq G_c < -0.004$ mm$^{-2}$, $-50$ mm$^{-2} \leq G_c < -0.004$ mm$^{-2}$, $-25$ mm$^{-2} \leq G_c < -0.004$ mm$^{-2}$, $-10$ mm$^{-2} \leq G_c < -0.004$ mm$^{-2}$, $-4$ mm$^{-2} \leq G_c < -0.004$ mm$^{-2}$, $-1$ mm$^{-2} \leq G_c < -0.004$ mm$^{-2}$, $-0.25$ mm$^{-2} \leq G_c < -0.004$ mm$^{-2}$, $-0.04$ mm$^{-2} \leq G_c < -0.004$ mm$^{-2}$, $-0.01$ mm$^{-2} \leq G_c < -0.004$ mm$^{-2}$, $-400$ mm$^{-2} \leq G_c < -0.01$ mm$^{-2}$, $-200$ mm$^{-2} \leq G_c < -0.01$ mm$^{-2}$, $-50$ mm$^{-2} \leq G_c < -0.01$ mm$^{-2}$, $-25$ mm$^{-2} \leq G_c < -0.01$ mm$^{-2}$, $-10$ mm$^{-2} \leq G_c < -0.01$ mm$^{-2}$, $-4$ mm$^{-2} \leq G_c < -0.01$ mm$^{-2}$, $-1$ mm$^{-2} \leq G_c < -0.01$ mm$^{-2}$, $-0.25$ mm$^2 \leq G_c < -0.01$ mm$^{-2}$, $-0.04$ mm$^{-2} \leq G_c < -0.01$ mm$^{-2}$, $-400$ mm$^{-2} \leq G_c < -0.04$ mm$^{-2}$, $-200$ mm$^{-2} \leq G_c < -0.04$ mm$^{-2}$, $-50$ mm$^{-2} \leq G_c < -0.04$ mm$^{-2}$, $-25$ mm$^{-2} \leq G_c < -0.04$ mm$^{-2}$, $-10$ mm$^{-2} \leq G_c < -0.04$ mm$^{-2}$, $-4$ mm$^{-2} \leq G_c < -0.04$ mm$^{-2}$, $-1$ mm$^{-2} \leq G_c < -0.04$ mm$^{-2}$, $-0.25$ mm$^{-2} \leq G_c < -0.04$ mm$^{-2}$, $-400$ mm$^{-2} \leq G_c < -0.25$ mm$^{-2}$, $-200$ mm$^{-2} \leq G_c < -0.25$ mm$^{-2}$, $-50$ mm$^{-2} \leq G_c < -0.25$ mm$^{-2}$, $-25$ mm$^{-2} \leq G_c < -0.25$ mm$^{-2}$, $-10$ mm$^{-2} \leq G_c < -0.25$ mm$^{-2}$, $-4$ mm$^{-2} \leq G_c < -0.25$ mm$^{-2}$, $-1$ mm$^{-2} \leq G_c < -0.25$ mm$^{-2}$, $-400$ mm$^{-2} \leq G_c < -1$ mm$^{-2}$, $-200$ mm$^{-2} \leq G_c < -1$ mm$^{-2}$, $-50$ mm$^{-2} \leq G_c < -1$ mm$^{-2}$, $-25$ m$^{-2} \leq G_c < -1$ mm$^{-2}$, $-10$ mm$^{-2} \leq G_c < -1$ mm$^{-2}$, or $-4$ mm$^{-2} \leq G_c < -1$ mm$^{-2}$. For example, the second zero-thickness surface may have at least one $k_j$ of $-20$ mm$^{-1} \leq k_i < -0.002$ mm$^{-1}$, $-10$ mm$^{-1} \leq k_i < -0.002$ mm$^{-1}$, $-5$ mm$^{-1} \leq k_i < -0.002$ mm$^{-1}$, $-2$ mm$^{-1} \leq k_i < -0.002$ mm$^{-1}$, $-1$ mm$^{-1} \leq k_i < -0.002$ mm$^{-1}$, $-0.5$ mm$^{-1} \leq k_i < -0.002$ mm$^{-1}$, $-0.2$ mm$^{-1} \leq k_i < -0.002$ mm$^{-1}$, $-40$ mm$^{-1} \leq k_i < -0.01$ mm$^{-1}$, $-20$ mm$^{-1} \leq k_i < -0.01$ mm$^{-1}$, $-10$ mm$^{-1} \leq k_i < -0.01$ mm$^{-1}$, $-5$ mm$^{-1} \leq k_i < -0.01$ mm$^{-1}$, $-2$ mm$^{-1} \leq k_i < -0.01$ mm$^{-1}$, $-1$ mm$^{-1} \leq k_i < -0.01$ mm$^{-1}$, $-0.5$ mm$^{-1} \leq k_i < -0.01$ mm$^{-1}$, $-0.2$ mm$^{-1} \leq k_i < -0.01$ mm$^{-1}$, $-40$ mm$^{-1} \leq k_i < -0.02$ mm$^{-1}$, $-20$ mm$^{-1} \leq k_i < -0.02$ mm$^{-1}$, $-10$ mm$^{-1} \leq k_i < -0.02$ mm$^{-1}$, $-5$ mm$^{-1} \leq k_i < -0.02$ mm$^{-1}$, $-2$ mm$^{-1} \leq k_i < -0.02$ mm$^{-1}$, $-1$ mm$^{-1} \leq k_i < -0.02$ mm$^{-1}$, $-0.5$ mm$^{-1} \leq k_i < -0.02$ mm$^{-1}$, $-0.2$ mm$^{-1} \leq k_i < -0.02$ mm$^{-1}$, $-40$ mm$^{-1} \leq k_i < -0.1$ mm$^{-1}$, $-20$ mm$^{-1} \leq k_i < -0.1$ mm$^{-1}$, $-10$ mm$^{-1} \leq k_i < -0.1$ mm$^{-1}$, $-5$ mm$^{-1} \leq k_i < -0.1$ mm$^{-1}$, $-2$ mm$^{-1} \leq k_i < -0.1$ mm$^{-1}$, $-1$ mm$^{-1} \leq k_i < -0.1$ mm$^{-1}$, $-0.5$ mm$^{-1} \leq k_i < -0.1$ mm$^{-1}$, $-0.2$ mm$^{-1} \leq k_i < -0.1$ mm$^{-1}$, $-40$ mm$^{-1} \leq k_i < -0.2$ mm$^{-1}$, $-20$ mm$^{-1} \leq k_i < -0.2$ mm$^{-1}$, $-10$ mm$^{-1} \leq k_i < -0.2$ mm$^{-1}$, $-5$ mm$^{-1} \leq k_i < -0.2$ mm$^{-1}$, $-2$ mm$^{-1} \leq k_i < -0.2$ mm$^{-1}$, $-1$ mm$^{-1} \leq k_i < -0.2$ mm$^{-1}$, $-0.5$ mm$^{-1} \leq k_i < -0.2$ mm$^{-1}$, $-40$ mm$^{-1} \leq k_i < -0.5$ mm$^{-1}$, $-20$ mm$^{-1} \leq k_i < -0.5$ mm$^{-1}$, $-10$ mm$^{-1} \leq k_i < -0.5$ mm$^{-1}$, $-5$ mm$^{-1} \leq k_i < -0.5$ mm$^{-1}$, $-2$ mm$^{-1} \leq k_i < -0.5$ mm$^{-1}$, $-1$ mm$^{-1} \leq k_i < -0.5$ mm$^{-1}$, $-40$ mm$^{-1} < k_i < -1$ mm$^{-1}$, $-20$ mm$^{-1} \leq k_i < -1$ mm$^{-1}$, $-10$ mm$^{-1} \leq k_i < -1$ mm$^{-1}$, $-5$ mm$^{-1} \leq k_i < -1$ mm$^{-1}$, or $-2$ mm$^{-1} \leq k_i < -1$ mm$^{-1}$.

Continuous surface segments of the contactor media may have a geometry. The geometry may follow the contour of a geometric curve. The geometric curve may be a theoretical two-dimensional mathematical surface. The two-dimensional mathematical surface may be a minimal surface. Nonlimiting examples of the minimal surface include catenoids, helicoid-catenoids, Scherk surfaces, Henneberg surfaces, Catalan surfaces, Enneper surfaces, Riemann's surfaces, double Enneper surfaces, wavy Enneper surfaces, planar surfaces, catenoid-Enneper surfaces, symmetric 4-noid surfaces, skew 4-noid surfaces, saddle towers, twisted Scherk surfaces, Lopez-Ros No-Go theorem surfaces, catenoid chain surfaces, inverted boy surfaces, Kusner surfaces, Chen Gackstatter surfaces, Costa surfaces, catenoid fence surfaces, Shoen No-Go theorem surfaces, catenoid field surfaces, Karcher JE saddle tower surfaces, Karcher JD saddle tower surfaces, Scherk with handle surfaces, Costa-Hoffman-Meeks surfaces, and triply periodic minimal surfaces. Nonlimiting examples of triply periodic minimal surfaces include Schwarz H family surfaces, lidinoid surfaces, Schwarz PD family surfaces, gyroid surfaces, neovirus surfaces, Schoen HT hexagonal family surfaces, Schoen TW family surfaces, and Fujimori Weber surfaces.

The contactor media may include continuous surface segments with different geometries. For example, a first continuous surface segment may have a first geometry and a second continuous surface segment may have a second geometry. For example, a first continuous surface segment may have a first geometry, a second continuous surface segment may have a second geometry, and a third continuous surface segment may have a third geometry. For example, a first continuous surface segment may have multiple geometries within the same surface segment. The different geometries may be any of those described herein.

The contactor media may include continuous surface segments with a thickness. The first continuous surface segment may have a thickness of about 1 μm to about 100 mm (e.g., about 10 μm to about 10 mm, about 50 μm to about 1 mm, about 100 μm to about 750 μm, about 200 μm to about 500 μm, about 250 μm to about 350 μm, or about 300 μm). A second continuous surface segment may have a thickness of about 1 μm to about 100 mm (e.g., about 10 μm to about 10 mm, about 50 μm to about 1 mm, about 100 μm to about 750 µm, about 200 µm to about 500 µm, about 250 µm to about 350 µm, or about 300 µm). A third continuous surface segment may have a thickness of about 1 µm to about 100 mm (e.g., about 10 µm to about 10 mm, about 50 µm to about 1 mm, about 100 µm to about 750 µm, about 200 µm to about 500 µm, about 250 µm to about 350 µm, or about 300 µm). The first continuous surface segment, second continuous surface segment, and third continuous surface segment may be the same thickness or a different thickness.

The contactor media may have a total liquid hold-up through surface wetting of about 1 kg/m$^3$ to about 800 kg/m$^3$ (e.g., 10 kg/m$^3$ to 800 kg/m$^3$, 100 kg/m$^3$ to 800 kg/m$^3$, 200 kg/m$^3$ to 800 kg/m$^3$, 300 kg/m$^3$ to 800 kg/m$^3$, 400 kg/m$^3$ to 800 kg/m$^3$, 500 kg/m$^3$ to 800 kg/m$^3$, 600 kg/m$^3$ to 800 kg/m$^3$, or 700 kg/m$^3$ to 800 kg/m$^3$) at a predetermined temperature and predetermined relative humidity. The total liquid hold-up may be dependent on factors including but not limited to contactor media materials, liquid viscosity, the surface tension of adhesion (which is dependent on the material chosen for the contactor media and the gas flowing through the contactor media) the geometry of the contactor media, the fluid flow and material being pushed into the system, and the gas flow and material being pushed into the system.

Static liquid hold-up through surface wetting can occur at a range of about 0.1 kg/m$^3$ to about 700 kg/m$^3$ (e.g., 1 kg/m$^3$ to 700 kg/m$^3$, 10 kg/m$^3$ to 600 kg/m$^3$, 20 kg/m$^3$ to 500 kg/m$^3$, 30 kg/m$^3$ to 400 kg/m$^3$, 40 kg/m$^3$ to 300 kg/m$^3$, 50 kg/m$^3$ to 200 kg/m$^3$, 50 kg/m$^3$ to 100 kg/m$^3$, 50 kg/m$^3$ to 70 kg/m$^3$, 10 kg/m$^3$ to 700 kg/m$^3$, 20 kg/m$^3$ to 700 kg/m$^3$, 30 kg/m$^3$ to 700 kg/m$^3$, 40 kg/m$^3$ to 700 kg/m$^3$, 50 kg/m$^3$ to 700 kg/m$^3$, 60 kg/m$^3$ to 700 kg/m$^3$, 70 kg/m$^3$ to 700 kg/m$^3$, 80 kg/m$^3$ to 700 kg/m$^3$, 90 kg/m$^3$ to 700 kg/m$^3$, 100 kg/m$^3$ to 700 kg/m$^3$, 200 kg/m$^3$ to 700 kg/m$^3$, 300 kg/m$^3$ to 700 kg/m$^3$, 400 kg/m$^3$ to 700 kg/m$^3$, 500 kg/m$^3$ to 700 kg/m$^3$, or 600 kg/m$^3$ to 700 kg/m$^3$) at a predetermined time, predetermined temperature, and predetermined relative humidity. This range will change depending on factors including but not limited to the liquid viscosity, the surface tension of adhesion (which is dependent on the material chosen for the contactor media and the gas flowing through the contactor media) and the geometry of the contactor media. The predetermined time may be, for example, about 45 minutes, about 60 minutes, about 90 minutes, about 120 minutes, about 140 minutes, or about 200 minutes. The temperature may be, for example, about 18° C. to about 30° C., about 20° C. to about 25° C., or about 20° C. The relative humidity may be about 80% to about 100%, about 90% to about 100%, or about 100%.

For example, in a gas-liquid contactor media for carbon dioxide capture made of an acrylate/methacrylate based photopolymer and having a gyroid geometry with an air flow frontal velocity of 1.5 m/s through the contactor media, and a 1 M KOH liquid flow of 0.5 L·s$^{-1}$·m$^{-2}$, the observed total liquid hold-up is in the range of 30 kg/m$^3$ to 120 kg/m$^3$ and the static liquid hold-up at a time of 1 hour ranges from 10 kg/m$^3$ to 120 kg/m$^3$. In any embodiment, lower liquid hold-up values may primarily result from evaporation rather than flow of the liquid out of the contactor media. The static liquid hold-up of the contactor media may be about 0.1% to about 99.9% of the total liquid hold-up (e.g., 0.1% to 20%, 10% to 40%, 30% to 60%, 50% to 80%, 70% to 90%, 85% to 95%, 90% to 99%, or 95% to 99.9%).

The liquid, for which total liquid hold-up and static liquid hold-up values are provided herein, may have a fluid viscosity of about 1 cPs to about 10,000 cPs (e.g., 1 cPs to 10 cPs, 10 cPs to 100 cPs, 100 cPs and 1,000 cPs, 1,000 cPs to 5,000 cPs, or 5,000 cPs to 10,000 cPs). The liquid may have a surface tension of about 10 mN/M$^2$ to about 5000 mN/m$^2$ (e.g., 10 mN/m$^2$ to 50 mN/m$^2$, 50 mN/m$^2$ to 200 mN/m$^2$, 200 mN/m$^2$ to 1000 mN/m$^2$, 1000 mN/m$^2$ to 3000 mN/m$^2$, or 3000 mN/m$^2$ to 5000 mN/m$^2$). The liquid may have a density of about 0.5 g/mL to about 20 g/mL (e.g., 0.5 g/mL to 2 g/mL, 2 g/mL to 5 g/mL, 5 g/mL to 10 g/mL, 10 g/mL to 15 g/mL, or 15 g/mL to 20 g/mL). The liquid may have a three-phase contact angle on the contactor media of less than 100° (e.g., 0 to 100° C., 0° C. to 30° C., 30° C. to 60° C., or 60° C. to 100° C.).

The contactor media may be formed of a polymer, metal, ceramic, or a combination of any two or more thereof. Nonlimiting examples of polymer may include epoxide polymers, acrylic polymers, polyethylene, polypropylene, polyvinyl chloride, polystyrene, polylactic acid, acrylonitrile butadiene styrene, polyethylene terephthalate, polyurethane, polyamide, acrylonitrile styrene acrylate, polycarbonate, polyvinyl alcohol, polyether ether ketone, or a combination of any two or more thereof. Nonlimiting examples of metals may include stainless steel, titanium, aluminum, Inconel, copper, cobalt chrome, bronze, nickel alloys, steel, gold, titanium alloys, and combinations of any two or more thereof. Nonlimiting examples of ceramics may include aluminum oxide, zirconium dioxide, silicon dioxide, titanium dioxide, calcium phosphate, barium titanate, magnesium oxide, silicon nitride, carbon composites, and combinations of any two or more thereof. The contactor media may be formed of a hydrophilic material. The hydrophilic material may include a polymer. In some embodiments, the polymer includes polyethylene, polypropylene, polyvinyl chloride, polystyrene, para-aramid polymers, or other polymers. The hydrophilicity of the contactor media material and surface area of the contactor media may provide a Gibbs free energy of adhesion of the liquid to the contact medium.

The contactor media may be manufactured using 3D printing, thermoforming, molding, knitting of fibers, or by subtractive milling/ablating processes. The contactor media may be printed using stereolithography 3D printing, where light is used to cure liquid resin in a layer-by-layer fashion. The contactor media may be manufactured using a serial process wherein 2D coatings are printed or formulated on a layer-by-layer basis utilizing any suitable 3D printing or manufacturing technologies. The contactor media may be made using other manufacturing techniques, including thermoforming thermoplastic sheets, and molding thermoset polymers.

The contactor media may include one or multiple continuous surface segments in the form of a shape. The size and shape of the continuous surface segments and spacing between continuous surface segments may provide reduced pressure drop, improved turbulence and mixing, increased wetting, and other advantages. Nonlimiting examples of shapes of the continuous surface segments include tubes, sheets (also referred to herein as rectangular prisms), chevron-shaped, lamellar structures, corrugated layers, fins, egg crate, jagged wedge, pyramid, ovoid, hemi-ovoid, and other shapes. Continuous surface segments may be oriented relative to other continuous surface segments to have regular spacing between segments. Regular spacing between segments may provide gas flow between segments. FIGS. 1-5 illustrate different example shapes of the contactor media.

The contactor media may have additional surface treatments to increase the wettability by the liquid. This surface treatment may occur in some embodiments to be applied through the creation of pixels from the 3D printing process (e.g., increased micro-scale (e.g., 1 µm to 10 µm or 1 µm to 250 μm scale) surface roughness). This texture could also be applied through mechanical media blasting (e.g. sand blasting with a course media such as sand, glass, polymer, or a combination of any two or more thereof), polymer coatings which favor wetting by the liquid, by treatment with plasma or corona discharge to change the surface chemistry of a material, or by etching procedures (e.g., Piranha etching solutions, Aqua Regia, metal or ceramic etchants, etc.)

Referring to FIG. 1, a gas-liquid contactor media 100 is illustrated, in which a liquid 110 may flow crosswise (also referred to herein as radially) to the flow of a gas 120. The gas-liquid contactor media 100 may have continuous surface segments 150 to provide liquid hold-up of the liquid 110.

In FIG. 1, the gas-liquid contactor media 100 includes continuous surface segments 150. The plurality of continuous surface segments 150 are formed into cylindrical tube shapes. As illustrated, the gas 120 flows through a plurality of openings 152 (e.g., cavities, pores, voids, or negative curvature) in the continuous surface segments 150. Negative curvature may include negative Gaussian curvature, negative mean curvature, or negative principal curvature. The liquid 110 may flow through the continuous surface segments 150 radially to a flow direction of the gas 120. The gas 120 may flow radially to the plurality of openings 152. Aqueous ions in the liquid 110 may react with the gas 120 in a mass transfer reaction (e.g., to sequester $CO_2$ from the gas). In some embodiments, the segments are of a size such that liquids are retained within the contact media through capillary action, or in other words while there is a not physical impediment to the liquid draining from the top of a contactor media through the bottom (i.e. no pools, cups, or other similar structures) the size and shape of the segments acts to retain liquid within the structure through capillary action and surface adhesion between the liquid and solid media support.

As illustrated, the plurality of continuous surface segments 150 include openings 152. The openings 152 may have a diameter of about 1 mm to about 100 mm (e.g., about 1 mm to about 90 mm, about 1 mm to about 80 mm, about 1 mm to about 70 mm, about 1 mm to about 60 mm, about 1 mm to about 50 mm, about 1 mm to about 40 mm, about 1 mm to about 30 mm, about 1 mm to about 20 mm, or about 1 mm to about 10 mm).

Figure 2:
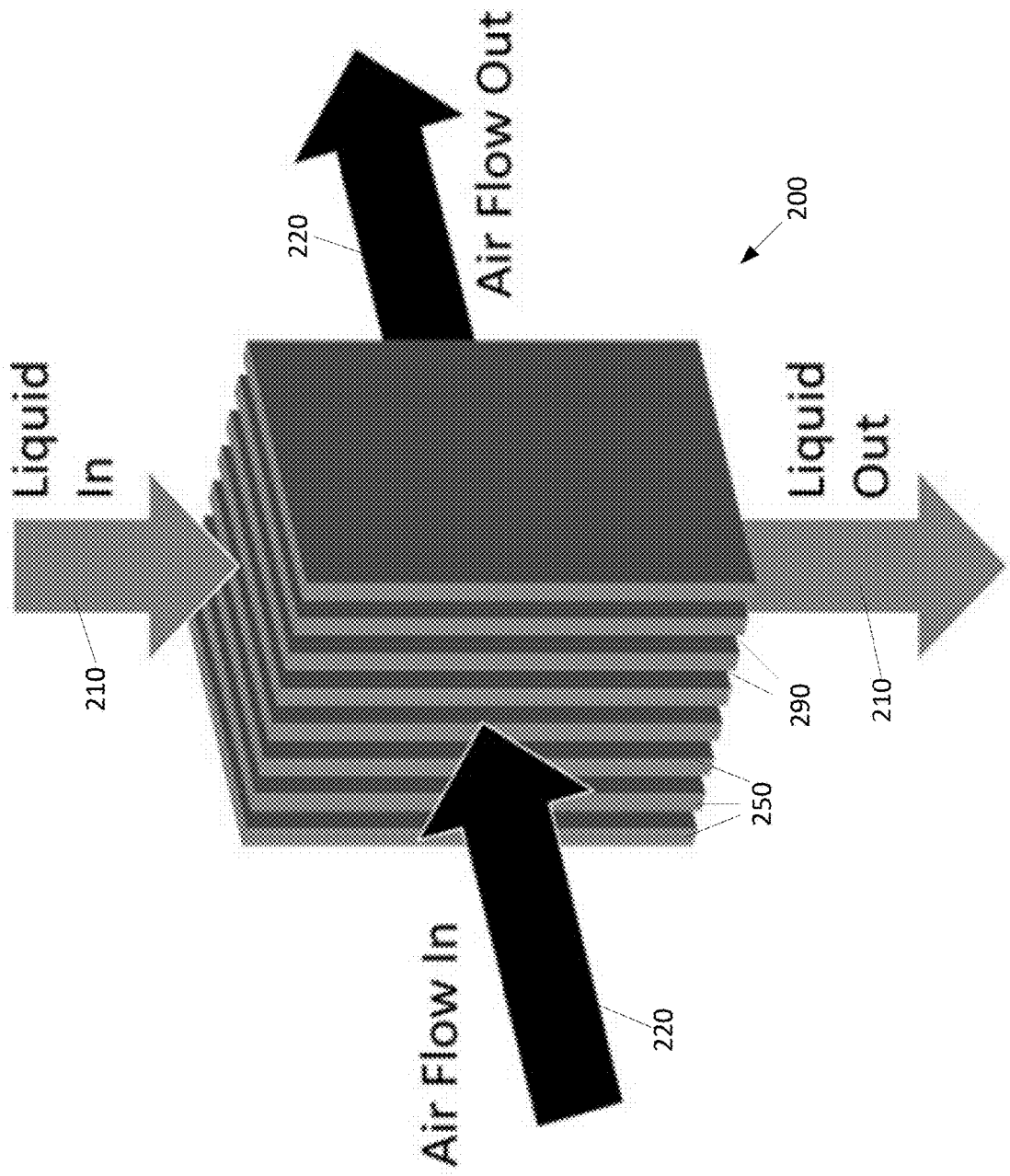
FIG. 2 is an illustration of a first phase (e.g., a gas) flow and a second phase (e.g., a liquid) flow axially through an array of rectangular prism-shaped contactor media comprising a continuous surface that provides second phase hold-up through surface wetting.

Referring to FIG. 2, a gas-liquid contactor media 200 is illustrated, where the contactor media 200 includes an array of continuous surface segments 250 formed in the shape of sheets. A liquid 210 may flow radially to a gas 220 through the contactor media 200 as described with respect to FIG. 1. The gas 220 and the liquid 210 may flow in other configurations and directions in relation to each other, as described with respect to FIG. 1. The gas 220 and the liquid 210 may flow axially the continuous surface segments 250. The plurality of continuous surface segments 250 may have a rectangular profile shape. The plurality of continuous surface segments 250 may have a curved profile shape. The plurality of sheet contactor media 250 may include other geometries. The gas-liquid contactor media 200 may include spacing 290 between the continuous surface segments 250. The gas 220 may flow through the spacing 290 between the plurality of continuous surface segments 250. The spacing 290 may have a width of about 1 mm to about 100 mm (e.g., about 1 mm to about 90 mm, about 1 mm to about 80 mm, about 1 mm to about 70 mm, about 1 mm to about 60 mm, about 1 mm to about 50 mm, about 1 mm to about 40 mm, about 1 mm to about 30 mm, about 1 mm to about 20 mm, or about 1 mm to about 10 mm).

Figure 3:
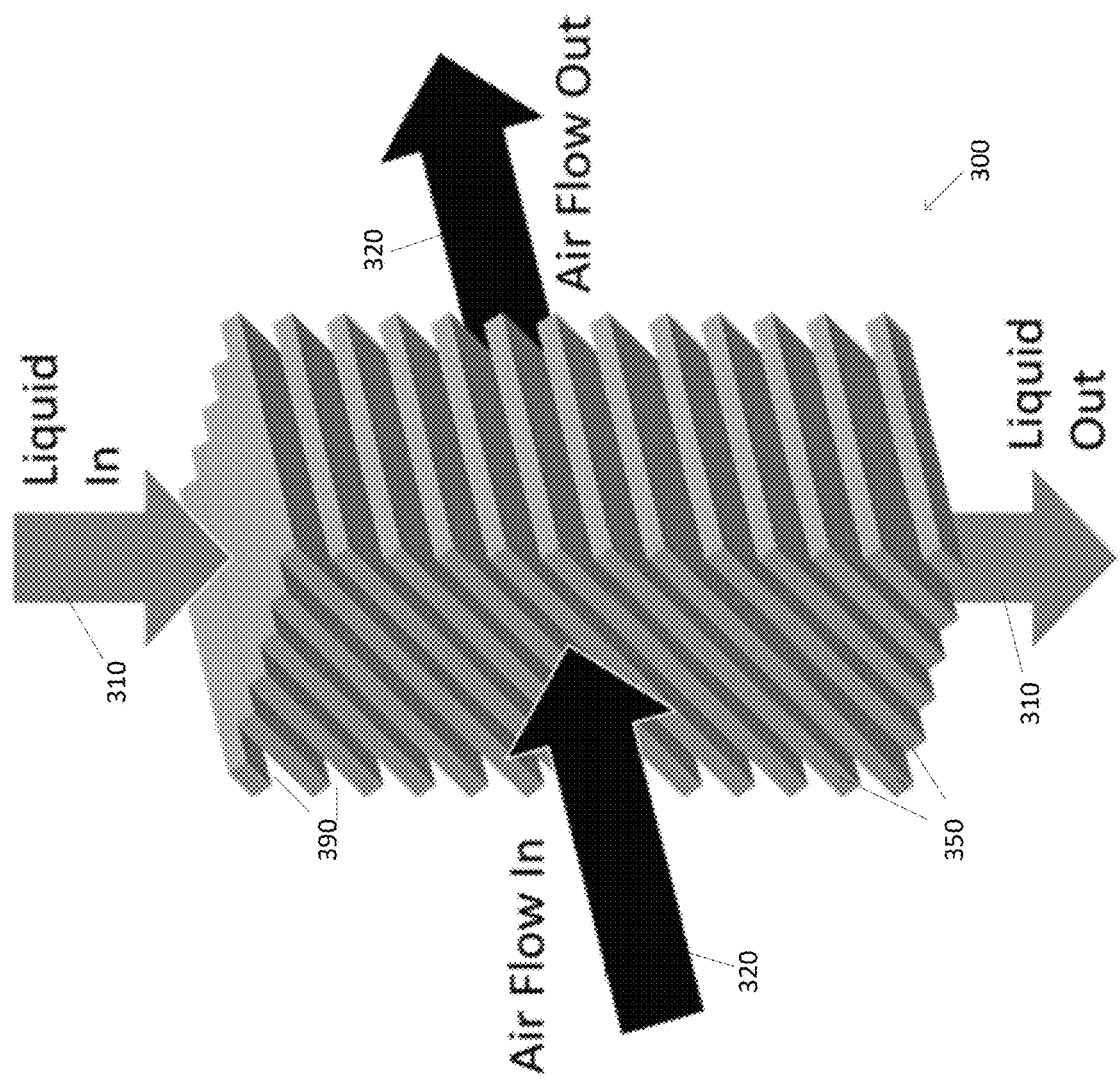
FIG. 3 is an illustration of a first phase (e.g., a gas) flow and a second phase (e.g., a liquid) flow diagonally through an array of rectangular prism-shaped contactor media comprising a continuous surface that provides second phase hold-up through surface wetting.

Referring to FIG. 3, a gas-liquid contactor media 300 is illustrated, where the contactor media 300 includes an array of continuous surface segments 350 formed in the shape of sheets. A liquid 310 may flow radially to a gas 320 in the contactor media 300 as described with respect to FIG. 1. The gas 320 and the liquid 310 may flow in other configurations and directions in relation to each other as described with respect to FIG. 1. The gas 320 may flow axially to a plurality of continuous surface segments 350 and the liquid 310 may flow diagonally to the plurality of continuous surface segments 350. The gas 320 may flow axially to a plurality of continuous surface segments 350 and the liquid 310 may flow diagonally to the plurality of continuous surface segments 350. The gas 320 and the liquid 310 may flow diagonally to the plurality of continuous surface segments 350. The plurality of continuous surface segments 350 may have a rectangular profile shape. The plurality of continuous surface segments 350 may have a curved profile shape. The plurality of continuous surface segments 350 may include other geometries. The gas-liquid contactor 300 may include spacing 390 between the continuous surface segments 350. The gas 320 may flow through the spacing 390. The spacing 390 may have a width of about 1 mm to about 100 mm (e.g., about 1 mm to about 90 mm, about 1 mm to about 80 mm, about 1 mm to about 70 mm, about 1 mm to about 60 mm, about 1 mm to about 50 mm, about 1 mm to about 40 mm, about 1 mm to about 30 mm, about 1 mm to about 20 mm, or about 1 mm to about 10 mm).

Figure 4:
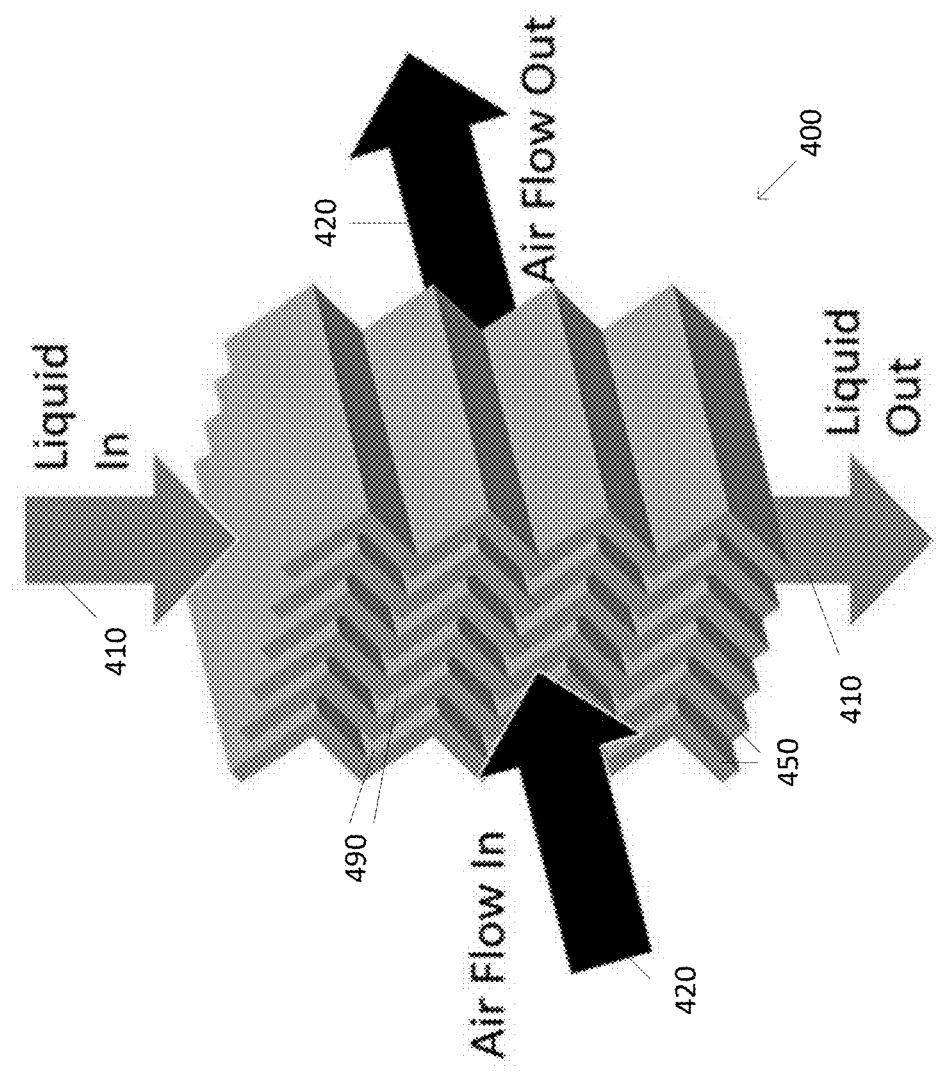
FIG. 4 is an illustration of a first phase (e.g., a gas) flow and a second phase (e.g., a liquid) flow through an array of chevron-shaped, corrugated contactor media comprising a continuous surface that provides second phase hold-up through surface wetting.

Referring to FIG. 4, a gas-liquid contactor media 400 is illustrated, where the contactor media 400 includes an array of continuous surface segments 450 formed in the shape of chevron shapes. A liquid 410 may flow radially to a gas 420 in the contactor media 400. The gas 420 and the liquid 410 may flow in other configurations and directions in relation to each other as described with respect to FIG. 1. The gas 420 and the liquid 410 may flow axially to the chevron-shaped continuous surface segments 450. For example, at least one of the gas 420 and the liquid 410 may flow radially to the plurality of chevron-shaped continuous surface segments 450. At least one of the gas 420 and the liquid 410 may flow diagonally to the plurality of chevron-shaped continuous surface segments 450. The gas-liquid contactor media 400 may include spacing 490 between the plurality of continuous surface segments 450. The gas 420 and the liquid 410 may flow through the spacing 490. The spacing 490 may have a width of about 1 mm to about 100 mm (e.g., about 1 mm to about 90 mm, about 1 mm to about 80 mm, about 1 mm to about 70 mm, about 1 mm to about 60 mm, about 1 mm to about 50 mm, about 1 mm to about 40 mm, about 1 mm to about 30 mm, about 1 mm to about 20 mm, or about 1 mm to about 10 mm).

Figure 5:
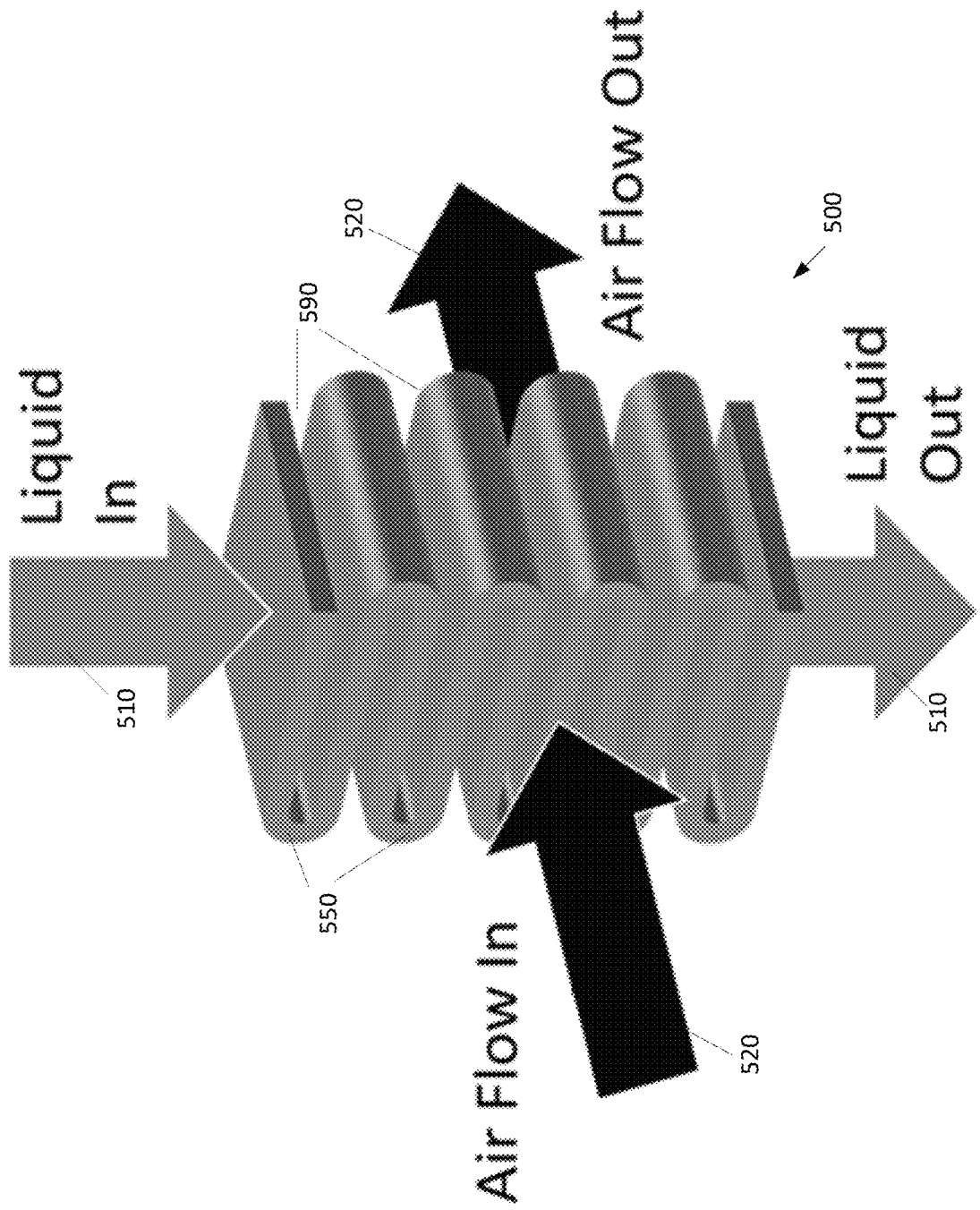
FIG. 5 is an illustration of a first phase (e.g., a gas) flow and a second phase (e.g., a liquid) flow through an array of lamellar contactor media comprising a continuous surface that provides second phase hold-up through surface wetting.

Referring to FIG. 5, a gas-liquid contactor media 500 is illustrated, where the contactor media 500 includes an array of continuous surface segments 550 formed in the shape of lamellar layers. A liquid 510 may flow radially to a gas 520 in the contactor media 500. The gas 520 and the liquid 510 may flow in other configurations and directions as described herein. In some embodiments, the gas 520 may flow axially to a plurality of the lamellar continuous surface segments 550 and the liquid 510 may flow radially to the plurality of lamellar continuous surface segments 550. The gas 520 may flow radially to the plurality of lamellar continuous surface segments 550 and the liquid 510 may flow axially to the plurality of lamellar layers of continuous surface segments 550. The gas 520 and the liquid 510 may flow radially to the plurality of continuous surface segments 550. The gas 520 and the liquid 510 may flow axially to the plurality of layers of lamellar continuous surface segments 550. The gas-liquid contactor media 500 may include spacing 590 between the continuous surface segments 550 as described herein. The gas 520 and the liquid 510 may flow through the spacing 590 as described herein. The spacing 590 may have a width of about 1 mm to about 100 mm (e.g., about 1 mm to about 90 mm, about 1 mm to about 80 mm, about 1 mm to about 70 mm, about 1 mm to about 60 mm, about 1 mm to about 50 mm, about 1 mm to about 40 mm, about 1 mm to about 30 mm, about 1 mm to about 20 mm, or about 1 mm to about 10 mm).

Figure 6:
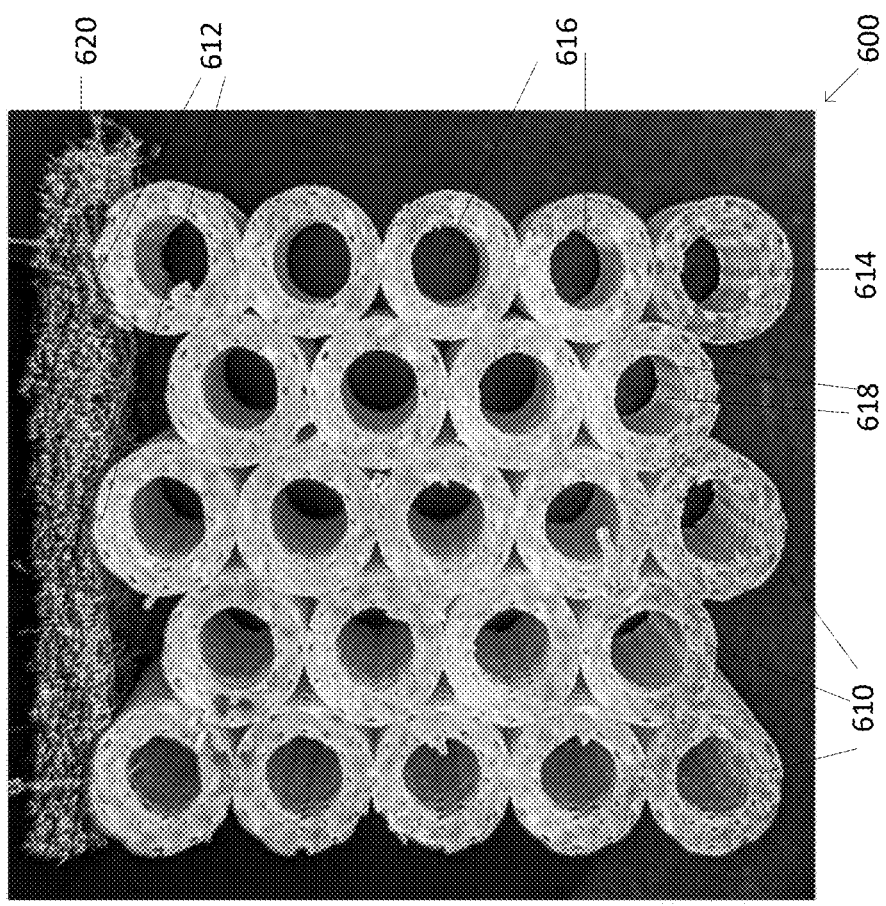
FIG. 6 is a photograph of a hexagonal packing array of tube-shaped contactor media, where each tube-shaped media comprises a continuous surface that provides second phase hold-up through surface wetting and a non-woven polymer pad distributor disposed above the tube-shaped contactor media. The tube-shaped contactor media appears blue (alternatively identified by darker grey shading) because of static liquid hold-up of a liquid including blue dye for visualization.

Referring to FIG. 6, a photograph of a gas-liquid contactor media 600 is shown. The gas-liquid contactor media 600 may include a plurality of continuous surface segments 610. The gas-liquid contactor media 600 may include a liquid distributor 620. In some embodiments, the liquid distributor 620 is configured to disperse liquid flow evenly across the plurality of continuous surface segments 610. The source of the liquid may include a single inlet pipe. The source of the liquid may include multiple inlet pipes or other liquid sources. In some embodiments, the liquid distributor 620 is located on an outside surface 612 of the plurality of continuous surface segments 610. The liquid distributor 620 may be located on a top surface of the plurality of contactor media 610. The gas-liquid contactor media 600 appears blue (alternatively identified by darker grey shading) because of static liquid hold-up of a liquid including blue dye for visualization.

In any embodiment, the plurality of continuous surface segments 610 include at least one continuous surface segment formed into a tube 614. For example, the continuous surface segment may have a gyroidal geometry. The continuous surface segments 610 may include a plurality of openings 616. The liquid distributor 620 may be disposed radially to the plurality of openings 616. In other embodiments, the liquid distributor 620 may be disposed axially to the plurality of openings 616. The liquid distributor 620 may be disposed along a length of the plurality of continuous surface segments 610.

Figure 7:
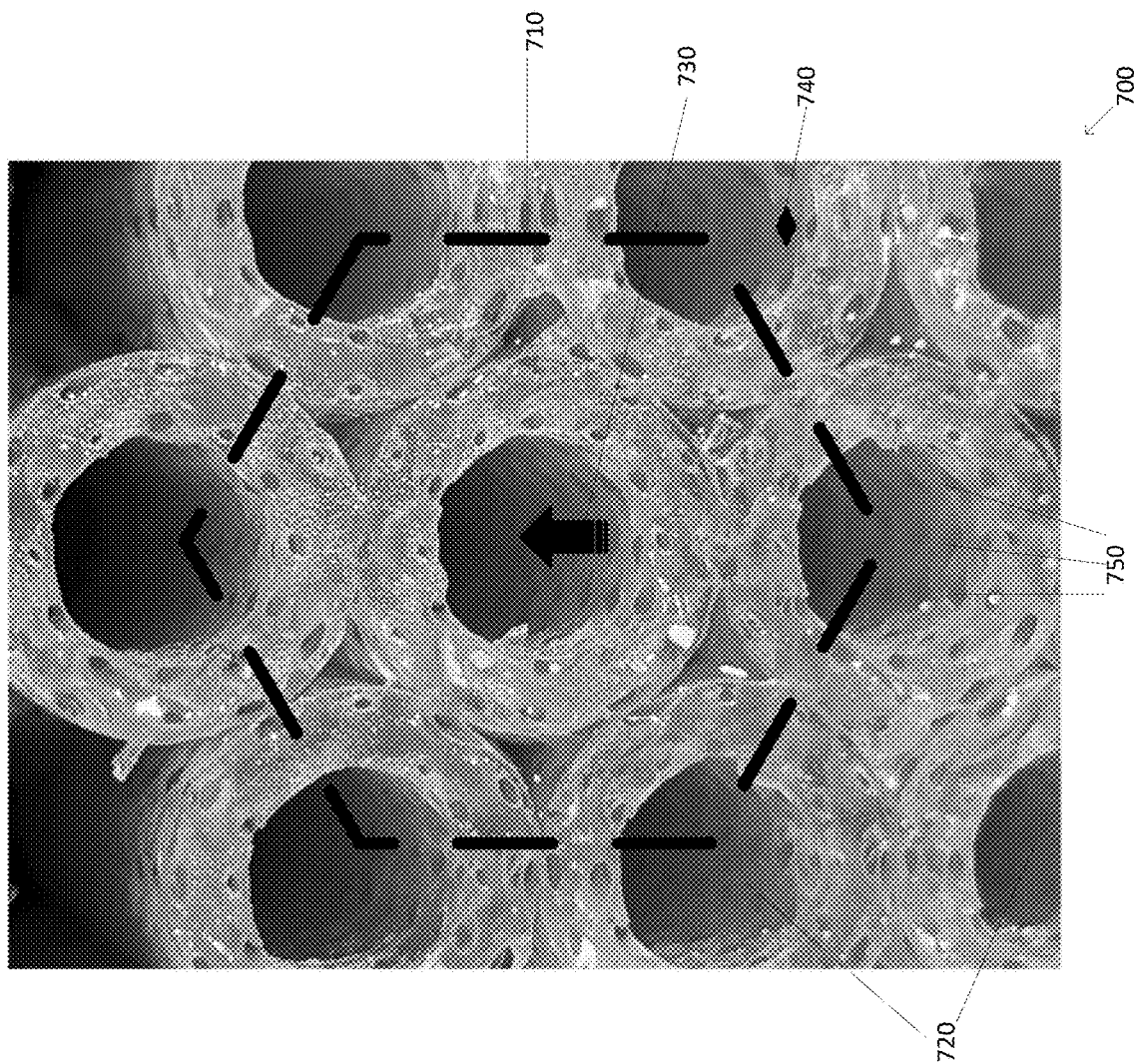
FIG. 7 is a cross-sectional photograph of a plurality of tube-shaped contactor media, where each tube-shaped media comprises a continuous surface that provides second phase hold-up through surface wetting arranged in a hexagonal array. The tube-shaped contactor media appears blue (alternatively identified by darker grey shading) because of static liquid hold-up of a liquid including blue dye for visualization. The arrow indicated the direction of air flow into the plane of the page.

Referring to FIG. 7, a photograph of an array of tube-shaped contactor media 700 is shown. The tube-shaped contactor media 700 includes continuous surface segments arranged in a hexagonal array 710. The contactor media 700 may be configured to receive a liquid. The contactor media 700 may include a plurality of openings 720. The plurality of openings 720 may be configured to provide a gas flow 730. The gas flow 730 is into the plane of the page. The plurality of openings 720 may facilitate gas flow through the contactor media 700. The surface geometry of the continuous surface segments of the contactor media 700 may provide a gas-liquid contact area 740. The geometry of the continuous surface segments may increase the gas-liquid contact area 740. The contactor media 700 may be configured to facilitate liquid flow through the contactor media 700. For example, liquid may trickle through the continuous surface segments, filling surface features 750 disposed within the continuous surface segments. The contactor media 700 appears blue (alternatively identified by darker grey shading) because of static liquid hold-up of a liquid including blue dye for visualization at the gas-liquid contact areas 740.

Figure 8:
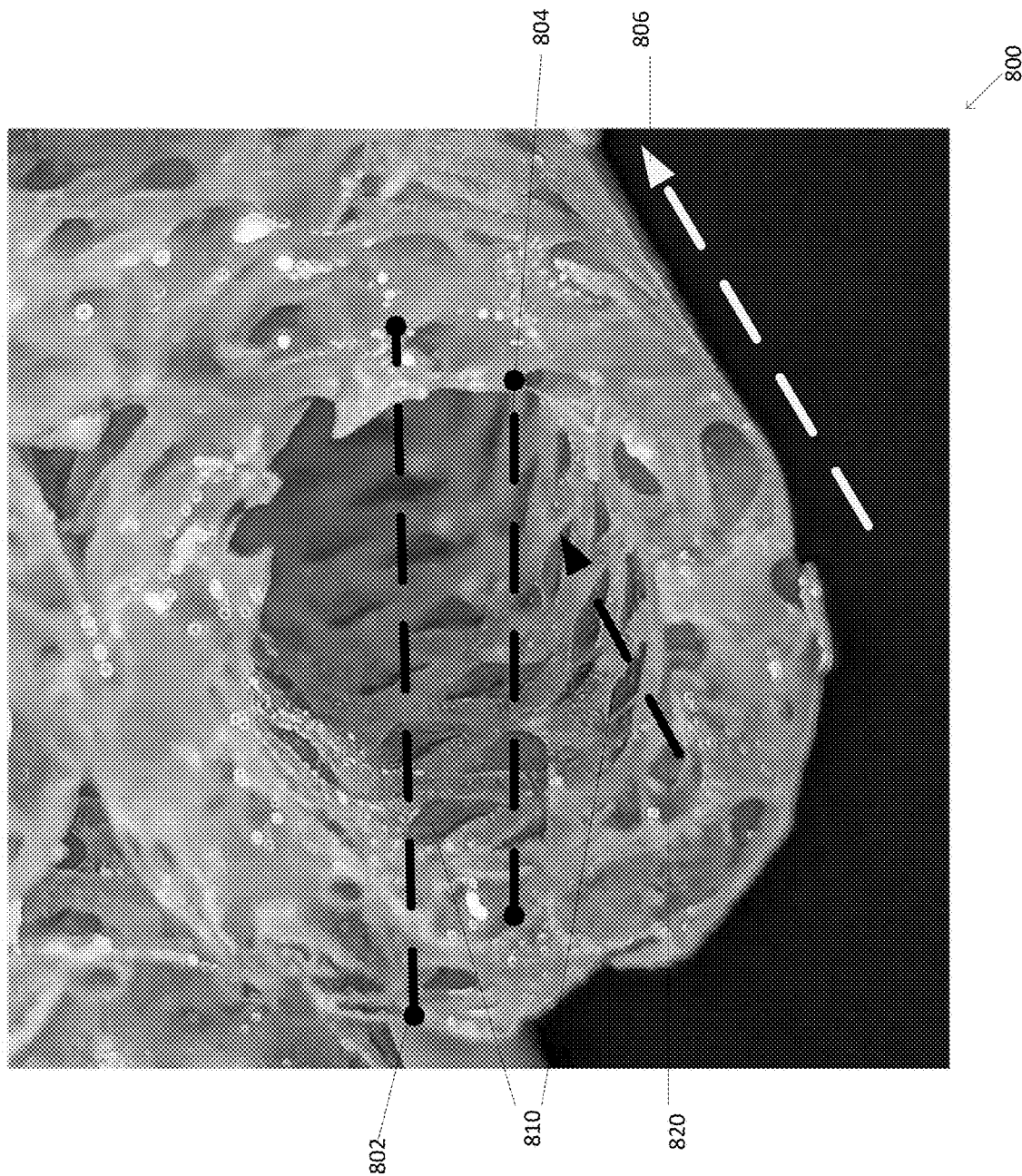
FIG. 8 is an image of a gyroidal tube contactor medium comprising a gyroidal continuous surface that provides second phase hold-up through surface wetting with surface features configured to uniformly fill with second phase. The contactor media appears green (alternatively identified by darker grey shading) because of static liquid hold-up of a liquid including green dye for visualization.

Referring to FIG. 8, a photograph of a tube-shaped contact medium 800 is shown. The plurality of surface features 810 disposed within the contact medium 800 may be configured to fill with a liquid. The contactor medium 800 appears green (alternatively identified by darker grey shading) because of static liquid hold-up of a liquid including green dye for visualization. At least one of the plurality of surface features 810 may be oval-shaped. At least one of the plurality of surface features 810 may be oval-shaped with a constriction, forming a bilobed ('peanut') shaped channel. At least one of the plurality of surface features 810 may be spheroid-shaped. The contact medium 800 may include an opening 820 configured to facilitate gas flow. The contact medium 800 may include an outer diameter 802 and an inner diameter 804. The inner diameter 804 may be a diameter of the opening 820. The outer diameter 802 may be a width of the gyroidal tube contact medium 800. In some embodiments, the inner diameter 804 is about 1 mm to about 100 mm (e.g., 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm; 1 mm to 50 mm, 5 mm to 25 mm). For example, the inner diameter 804 may be about 5 mm to about 9 mm or about 6 mm to about 8 mm. The outer diameter 802 may be about 1 mm to about 200 mm (e.g., 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 30 mm, 40 mm, 50 mm, 60 mm, 70 mm, 80 mm, 90 mm, 100 mm, or 200 mm). For example, the outer diameter 802 may be about 8 mm to about 18 mm or about 11 mm to about 15 mm. The contact medium 800 may include a length 806. The length 806 of the contact medium 800 may be about 10 mm to about 10 m (e.g., about 25 mm to about 10 m, about 100 mm to about 10 m, or about 1 m to about 10 m, about 5 m to about 10 m, or about 8 m to about 10 m.).

Figure 9:
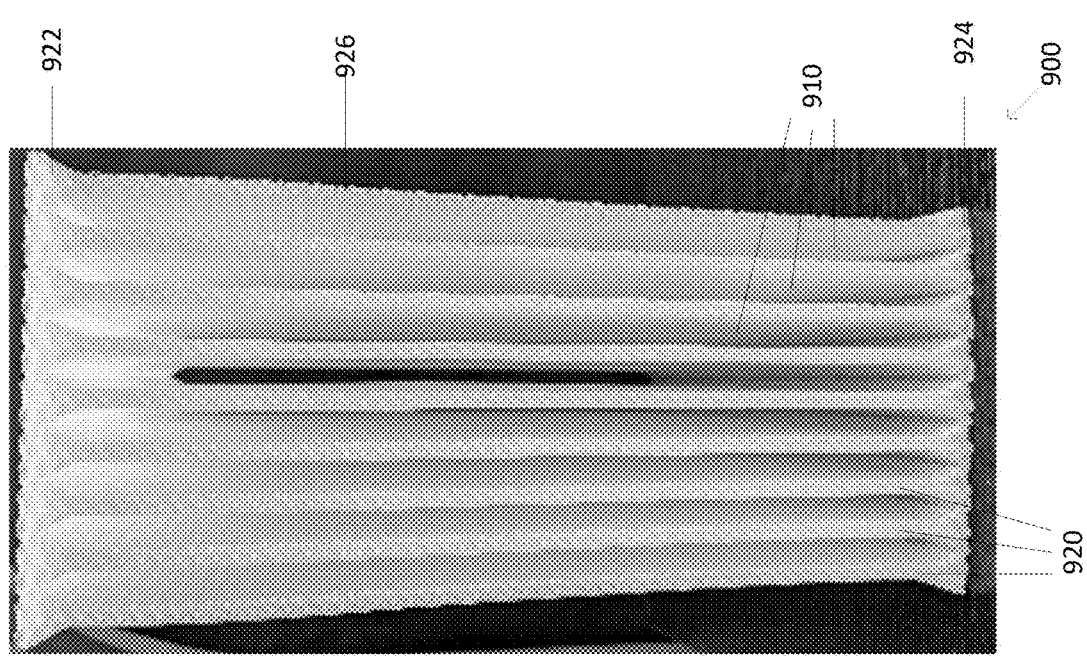
FIG. 9 is a photograph of an array of I-beam-shaped contactor media, where each I-beam sheet comprises a continuous surface that provides second phase hold-up through surface wetting.

Referring to FIG. 9, a cross-sectional photograph of a plurality of I-beam sheet contactor media 900 is shown. Generally, the I-beam sheet has a Y-shaped upper portion and a Y-shaped lower portion separated by a sheet, where the Y-shaped upper portion is configured to collect liquid from a distributer and direct (or "funnel") it into a network of passages in the sheet, while the Y-shaped lower portion is also configured to redistribute the liquid to a liquid collector at the bottom of the sheet. More, specifically, the contactor media 900 may include continuous surface segments as disclosed herein. The plurality of I-beam sheet contactor media 900 may include spaces 910 between the plurality of I-beam sheet contactor media. The plurality of I-beam sheet contactor media 900 may be configured to facilitate gas-liquid interaction. The plurality of I-beam sheet contactor media 900 may include at least one I-beam sheet 920. The I-beam sheet 920 may include two or more unit cells. In some embodiments, a top piece 922 and a bottom piece 924 of the I-beam sheet 920 include a first unit cell. Middle pieces 926 of the I-beam sheet 920 may include a second unit cell as a repeating unit. A dimensional length of the I-beam sheet may be dictated by the number of second unit cells located between the top piece 922 of the I-beam sheet 920 and the bottom piece 924 of the I-beam sheet 920. For example, the unit cells may include gyroidal structures. A method of forming the I-beam sheet 920 may include arraying the first unit cells and second unit cells into a two-dimensional array. The method may include arraying the second unit cells between the first unit cells. In some embodiments, the first unit cells are opposite ends of the I-beam sheet 920.

Figure 10:
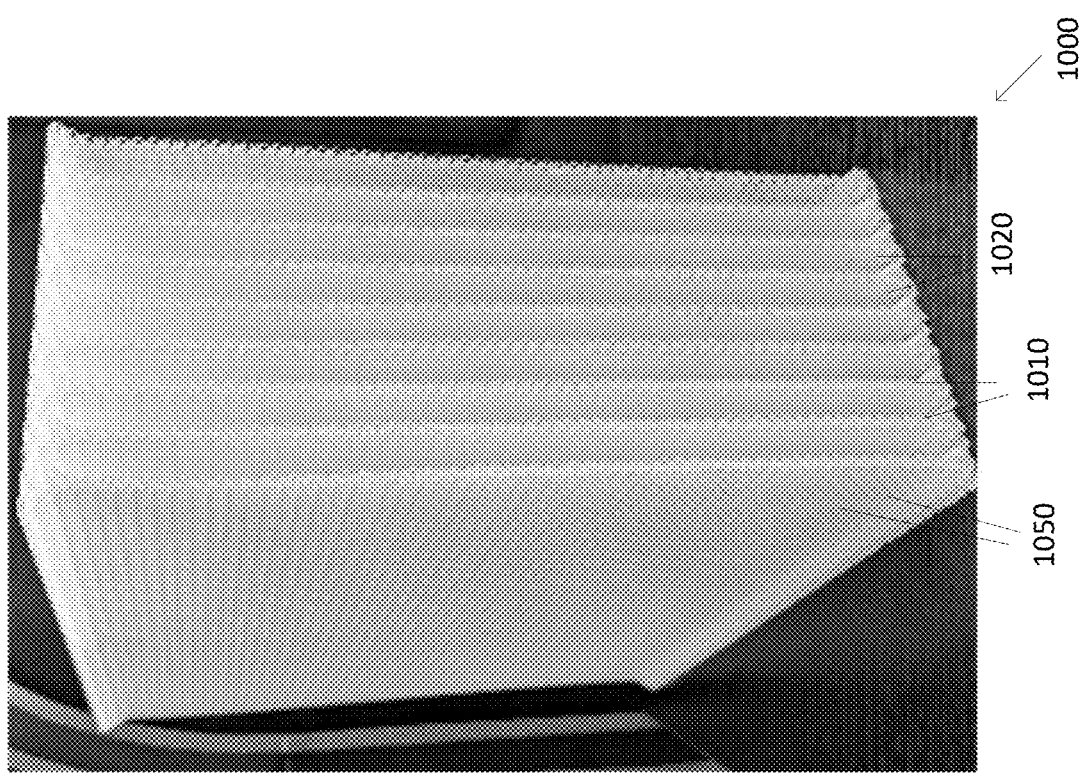
FIG. 10 is a perspective view photograph of the plurality of I-beam-shaped contactor media of FIG. 9.

Referring to FIG. 10, a side view of the I-beam sheet contactor media 1000 is shown. The plurality of I-beam sheet contactor media 1000 may include a first unit cell, a second unit cell, spaces between the plurality of I-beam sheet contactor media 1010, and a dimensional length. In some embodiments, the plurality of I-beam sheet contactor media further include a gyroidal structure and/or surface features 1050. A quantity of second unit cells may determine the dimensional length of the plurality of I-beam sheet contactor media 1000. Spacing 1020 between I-beam sheet contactor media 1010 may be even or uneven, as described herein. For example, I-beam sheet contactor media 1010 may be spaced in a radial arrangement as shown in FIG. 16B.

Figure 11:
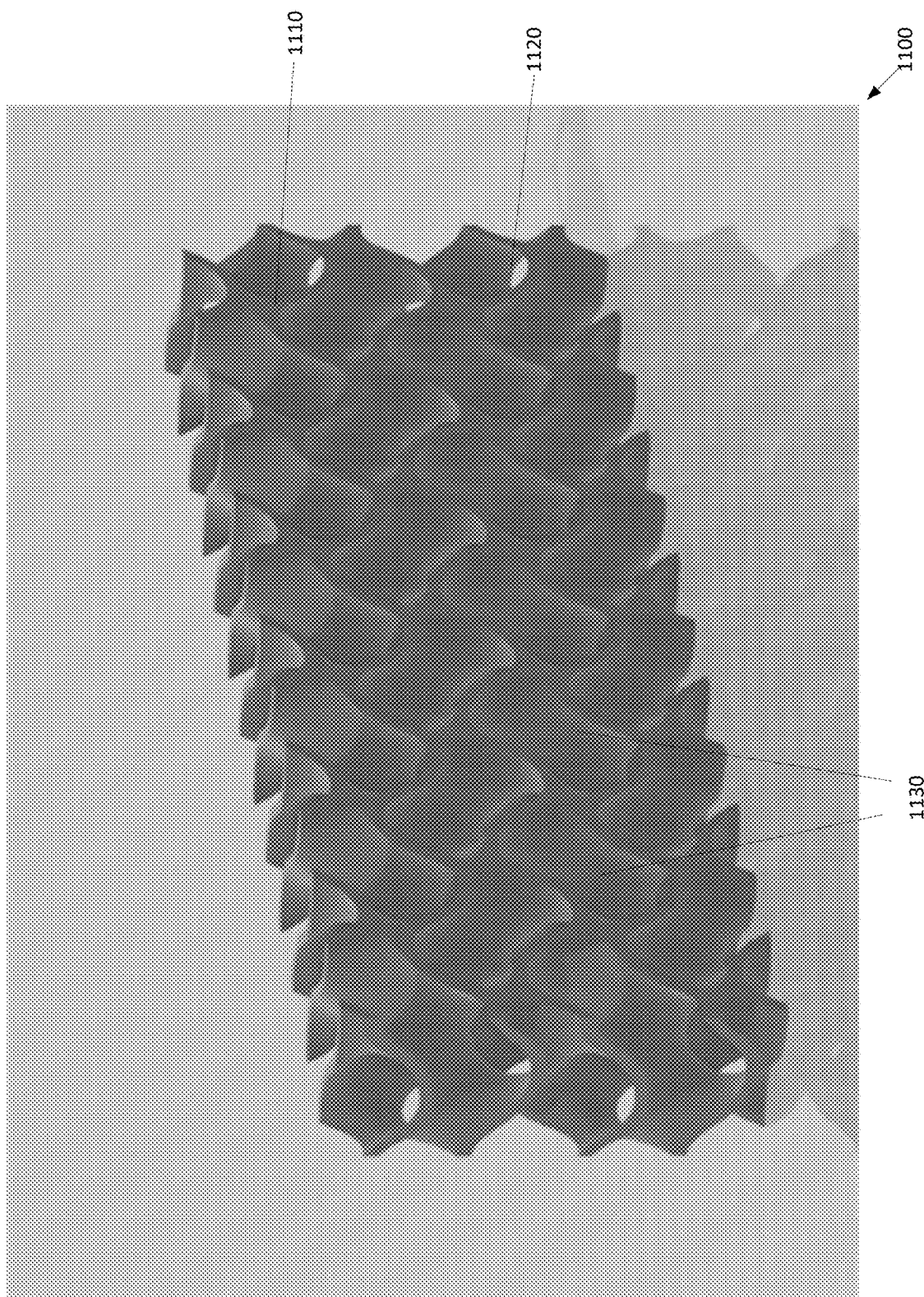
FIG. 11 is an illustration of a rectangular section of a gyroidal contactor medium comprising a continuous surface that provides second phase hold-up through surface wetting.

Referring to FIG. 11, an illustration of a rectangular section of a contact medium 1100 with continuous surface segments 1130 having a gyroidal geometry with a porous surface 1120 is shown. The continuous surface segments may include openings 1130 on each side of the rectangular section that are interconnected. The rectangular section may include repeated unit cells.

Figure 12:
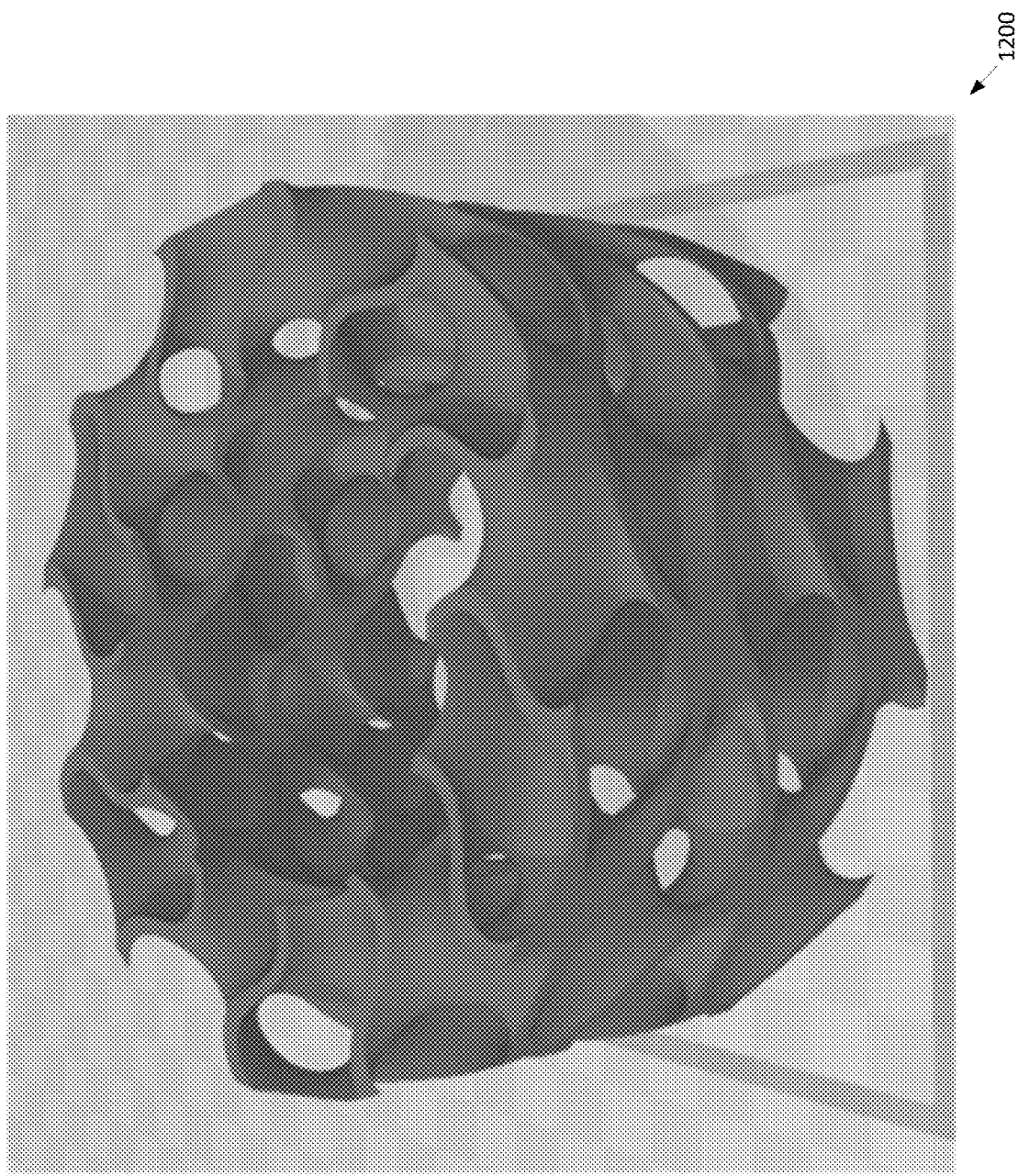
FIG. 12 is an illustration of a gyroidal tube contact medium section formed by rotation distortion of the rectangular gyroidal contactor medium of FIG. 11.

Referring to FIG. 12, an illustration of a tube-shaped section of a contact medium 1200 is shown. The continuous surface segments may have a gyroidal geometry and a tube-shaped profile may be generated by rotation distortion of the rectangular section of the contact medium shown in FIG. 11. The contact medium 1200 may include repeating unit cells that is similar to the unit cell in FIG. 11 but with rotation distortion.

Figure 13:
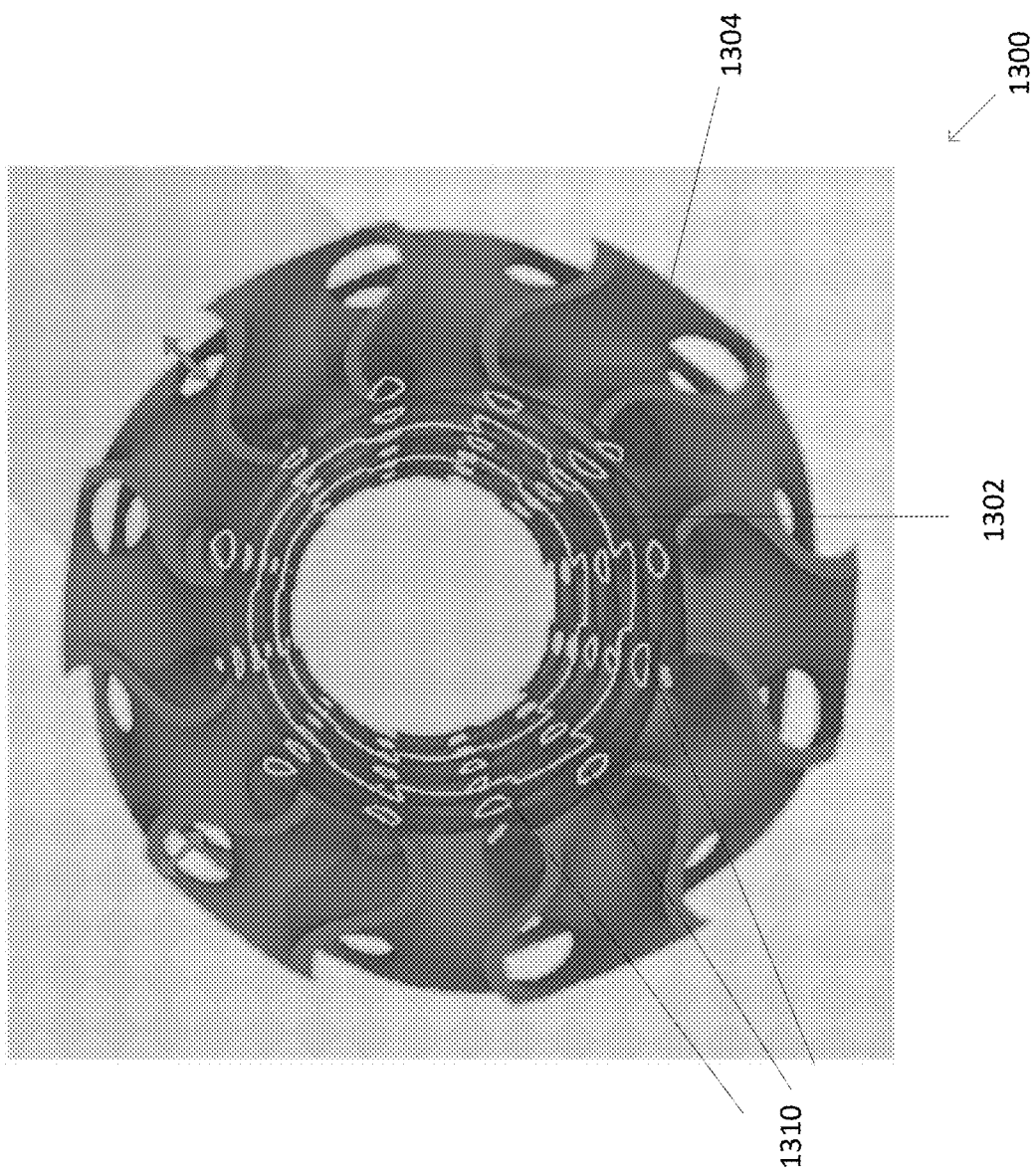
FIG. 13 is an axial cross-sectional illustration of a gyroidal tube contactor medium comprising a continuous surface that provides second phase hold-up through surface wetting.

Referring to FIG. 13, an illustration of a contact medium 1300 is shown from an axial direction. The contact medium 1300 may have a gyroidal geometry and a tube-shaped profile. The contact medium 1300 may include surface features 1310 disposed on an inside surface 1302 and on an outside surface 1304 of the contact medium. In some embodiments, the contact medium includes repeating units. In some embodiments, the contact medium includes alternating units. The contact medium 1300 may be assembled by stacking unit cells onto each other or connecting them through other means such as stacking or printing. The surface features 1310 disposed on the inside surface 1302 and the outside surface 1304 may be interconnected. The interconnection of the surface features 1310 disposed on the inside surface 1302 and the surface features disposed on the outside surface 1304 may facilitate liquid flow through the contact medium 1300. The surface features 1310 disposed on the inside surface 1302 and the outside surface 1304 may be configured to retain liquid. In some embodiments, the surface features 1310 may increase adhesive surface energy of the liquid.

Figure 14B:
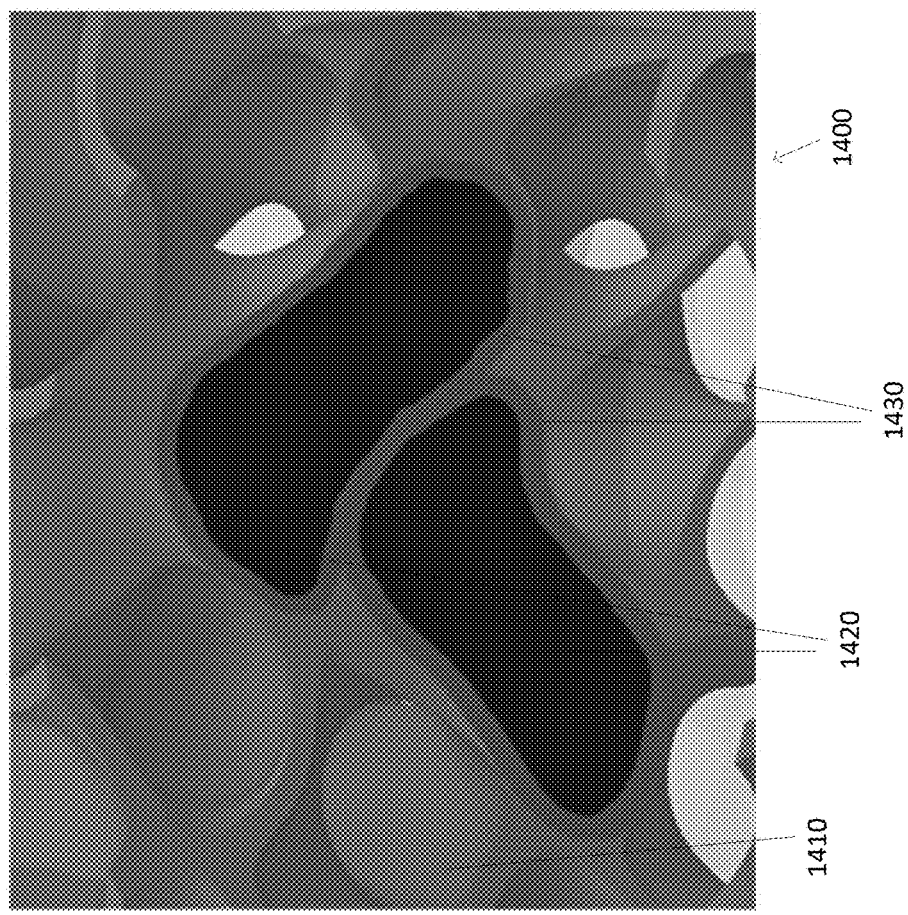
FIG. 14B is the illustration of FIG. 14A with shading indicating surface features for surface wetting. Red sections 1430 are inactive surface areas where capillary action and static second phase hold-up are not favored and the dark blue sections 1420 (alternatively identified by darker grey shading) are active surface areas where capillary action and static liquid hold-up are favored.
Figure 14A:
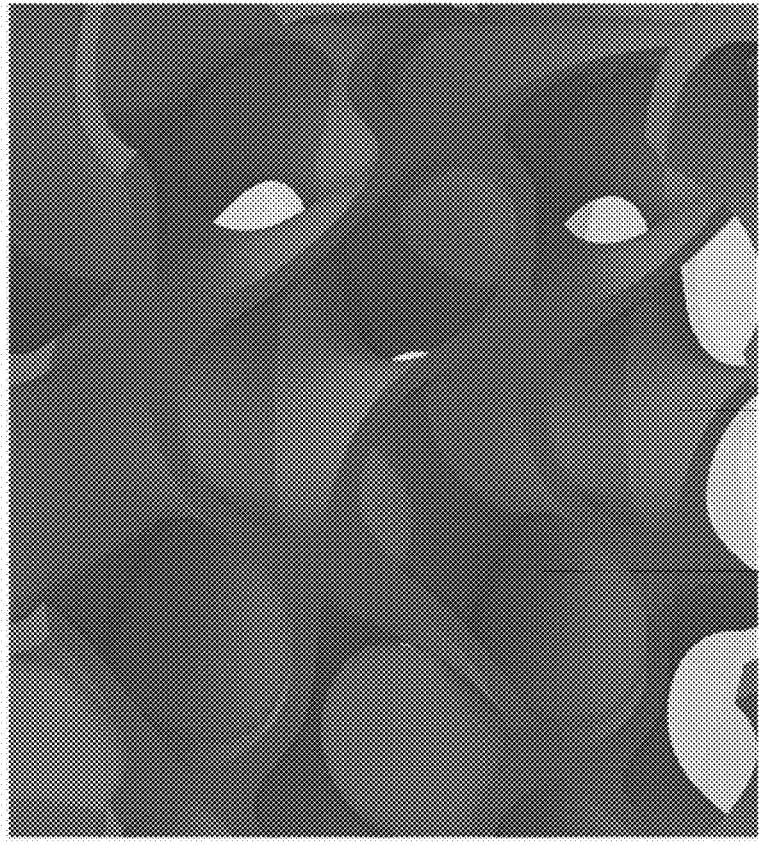
FIG. 14A is an illustration of a closer view of the gyroidal contactor medium comprising a continuous surface that provides second phase hold-up through surface wetting.

Referring to FIG. 14A, a contact medium 1400 includes regions of continuous surface segments 1410 that may include repeating geometrical voids 1420. The geometrical voids 1420 may include gyroidal geometry. The continuous surface segments 1410 may further include segments with amorphous geometry. Each continuous surface segment 1410 may follow a negative Gaussian curvature and/or negative principal curvature as disclosed herein. The repeating geometrical features 1420 may include channels, surface features, pores, or voids, or a combination of any two or more thereof. For example, the surface features, pores, or voids may be spheroidal. These channels may be interconnected across the entire surface media.

FIG. 14B is the illustration in FIG. 14A with shading indicating surface features 1420 for surface wetting. Red sections 1430 are inactive surface areas where capillary action and static second phase hold-up are not favored and the dark blue sections 1420 (alternatively identified by darker grey shading) are active surface areas where capillary action and static liquid hold-up are favored. The active surface area features 1420 may have a bilobed-shaped cross-section (e.g., peanut-shaped). The contact medium 1400 may include an active surface area of surface wetting in the active surface area features 1420. The active surface area may be configured to expose a liquid surface area to gas to facilitate gas-liquid interactions. In some embodiments, the active surface area may be the surface area of the liquid retained in the interconnected active surface area features 1420. In some embodiments, active surface area features 1420 may include channels, cavities, pores, voids, or any combination of two or more thereof, which may be interconnected to other active surface area features 1420 including channels, cavities, pores, voids, or any combination of two or more thereof, to create a longer interconnected active surface area which may extend across the width or length of the contactor media.

Figure 15:
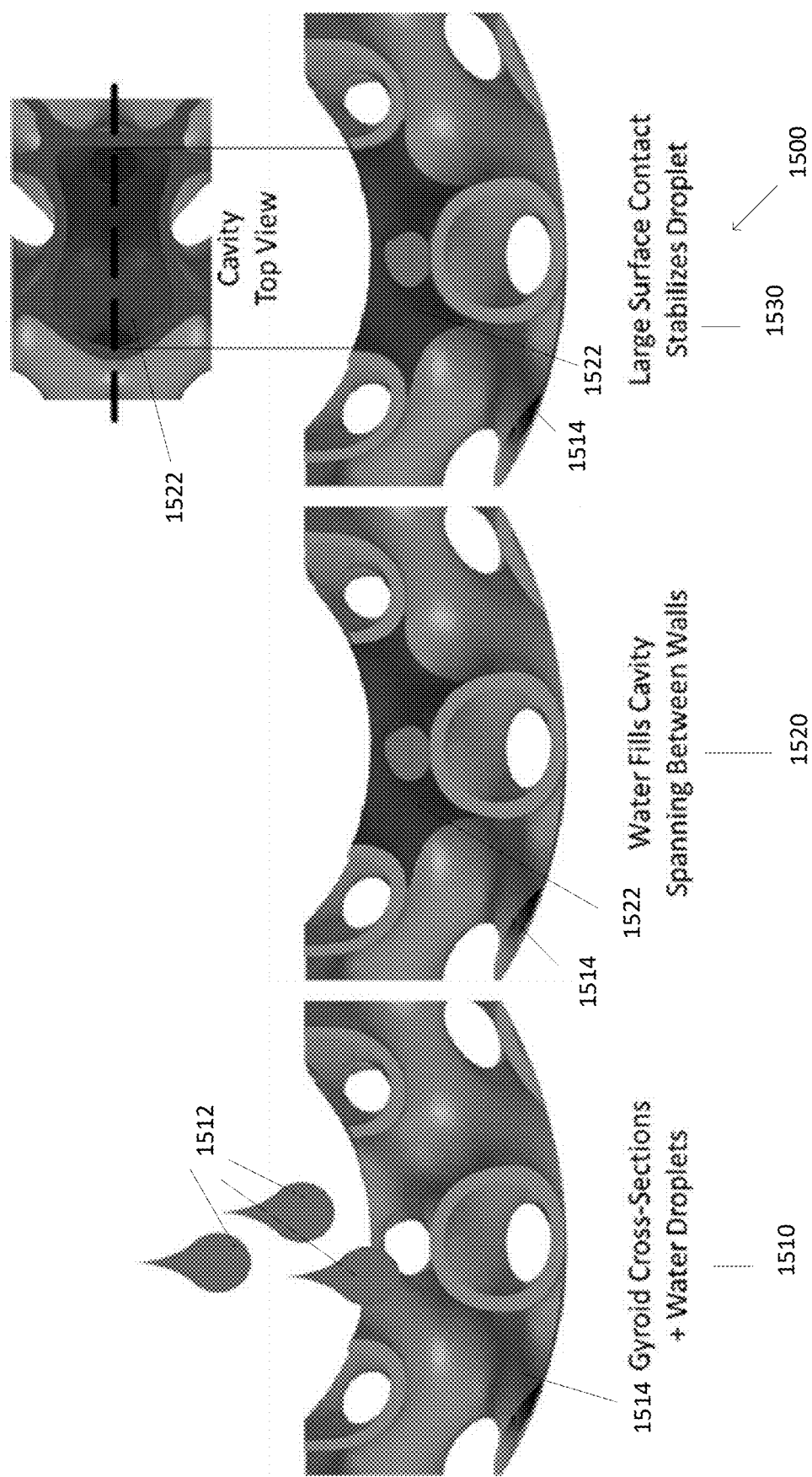
FIG. 15 is a cross-sectional illustration of surface wetting of the gyroidal contactor medium in FIG. 14A. The gyroidal contactor medium has a large active surface area for the second phase to wet, helping to better stabilize the droplet of the second phase. Additionally, because the active surface area has a closed contour (the 'peanut' shape), the droplet is further stabilized. There are other cross-sections of the gyroidal contactor medium (e.g., sine wave shapes) that do not have a closed contour where the second phase may not stabilize, providing less liquid hold-up.

FIG. 15 is a cross-sectional illustration of surface wetting of the gyroidal contactor medium in FIG. 14A. The gyroidal contactor medium has a large active surface area for the second phase to wet, helping to better stabilize the droplet of the second phase. Additionally, because the active surface area has a closed contour (the peanut shape (also referred to herein as a bilobed shape)), the droplet is further stabilized. There are other cross-sections of the gyroidal contactor medium (e.g., sine wave shapes) that do not have a closed contour where the second phase may not stabilize, providing less liquid hold-up. The 'peanut' shape of the active surface area in the gyroidal contactor medium provides higher active surface area compared to conventional contactor media having node-strut geometry (e.g., lattice geometry, skeletal gyroid). The node-strut geometry, even though it has a higher active surface area, provides very little active surface area per volume for mass transport. The peanut shape of the active surface area makes better use of the volume of liquid that it holds up by making it more available to the gas flow for mass transport.

Referring to FIG. 15, a method 1500 of wetting a contact medium 1514 is illustrated. The method 1500 may include providing a plurality of liquid droplets 1512 and the contact medium 1514. In some embodiments, the method 1500 includes filling a plurality of active surface area features 1522 disposed within the contact medium 1514 with the plurality of liquid droplets 1512. The method may include stabilizing the plurality of liquid droplets 1512 with the active surface area features 1522. In some embodiments, the active surface area features 1522 facilitates increased wetting and resistance of the plurality of liquid droplets 1512 to surface tension. The resistance of the plurality of liquid droplets 1512 to surface tension may prevent or reduce droplet beading. In some embodiments, the active surface area features 1522 may facilitate resistance of the plurality of liquid droplets 1512 to gravitational forces. This may prevent the liquid from draining out of the contact medium 1514.

Contactor Media Systems

Figure 16A:
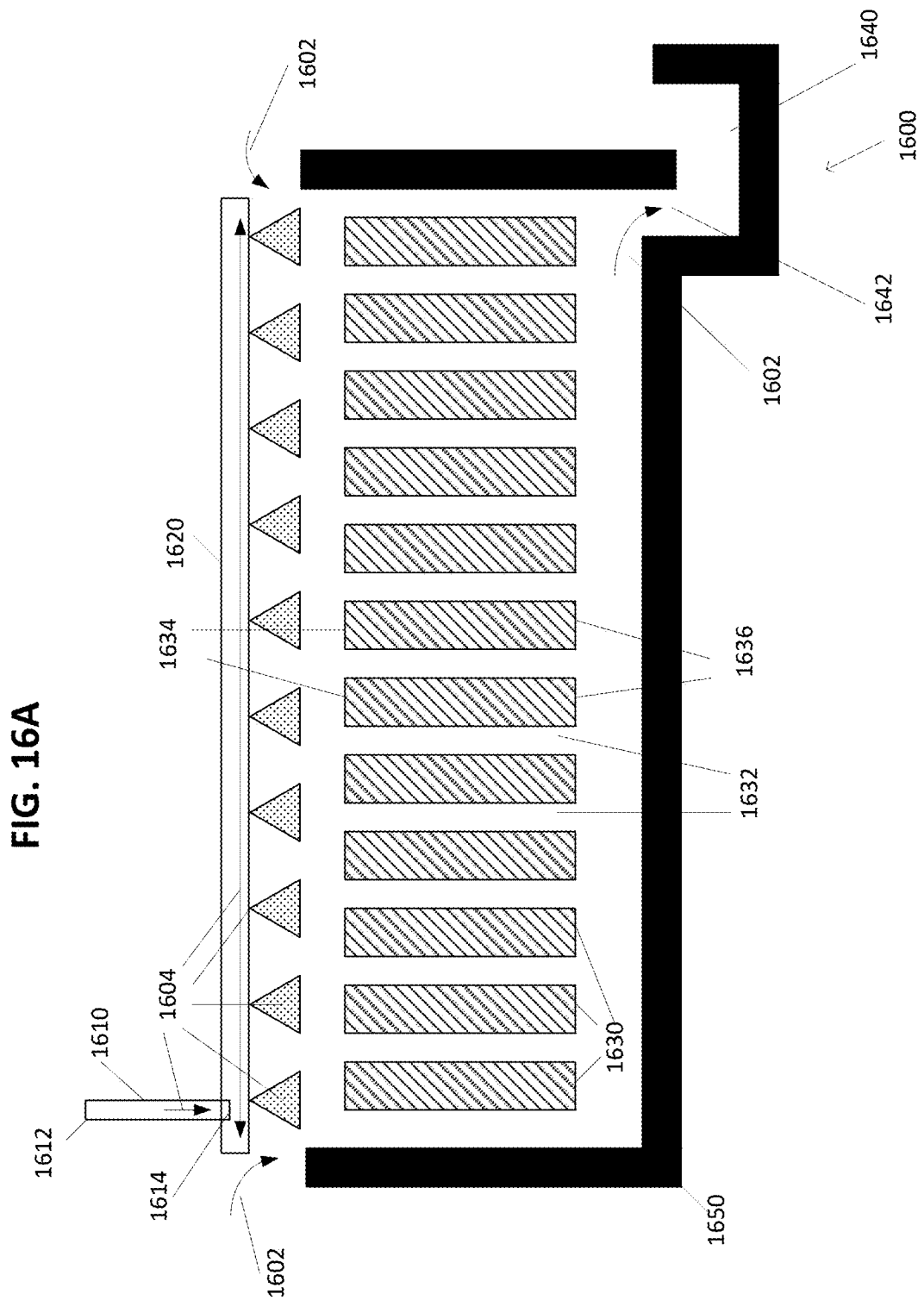
FIG. 16A is an illustration of a downflow hanging contactor media reactor.
Figure 16B:
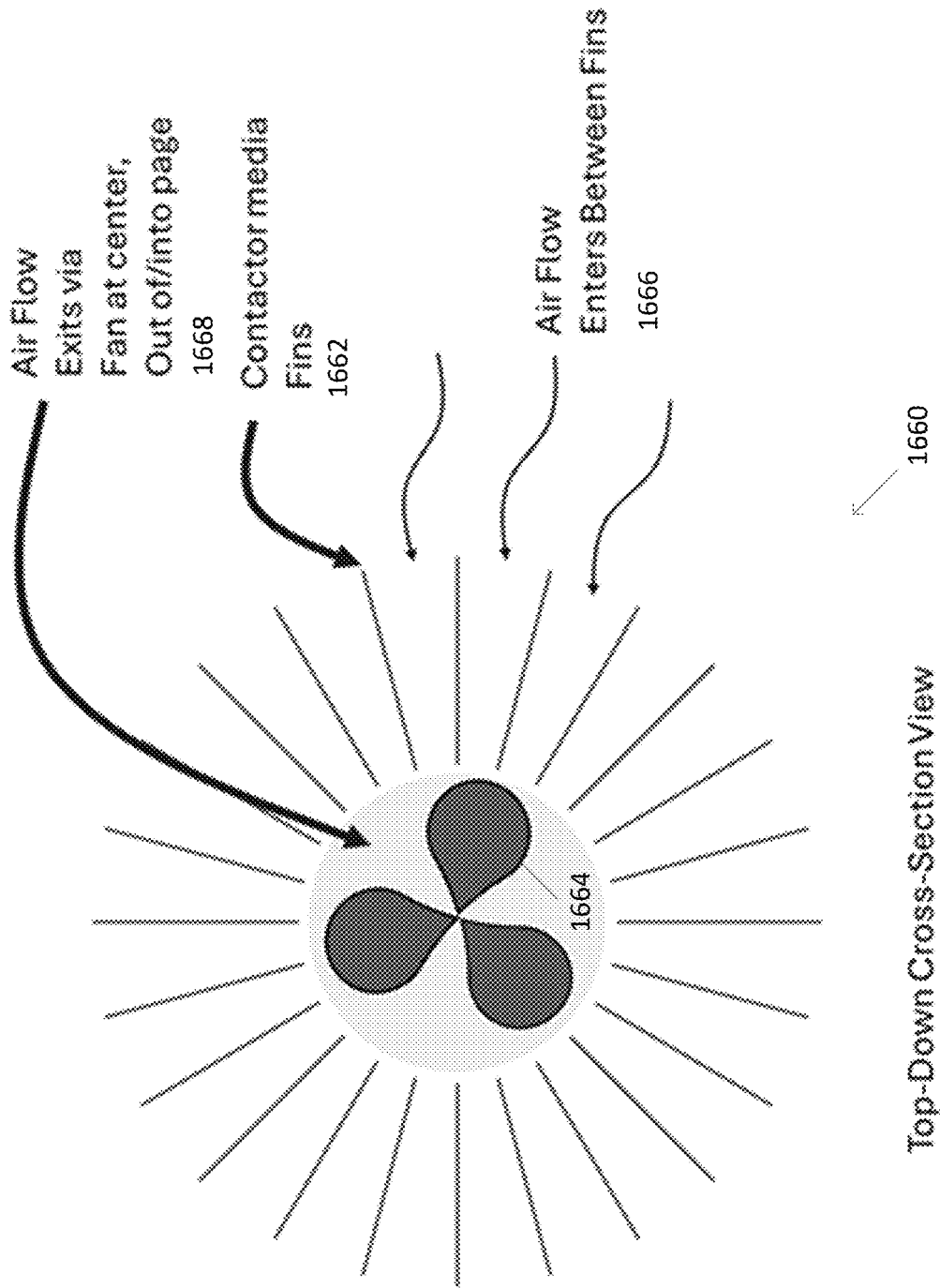
FIG. 16B is an illustration of a radial contactor media reactor.

Referring to FIG. 16A, a contactor media system 1600 is illustrated. The contactor media system 1600 may include an inlet pipe 1610 including a first end 1612 and a second end 1614. In some embodiments, the first end 1612 of the inlet pipe 1610 is connected to a liquid source. The second end 1614 of the inlet pipe may be connected to a liquid distributor 1620. The liquid distributor 1620 may be disposed on a first exterior surface 1634 of a plurality of contactor media 1630. The contactor media 1630 may be any of the contactor media disclosed herein. In some embodiments, the liquid distributor 1620 may be disposed above the plurality of contactor media 1630. The liquid distributor may be configured to apply or spray a liquid 1604 into the plurality of contactor media 1630. The plurality of contactor media may include a spacing 1632. The spacing 1632 may facilitate gas flow. In some embodiments, a collection structure 1640 is disposed on a second exterior surface 1636 of the plurality of contactor media. In other embodiments, the collection structure 1640 is disposed under the plurality of contactor media 1630. The second exterior surface 1636 may be disposed on an opposing side of the contactor media 1630 from the first exterior surface 1634. The collection structure 1640 may be configured to collect the liquid 1604. The liquid 1604 may flow through the contactor media into the collection structure 1640. In some embodiments, the collection structure 1640 includes at least one trough, bowl, tank, pipe, funnel, or other structure configured to collect liquid. The collection structure 1640 may be connected to a first end of an outlet pipe (not shown). In some embodiments, a second end of the outlet pipe may be configured to drain the liquid to a secondary reactor, structure, tank, or other liquid receiver. The plurality of contactor media 1630 may include any of the contactor media structures shown in FIGS. 1-15. In some embodiments, the plurality of contactor media 1630 are positioned within a housing 1650. The housing 1650 may be configured to receive a gas 1602. In some embodiments, the gas 1602 flows through the contactor media 1630 and interacts with the liquid 1604. The gas may flow out of the housing through a vent 1642.

FIG. 16B is an illustration of a radial contactor media reactor 1660. The illustration is a cross-sectional top-down view of the reactor 1660. The reactor 1660 includes a fan 1664 disposed in the center of a radial arrangement of contactor media fins 1662. The contactor media fins 1662 are contactor media as disclosed herein. In the reactor, gas (e.g., air) 1666 is pulled through the radial arrangement of contactor media fins 1662 by the fan 1664, facilitating mass transport between the gas and the liquid in the contactor media, and the gas 1668 flows out of the reactor 1660 via the center of the radial arrangement of contactor media fins 1662 through the fan 1664.

Where the contactor media is used for $CO_2$ capture, the gas flowed through the contactor media may include $CO_2$. Nonlimiting examples of the gas may include air in the atmosphere of earth, including atmospheric air in areas with greater emissions (e.g., landfills, agricultural sites), and flue gas. The mass transfer reaction between the liquid and the gas in the contactor media may remove $CO_2$ from the gas. The liquid may retain carbon extracted from the gas.

Where the contactor media is used for $CO_2$ capture, the liquid may include a $CO_2$ capture liquid including an ionic compound that can react with $CO_2$ gas. For example, the $CO_2$ capture liquid may include an amine, water, ionic liquid, glycerol, or metal hydroxides. Nonlimiting examples of the $CO_2$ capture liquid comprises MEA (monoethanolamine), DEA (diethanolamine), TEA (triethanolamine), MDEA(methyl diethanolamine), piperazine, glycine, $KVO_3$ (potassium metavanadate), KOH (potassium hydroxide), NaOH (sodium hydroxide), LiOH (lithium hydroxide), $Ca(OH)_2$ (calcium hydroxide), an amino acid, or a combination of any two or more thereof. For example, the liquid may be 0.5 M to 1.5 M (e.g, 1 M) NaOH or 0.5 M to 1.5 M (e.g, 1 M) KOH.

Figure 17:
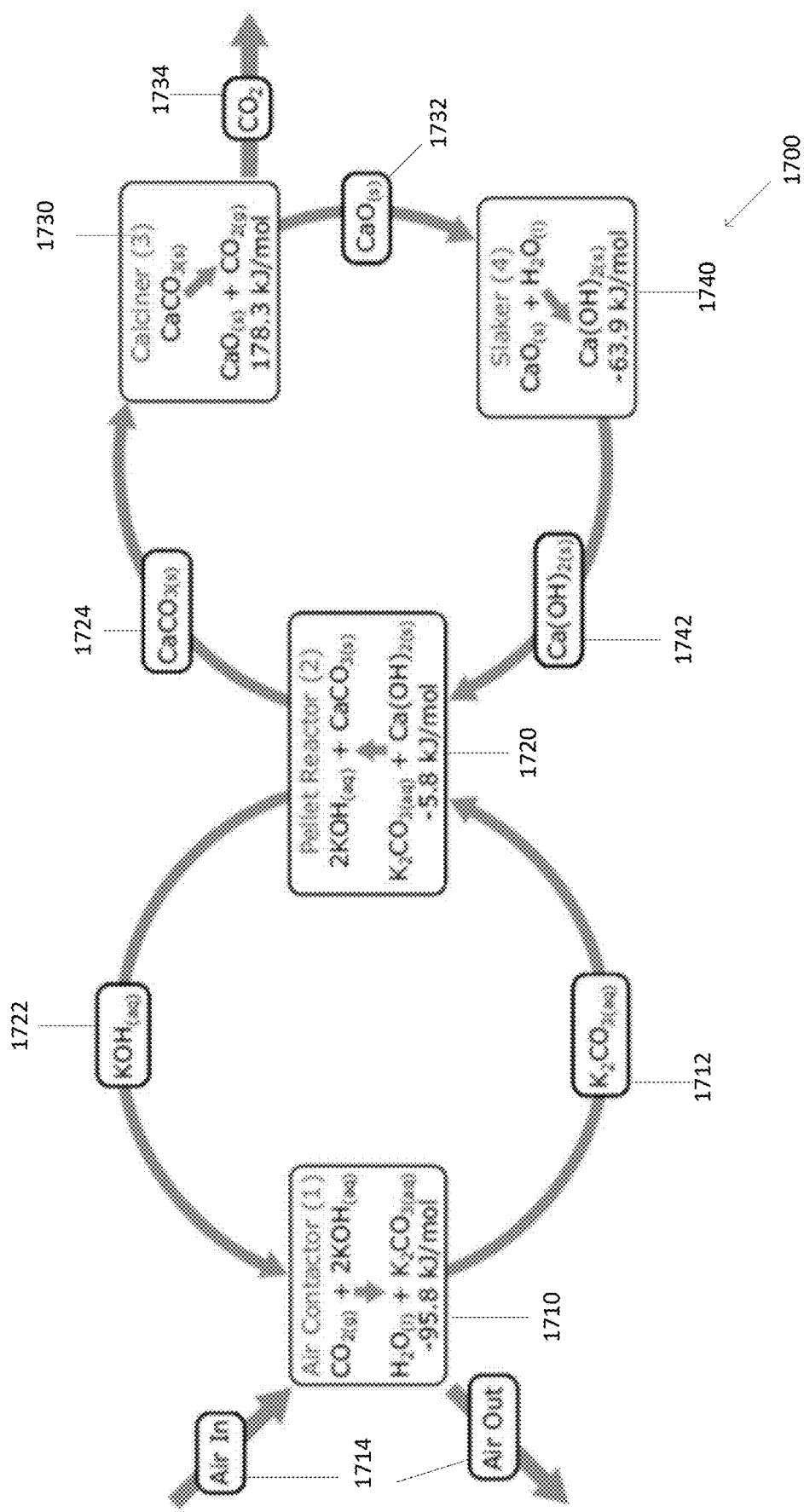
FIG. 17 is a reaction scheme for $CO_2$ capture in a metal hydroxide liquid used in liquid-air contactors.

Referring to FIG. 17, a reaction scheme 1700 for the reaction of $CO_2$ gas with a metal hydroxide is illustrated. The carbon capture process may include an air contactor reaction 1710, a pellet reactor reaction 1720, a calciner reaction 1730, and a slaker reaction 1740. The air contactor reaction 1710 may include gaseous carbon dioxide reacting with aqueous potassium hydroxide to form liquid water and aqueous potassium carbonate as shown below:

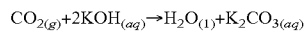

The pellet reactor reaction 1720 may include aqueous potassium carbonate reacting with solid calcium hydroxide to form aqueous potassium hydroxide and solid calcium carbonate precipitate as shown below:

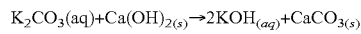

The calciner reaction 1730 may include calcium carbonate decomposing into calcium oxide and carbon dioxide. The slaker reaction 1740 may include calcium oxide and water as reactants in a formation reaction with a calcium hydroxide product. Alternatively, the slaker/calciner system may be replaced with an electrochemical cell and solids collector unit which is responsible for regeneration of the caustic $CO_2$ liquid absorbent.

In some embodiments, a potassium carbonate product 1712 from the air contactor reaction 1710 is transferred from an air contactor to a pellet reactor for use as a reactant in the pellet reactor reaction 1720. A potassium hydroxide product 1722 from the pellet reactor reaction 1720 may be transferred from the pellet reactor to the air contactor for use as a reactant in the air contactor reaction 1710. In some embodiments, a calcium carbonate product 1724 of the pellet reactor reaction 1720 may be transferred from the pellet reactor to a calciner for use as a reactant in the calciner reaction 1730. A calcium oxide product 1732 from the calciner reaction 1730 may be transferred from the calciner to a slaker for use as a reactant in the slaker reaction 1740. In some embodiments, a calcium hydroxide product 1742 of the slaker reaction 1740 may be transferred from the slaker 1740 to the pellet reactor for use as a reactant in the pellet reactor reaction 1720. In some embodiments, a carbon dioxide product 1734 of the calciner reaction 1730 is recycled from the calciner into the air contactor for use as a reactant in the air contactor reaction 1710. Air 1714 may flow through the air contactor to provide carbon dioxide as a reactant for the air contactor reaction 1710. Air 1714 may flow out of the air contactor.

Contactor Media Unit Cells

The contactor media as disclosed herein may include continuous surface segments with repeating unit cells as disclosed herein.

Figure 18:
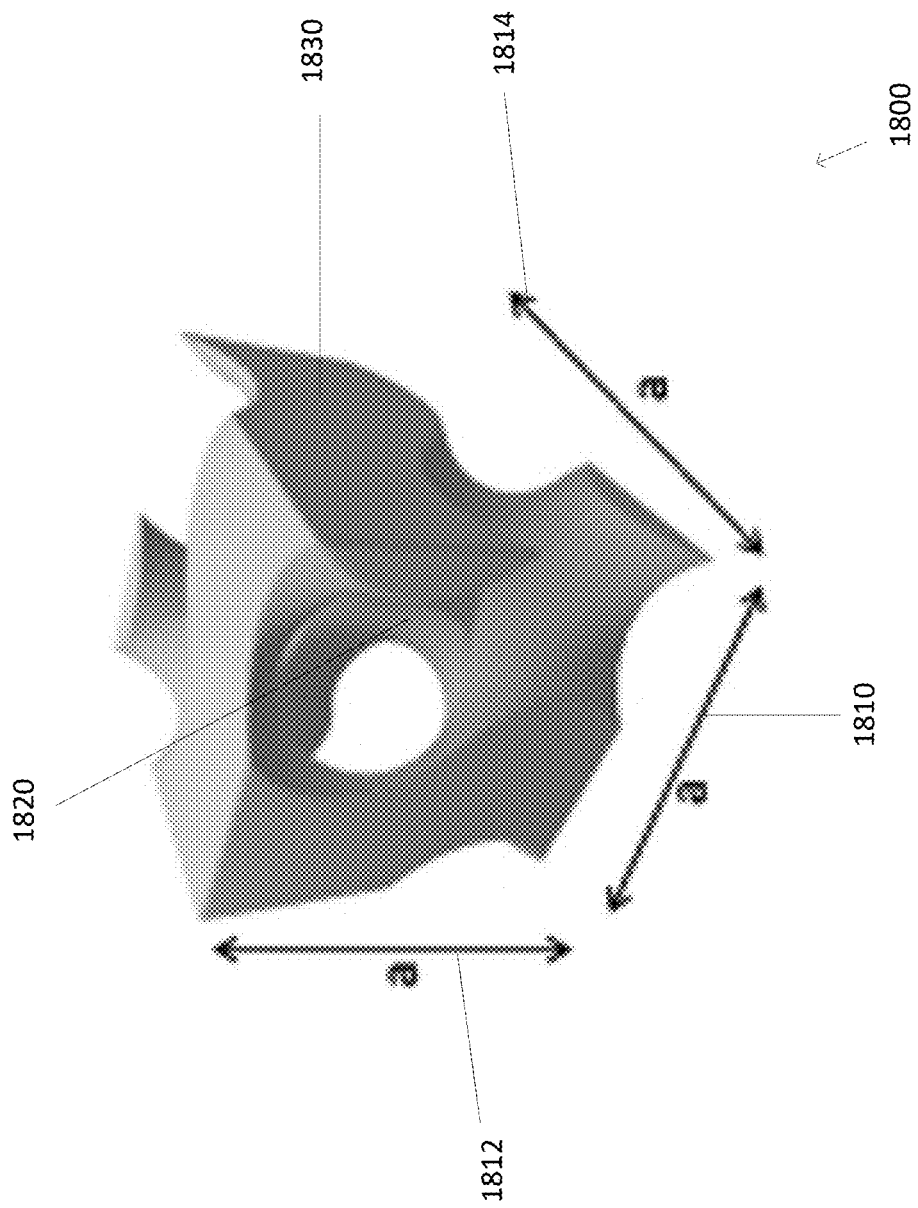
FIG. 18 is an illustration of a skeletal gyroid unit cell.

Referring to FIG. 18, a skeletal gyroid unit cell 1800 includes a first length along the x-axis 1810, a second length along the y-axis 1812, and a third length along the z-axis 1814. The skeletal gyroid unit cell 1800 may include a two-dimensional surface 1820. In some embodiments, a structure 1830 of the skeletal gyroid unit cell 1800 may include the contour of a zero-thickness surface. The structure 1830 of the skeletal gyroid unit cell 1800 may include a Gaussian curvature of −400 $mm^{-2}$ and −0.01 $mm^{-2}$. In some embodiments, the skeletal gyroid unit cell 1800 includes a minimal surface geometry.

Figure 19:
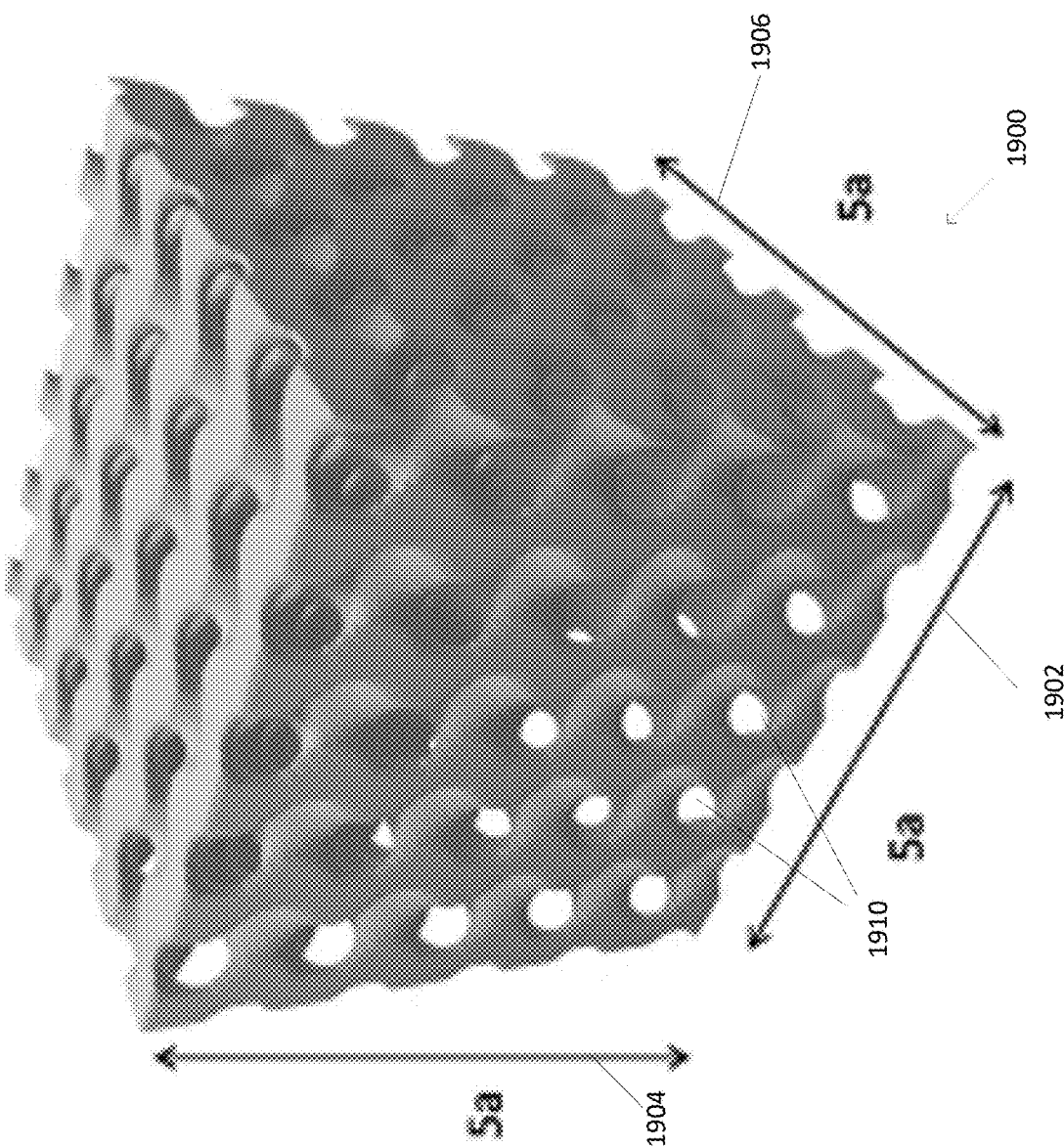
FIG. 19 is an illustration of a three-dimensional array of the skeletal gyroid unit cells of FIG. 18.

Referring to FIG. 19, a three-dimensional array 1900 of skeletal gyroid unit cells, as shown in FIG. 18, is illustrated. The three-dimensional array 1900 of skeletal gyroid unit cells may include a first length along the x-axis 1902, a second length along the y-axis 1904, and a third length along the z-axis 1906.

Figure 20:
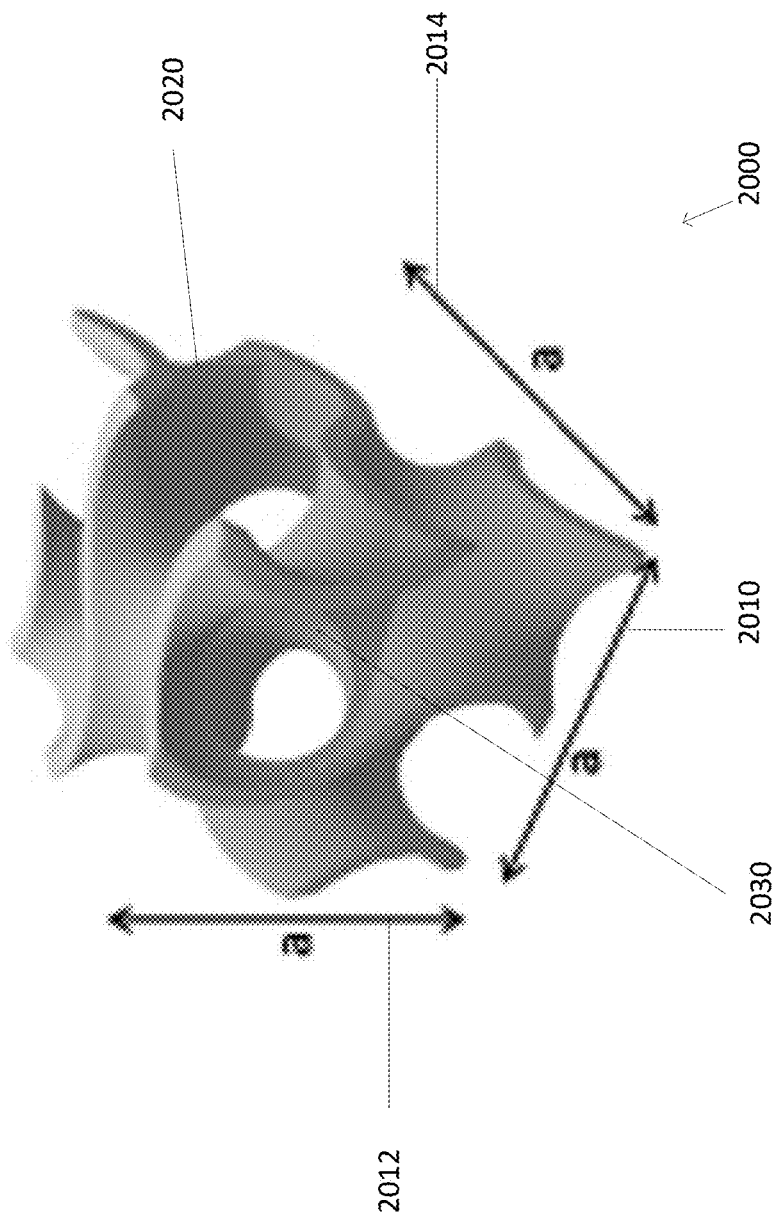
FIG. 20 is an illustration of a sheet gyroid unit cell comprising a continuous surface that provides second phase hold-up through surface wetting.

Referring to FIG. 20, a sheet gyroid unit cell 2000 includes a first length along the x-axis 2010, a second length along the y-axis 2012, and a third length along the z-axis 2014. The sheet gyroid unit cell 2000 may have a defined thickness. In some embodiments, the structure 2020 of the sheet gyroid unit cell may include a continuous surface with a given thickness 2030. The sheet gyroid unit cell 2000 may include a two-dimensional surface 2020. In some embodiments, a structure 2030 of the sheet gyroid unit cell 2000 may include the contour of a zero-thickness surface. The structure 2030 of the skeletal gyroid unit cell 2000 may include a Gaussian curvature of −400 mm$^{-2}$ and −0.01 mm$^{-2}$. The structure 2030 of the sheet gyroid unit cell 2000 may include a Gaussian curvature between -100 mm$^{-2}$ and 0 mm$^{-2}$. The sheet gyroid unit cell 2000 is an example of a minimal surface geometry.

Figure 21:
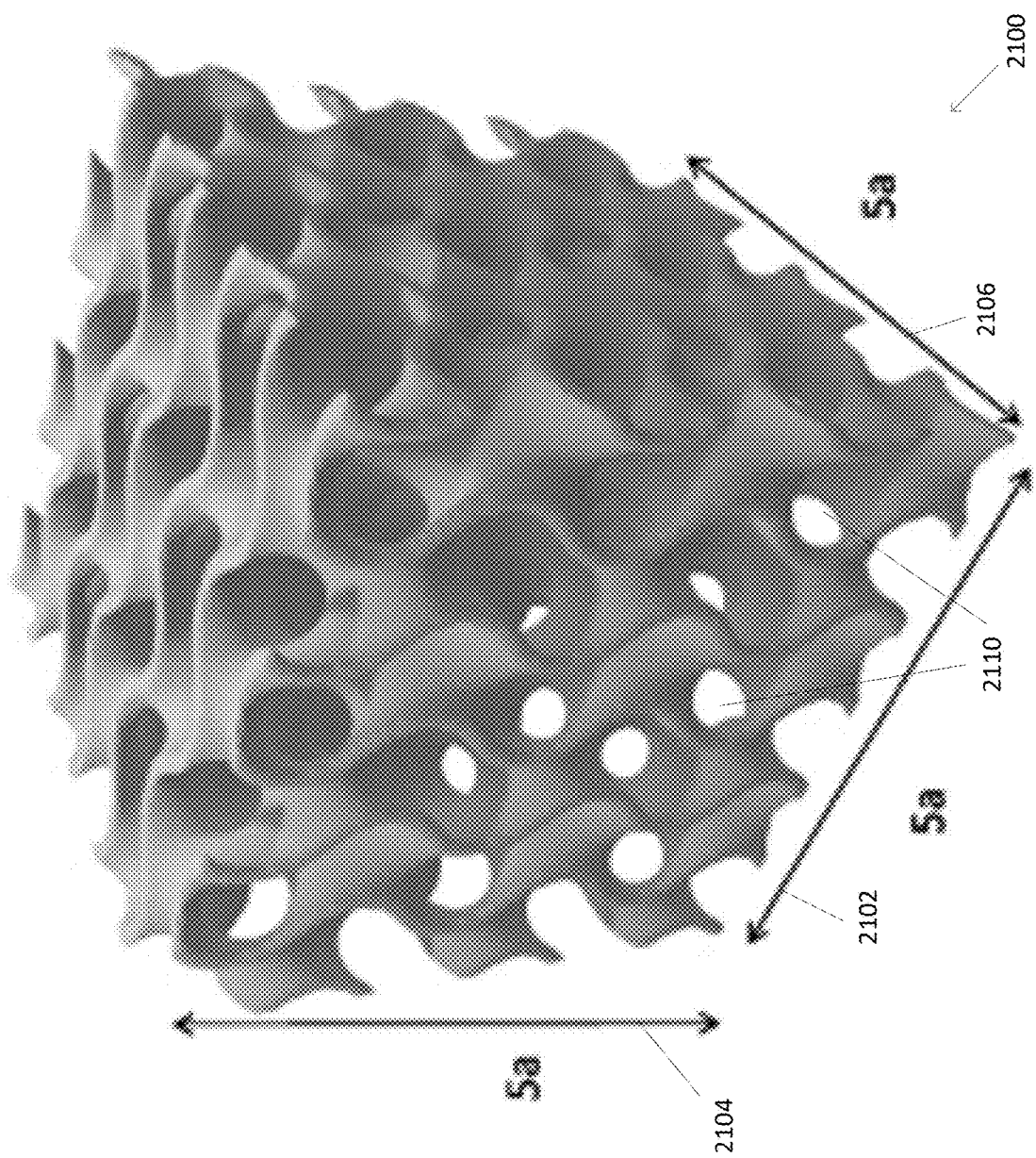
FIG. 21 is an illustration of a three-dimensional array of the sheet gyroid unit cells of FIG. 20.

Referring to FIG. 21, a three-dimensional array 2100 of sheet gyroid unit cells, as shown in FIG. 18, is illustrated. The three-dimensional array 2100 of sheet gyroid unit cells may include a first length along the x-axis 2102, a second length along the y-axis 2104, and a third length along the z-axis 2106. In some embodiments, the three-dimensional array 2100 of sheet gyroid unit cells includes continuous surface segments 2110 of the sheet gyroid unit cells shown in FIG. 18. The continuous surface segments 2110 may provide liquid hold-up capacity through surface wetting (e.g., capillary action). In some embodiments, at least 60 percent of the gyroidal continuous surface segments 2110 provide surface wetting for liquid hold-up.

Figure 22:
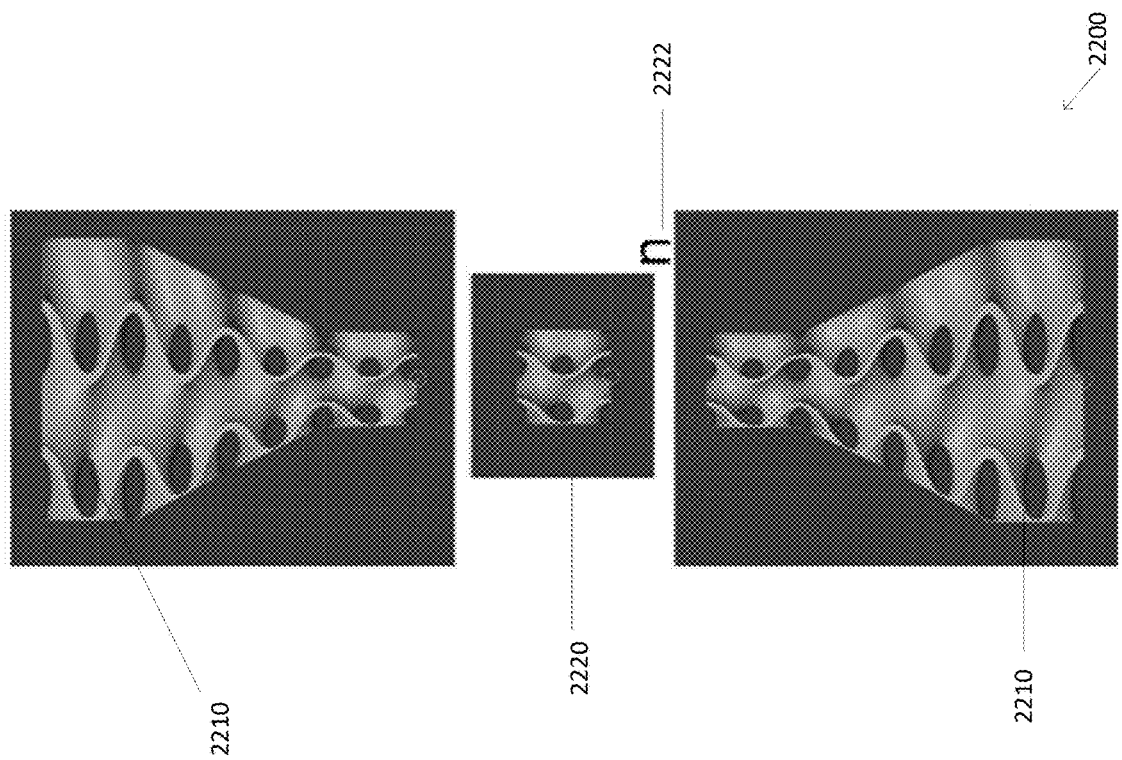
FIG. 22 is an illustration of three gyroid unit cells that may be used to form an I-beam-shaped structure.

Referring to FIG. 22, an illustration of gyroid unit cells 2200 configured to form an I-beam structure is shown. In some embodiments, the gyroid unit cells 2200 are configured to form the I-beam sheet contactor media shown the FIG. 9. The gyroid unit cells 2200 may include a first gyroid unit cell 2210 and a second gyroid unit cell 2220. As described in the FIG. 9 description, a first end of an I-beam structure may include the first gyroid unit cell 2210. A second end of the I-beam structure may also include the first gyroid unit cell 2210. In some embodiments, a middle portion of the I-beam structure includes at least one second gyroid unit cell 2220. The number (n) 2222 of second gyroid unit cells 2220 may determine a height of the I-beam structure.

Figure 23:
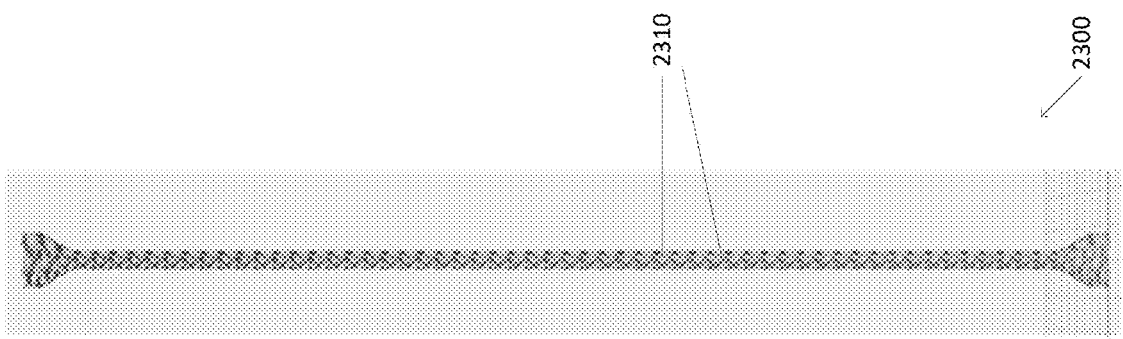
FIG. 23 is an illustration of an I-beam-shaped contactor media comprising a continuous surface that provides second phase hold-up through surface wetting. The I-beam-shaped contactor media is a unit cell with a continuous surface that repeats as multiple units are proximally placed; this can be leveraged to create a large block/assembly of contactor media, as in FIG. 10, which is one continuous surface.

Referring to FIG. 23, an illustration of an I-beam 2300 configured to be arrayed in a two-dimensional pattern to form a gyroid sheet contact medium is shown. The I-beam 2300 may include the gyroid unit cells shown in FIG. 22. The I-beam 2300 may include minimal surface geometry. In some embodiments, the I-beam 2300 may include surface features 2310 described in previous figure descriptions. The I-beam 2300 may include a length defined by a number of unit cells. In some embodiments the dimensions of the unit cells may be distorted to allow for smaller or larger openings (1 mm to 100 mm) through which a gas phase may pass. In some embodiments, the outer dimensions of the unit cell may result in a volume ranging from 0.01 m$^3$ to 1 m$^3$. In some embodiments, there may be additional 'fins' per unit volume of bulk contactor media, increasing the total amount of active surface area and correspondingly both total and static liquid hold-up in the aforementioned ranges.

Contactor Media with Liquid Distribution

Figure 24:
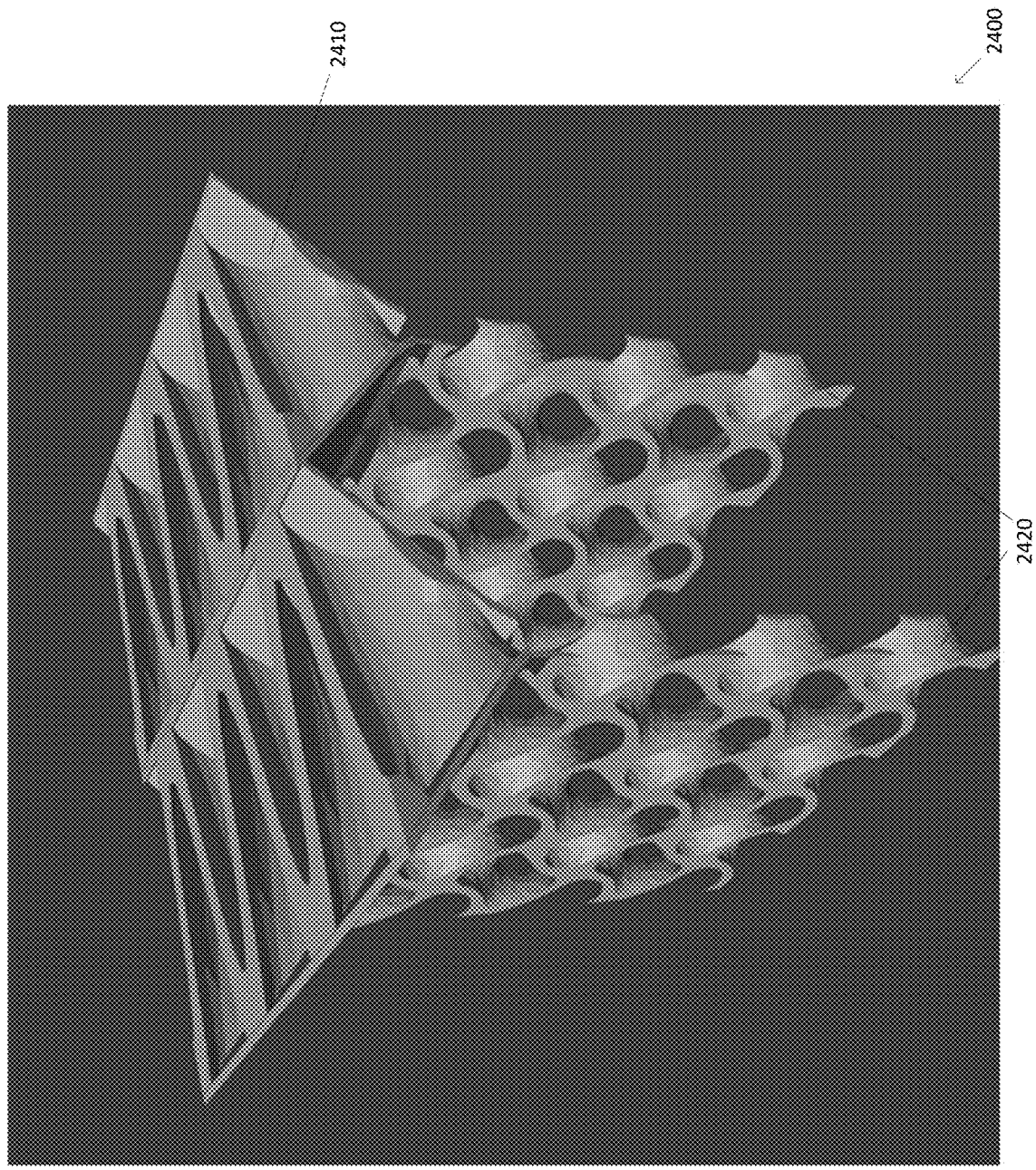
FIG. 24 is an illustration of a second phase distributor disposed on a second phase introduction side of a gyroidal contactor media configured to direct second phase into the gyroidal contactor media.

Referring to FIG. 24, an illustration of a liquid distributor 2400 disposed on a liquid introduction side of a gyroidal contactor media configured to funnel liquid into the gyroidal contactor media is shown. The liquid distributor may include a funnel structure 2410 and contactor media 2420. In some embodiments, the funnel structure 2410 is configured to collect liquid and facilitate liquid flow into the contactor media 2420. The liquid distributor 2400 may include features of liquid distributors described in previous figure descriptions. The contactor media 2420 may include features of contactor media described in previous figure descriptions. The liquid distributor 2400 may be formed using the same processes as are used to form the contactor media 2420, and the liquid distributor 2400 may be directly disposed and continuous with the contactor media 2410. The liquid distributor 2400 may provide control over liquid flow rates, control over contactor media 2420 wetting methods, and even distribution of the liquid across the contactor media 2420. Excess fluid may be transferred (e.g., laterally through internal pores) from one contactor medium continuous surface segment to another. In some embodiments, fluid transfer prevents dry areas from forming in contactor media 2420. In some embodiments, fluid transfers in a more even distribution of fluid across the contactor media 2420.

Figure 25:
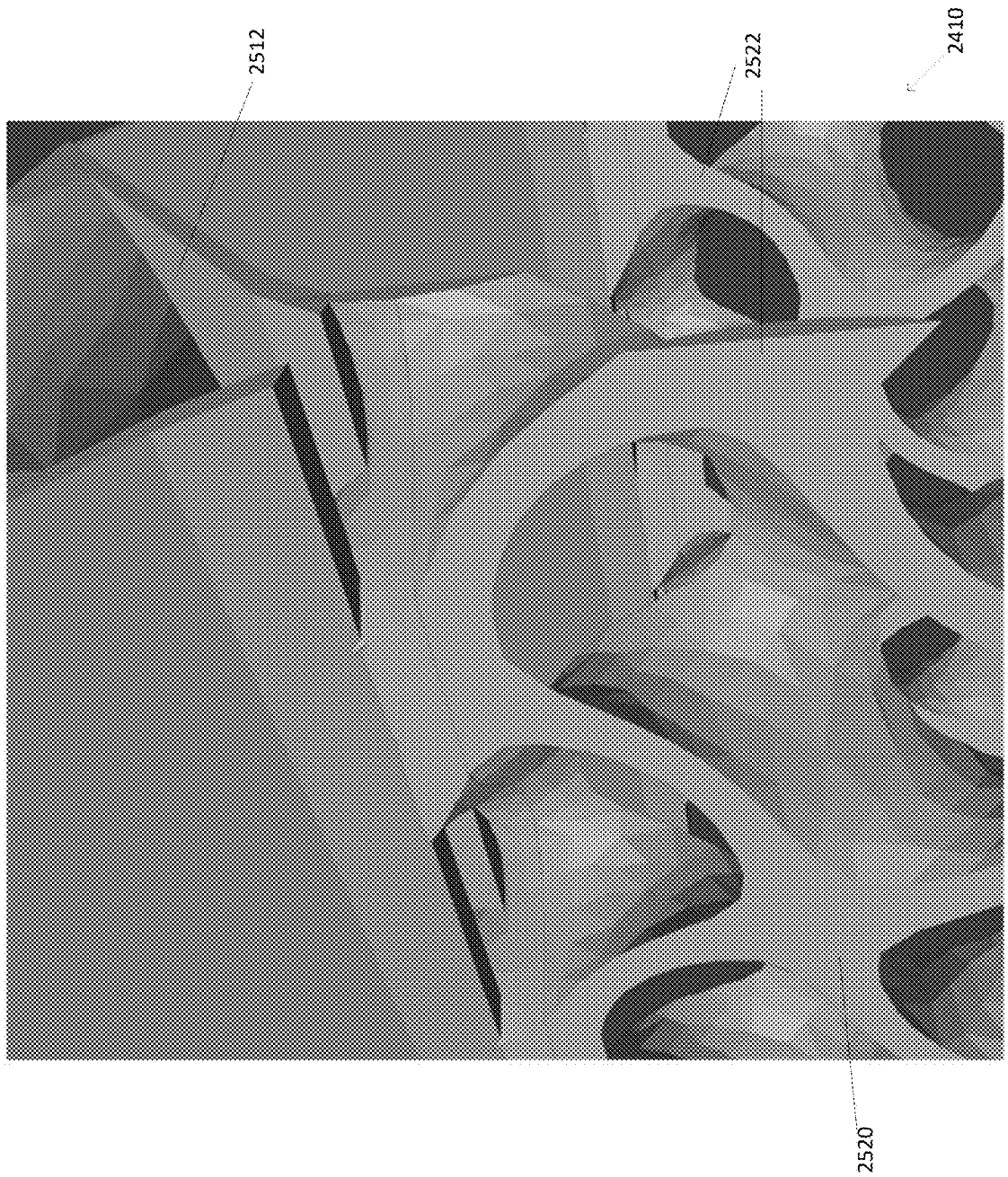
FIG. 25 is another view of the liquid distributor of FIG. 24.

Referring to FIG. 25, an illustration of the funnel structure 2410 of the liquid distributor of FIG. 24 disposed within the liquid distributor disposed on a liquid introduction side of contactor media 2520 is shown. The liquid distributor may be configured to receive a liquid. In some embodiments, the liquid distributor includes a funnel 2512. The funnel 2512 may be configured to direct liquid flow into the contactor media 2520. The liquid distributor may include features of liquid distributors described herein. The contactor media 2520 may also include features of contactor media described herein.

Referring to FIG. 26A, an illustration of a contactor media 2600 with a distributor layer 2610. The distributor layer 2610 includes a distribution inlet 2600 configured to transfer liquid laterally through the distributor layer 2610, as shown in FIG. 26B. The arrows 2660 in FIG. 26B indicate flow of a liquid into the distribution inlet 2600 and laterally across the distributor layer 2610, before entering sheets 2616 of the contactor media. The distributor layer 2610 is geometrically configured to evenly distribute liquid through the contactor media 2600, and may provide lateral liquid flow directions. The contactor media 2600 is formed of a gyroidal continuous surface for increased liquid hold-up.

The distributor layer 2610 may be formed of the repeating unit cells 2210 in FIG. 22, forming the upper section of the I-beam contactor media 2300 in FIG. 23. Because of the lateral distribution inlets in the distributor layer 2610, the distributor layer 2610 provides for lateral re-distribution of liquid to provide more uniform wetting in the I-beam contactor media 2300.

Figure 27B:
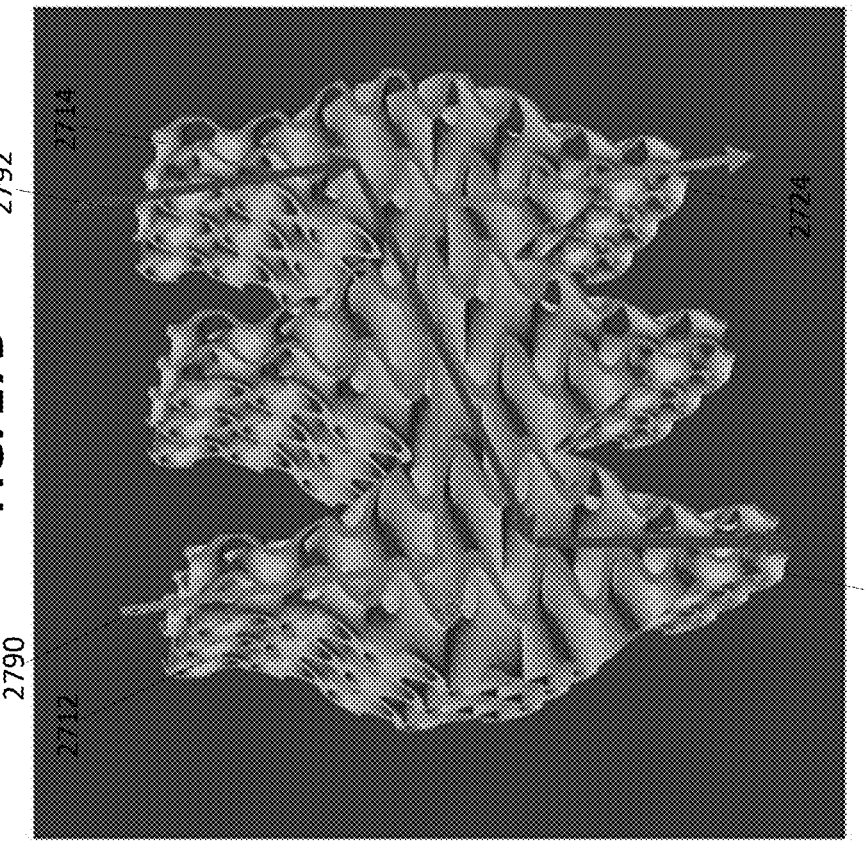
FIG. 27B is an illustration of the contactor media in FIG. 27A showing second phase flow directions.
Figure 27A:
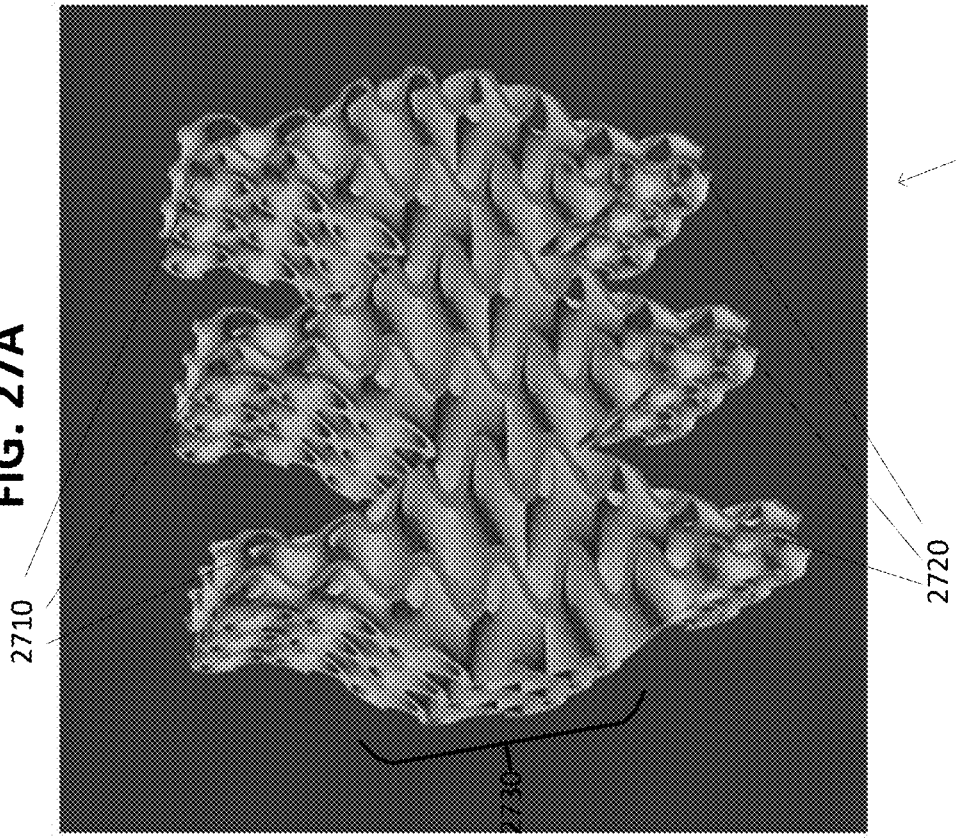
FIG. 27A is an illustration of a second phase distributor mid-layer configured to direct second phase flow laterally between regions of contactor media.

Referring to FIG. 27A, an illustration of a liquid distributor mid-layer 2700 configured to transfer liquid laterally in a contactor media is shown. The liquid distributor mid-layer 2700 includes a distributor layer 2730, a plurality of inlets 2710, and a plurality of outlets 2720. The liquid distributor mid-layer 2700 may be configured to mix heavier flows with lighter flows to evenly distribute liquid flow in the liquid distributor mid-layer 2700 and/or the contactor media.

Referring to FIG. 27B, an illustration of lateral liquid transfer in the liquid distributor mid-layer 2700 is shown. The liquid distributor mid-layer 2700 may transfer an incoming liquid 2790 from a first inlet 2712 to a first outlet 2724 disposed in another segment of the distributor mid-layer. The liquid distributor mid-layer 2700 may transfer an incoming liquid 2792 from a second inlet 2714 to a second outlet 2722 disposed in another segment of the distributor mid-layer. Transferring the liquid 2790 between segments of contactor media may evenly distribute fluid flow throughout the liquid distributor 2700 or external contactor media. In some embodiments, solute-rich streams may be mixed with dilute streams.

The liquid distributor mid-layer 2700 may be disposed between arrays of the continuous surface segments of the contactor media. For example, the liquid distributor mid-layer 2700 may be disposed at a midpoint of the contactor media, or at several intervals throughout the contactor media. The liquid distributor mid-layer 2700 may be configured to re-distribute liquid flow throughout the plurality of continuous surface segments. The liquid distributor midlayer 2700 may serve to mix the fluid throughout the media to prevent the evolution of liquid flow which favors a certain area of the contactor media, and/or avoids dry pockets of the contactor media from receiving liquid.

Contactor Media with Directed Liquid Flow

The contactor media may be configured to retain the liquid within the contactor media. The contactor media may have a geometry configured to direct liquid flow. For example, the contactor media may have a geometry to retain the liquid when the contactor media is positioned in a first rotation orientation and facilitate flow of the liquid when the contactor media is positioned in a second rotation orientation. The first rotation orientation may include a 90-degree rotation about a singular axis from the second rotation orientation.

Figure 28C:
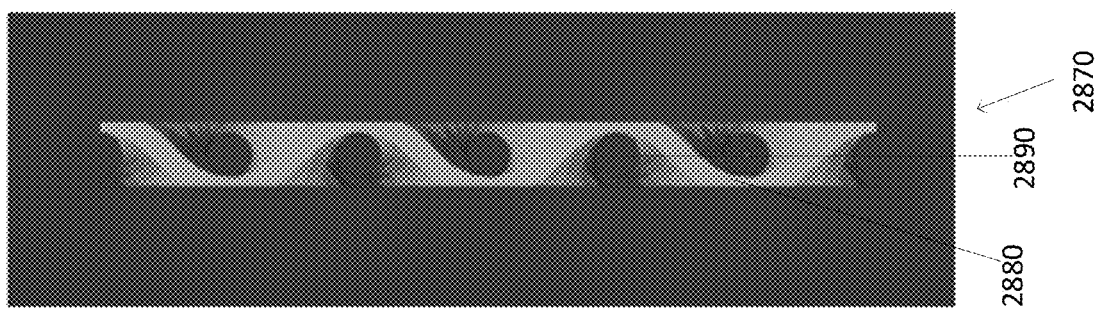
FIG. 28C is an illustration of a top view of the contactor media of FIG. 28A.
Figure 28B:
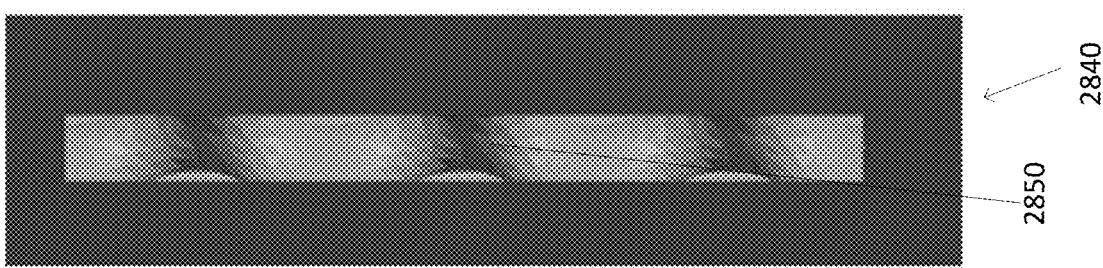
FIG. 28B is an illustration of an axial view of the contactor media of FIG. 28A.
Figure 28A:
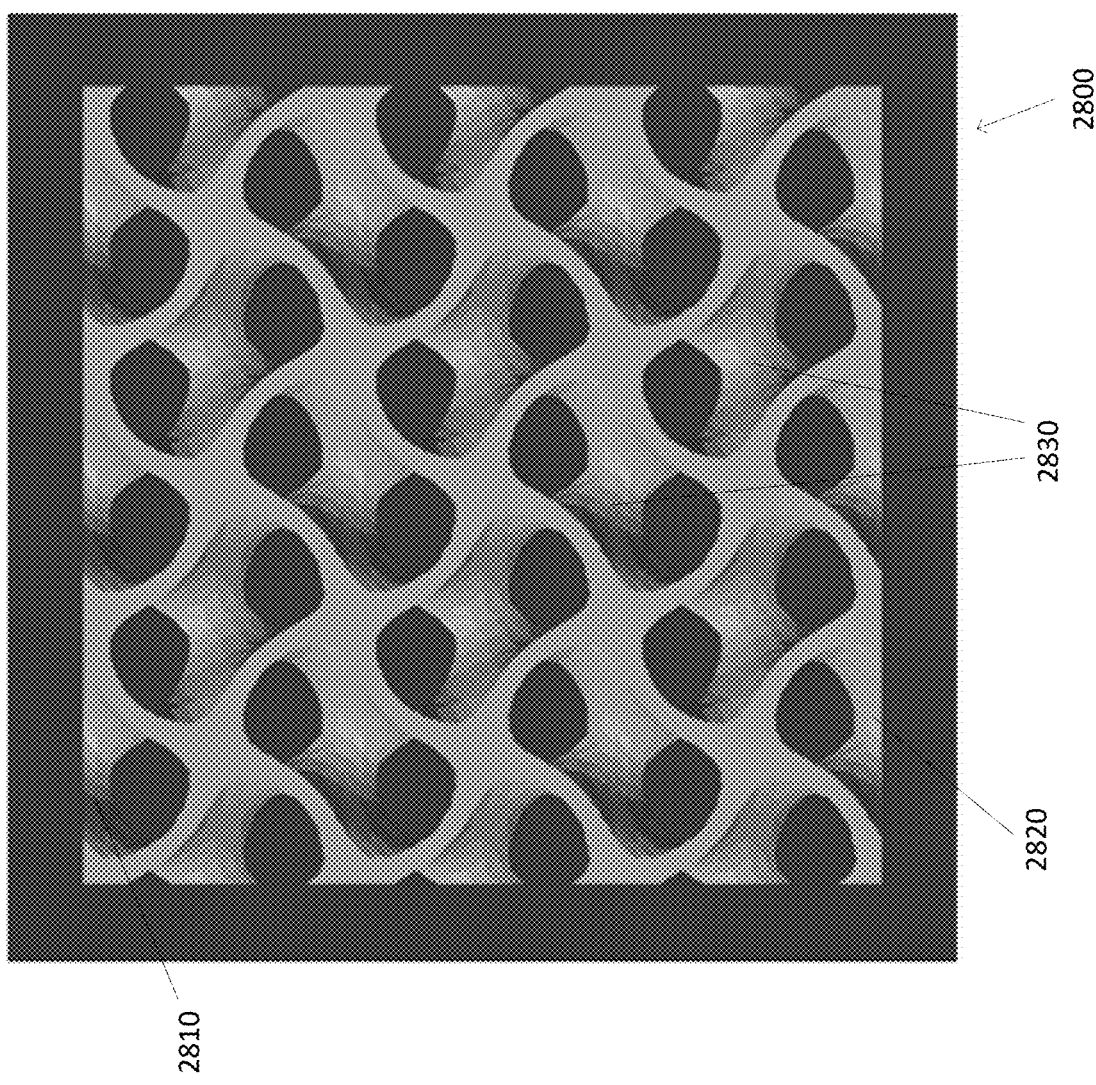
FIG. 28A is an illustration of a radial view of a contactor media comprising a continuous surface that provides second phase hold-up through surface wetting configured to direct second phase vertically.

Referring to FIG. 28A, an illustration of a radial view of a gyroidal contactor media 2800 configured to drain liquid vertically is shown. Flow control within the liquid distributor embodiments shown in FIGS. 24-27 may be facilitated by the contactor media 2800. Contactor media 2800 may provide a liquid flow path configured to allow liquid to flow through the contactor media in a predetermined direction. In some embodiments, gravitational forces may generate liquid flow from a first end 2810 of the contactor media 2800 to a second end 2820 of the contactor media 2800. The gyroid unit cell may include surface features 2830 that create the flow path from the first end 2810 to the second end 2820. In some embodiments, liquid flows from a top side of the contactor media to a bottom side of the contactor media.

Referring to FIG. 28B, an illustration of an axial view 2840 of the contactor media of FIG. 28A configured to drain liquid vertically is shown. An axial side 2850 of the contactor media may be substantially flat and may block a flow path. The axial side 2850 may include a barrier configured to prevent liquid flow. In some embodiments, the axial side 2850 does not allow liquid to flow out of the axial side 2850 of the contactor media.

Referring to FIG. 28C, an illustration of a top view 2870 of the contactor media of FIG. 28A configured to drain liquid vertically is shown. In some embodiments, a top side 2880 of the contactor media includes surface features 2890. The top side 2880 of the contactor media may be porous. In some embodiments, the surface features 2890 on the top side 2880 of the contactor media facilitate liquid flow through the top side 2880 of the contactor media.

Figure 29C:
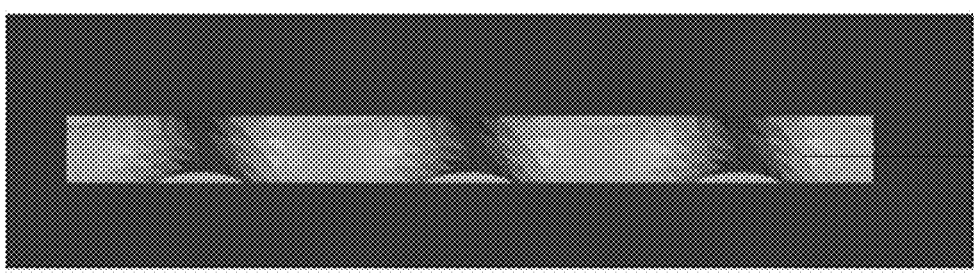
FIG. 29C is an illustration of a top view of the contactor media of FIG. 29A.
Figure 29B:
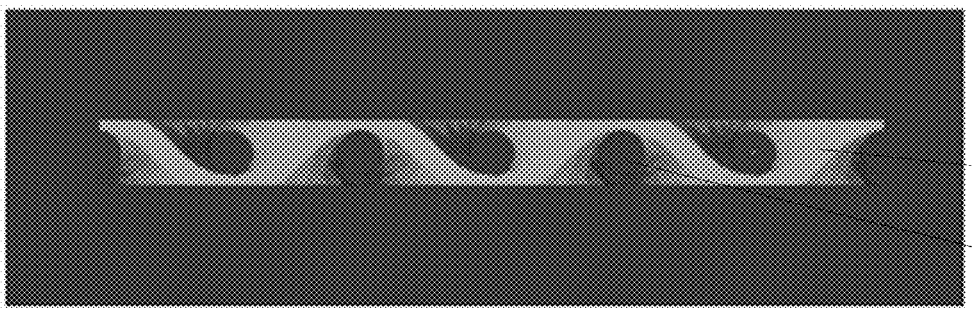
FIG. 29B is an illustration of an axial view of the contactor media of FIG. 29A.
Figure 29A:
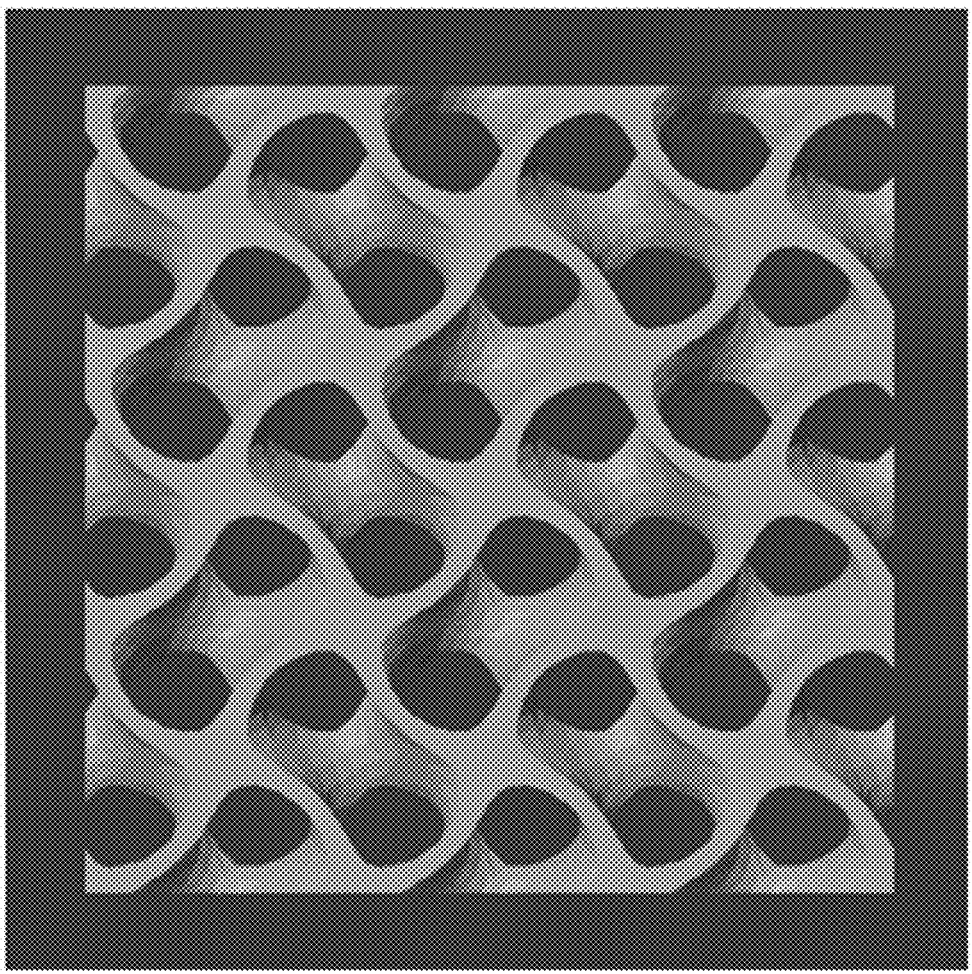
FIG. 29A is an illustration of a radial view of a contactor media comprising a continuous surface that provides second phase hold-up through surface wetting configured to direct second phase horizontally.

Referring to FIG. 29A, an illustration of a radial view of a contactor media 2900 configured to retain liquid is shown. In some embodiments, the contactor media 2900 is a 90-degree rotation of the gyroid unit cell shown in FIG. 28A. Therefore, liquid may not flow in a gravitational direction. Rather, the liquid may flow in a radially direction to gravitational forces. The contactor media may facilitate lateral liquid flow as shown in the liquid distributor embodiments shown in FIGS. 24-27. By changing the orientation of the contactor media, the contactor media may facilitate liquid retention.

Referring to FIG. 29B, an illustration of an axial view 2940 of the contactor media of FIG. 29A configured to retain liquid is shown. In some embodiments, an axial side 2950 of the contactor media includes surface features 2960. The axial side 2950 of the contactor media may be porous. In some embodiments, the surface features 2960 on the axial side 2950 of the contactor media facilitate liquid flow through the axial side 2950 of the contactor media.

Referring to FIG. 29C, an illustration of a top view 2970 of the contactor media of FIG. 29A configured to retain liquid is shown. A top side 2980 of the contactor media may be substantially flat and may block a flow path. The top side 2980 may include a barrier configured to prevent liquid flow. In some embodiments, a substantially flat bottom side may not allow liquid to flow out of the bottom side of the contactor media. Because gravitational forces may pull liquid from the top side 2980 to the bottom side, blocking the flow path from the top side 2980 to the bottom side may cause the contactor media to retain liquid. In some embodiments, the contactor media blocks liquid flow in one direction and facilitates liquid flow in another direction. By orienting contactor media in a particular direction, the contactor media may direct the path of liquid flow.

Comparing the two contactor media geometries in FIGS. 28A-28C and FIGS. 29A-29C, respectively, reveals different liquid hold-up values. When the contactor media is used as a gas-liquid contactor media, with an air flow frontal velocity of 1.5 m/s through the contactor media, and a 1 M KOH liquid flow of 0.5 $L \cdot s^{-1} \cdot m^{-2}$, the observed static liquid hold-up for the contactor media in FIGS. 28A-28C was about 35% of the total liquid hold-up. In comparison, under the same conditions, the observed static liquid hold-up for the contactor media in FIGS. 29A-29C was greater than 90% of the total liquid hold-up. These two contactor media used the same contactor media materials, liquids, surface treatments, where the only difference was the geometry.

Figure 30B:
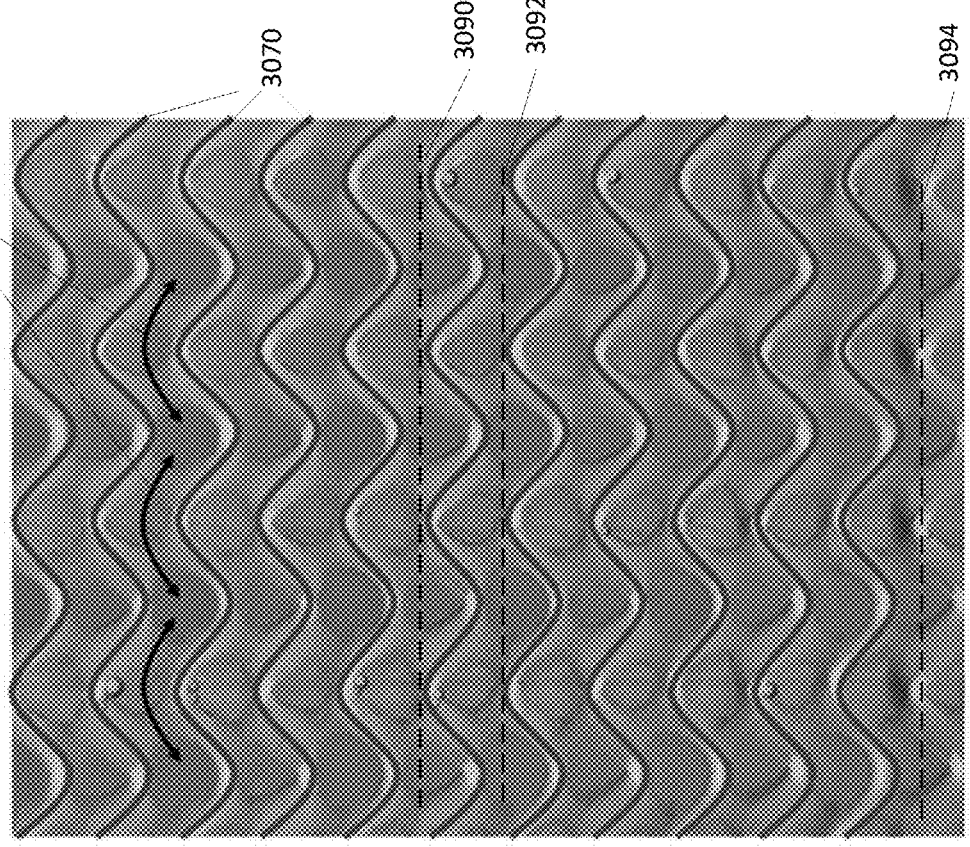
FIG. 30B is the photograph of FIG. 30A with notations indicating the liquid flow paths (black arrows) and liquid flow barriers (red (alternatively light grey) sine-wave lines) of the contactor media.
Figure 30A:
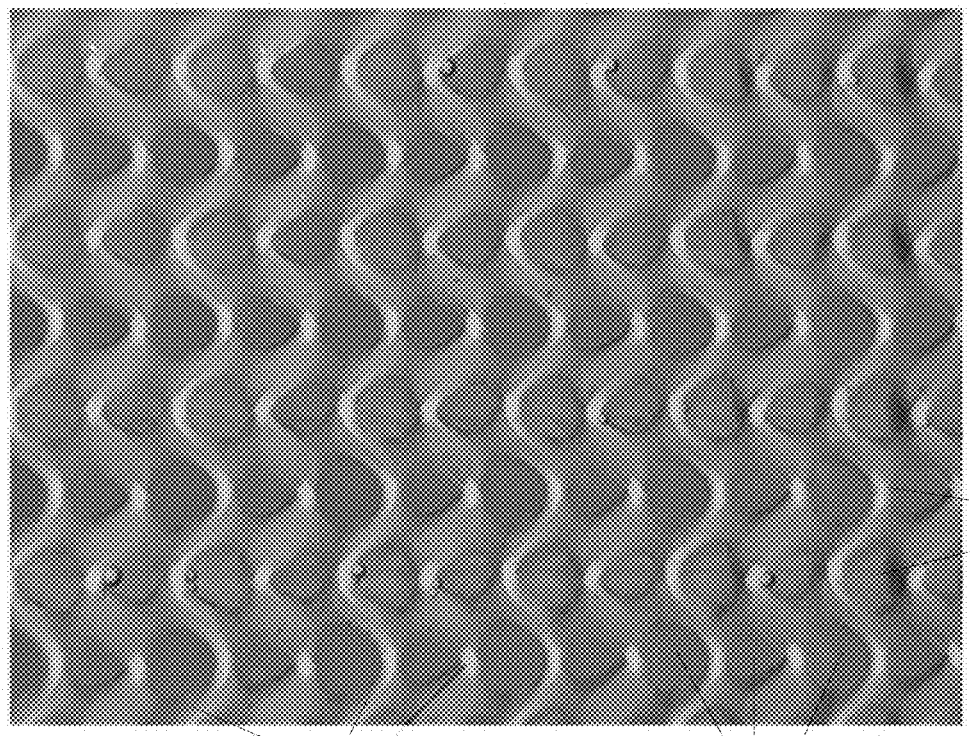
FIG. 30A is a photograph of the contactor media of FIG. 29A retaining liquid. The contactor media appears blue (alternatively identified by darker grey shading) due to static liquid hold-up of a liquid including blue dye for visualization.

Referring to FIG. 30A, a photograph of a contactor media 3000 retaining liquid is shown. The contactor media 3000 may include surface features 3010. In some embodiments, the surface features 3010 include a plurality of cavities 3012 and a plurality of barriers 3014. The plurality of cavities 3012 may be configured to retain liquid. In some embodiments, the plurality of cavities 3012 may be interconnected across the surface media to create longer connected channels which may facilitate liquid flow. The barriers 3014 may be configured to obstruct liquid flow. In some embodiments, the barriers 3014 restrict fluid flow to a lateral direction.

Referring to FIG. 30B, a photograph illustrating liquid flow paths 3080 and liquid flow barriers 3070 of a contactor media 3000 shown in FIG. 30A is shown. Liquid may flow in a liquid flow path 3080 axial to the barriers 3070. The barriers 3070 may include a corrugated structure configured to facilitate liquid retention and slow liquid flow. In some embodiments, the barriers 3070 are configured to facilitate a dropping method. The dropping method may include adding a first drop of liquid to a top domain of the contactor media. In some embodiments, the dropping method further includes a chain reaction causing a second drop of liquid to be displaced out of a first barrier plane 3090, falling into a second barrier plane 3092 and displacing a third drop of liquid out of the second barrier plane 3092. The dropping method may further include displacing a singular liquid drop out of a bottom barrier plane 3094.

The present invention, thus generally described, will be understood more readily by reference to the following examples, which are provided by way of illustration and are not intended to be limiting of the present invention.

EXAMPLES

Example 1

A contactor media was formed having a gyroidal continuous surface. The gyroidal continuous surface formed a plurality of channels with a bilobed-shaped (e.g., peanut-shaped) cross-section for liquid holdup. The gyroidal continuous surface had a sheet gyroid unit cell that followed the contour of a zero-thickness surface having a Gaussian curvature ("Gc") of $-100$ mm$^{-2} \leq G_c < 0$ mm$^{-2}$. The wall thickness of the gyroidal continuous surface was about 300 µm. The contactor media had the macroscopic shape of a rectangular prism.

The contactor media was printed using stereolithography 3D printing, where light was used to cure liquid resin in a layer-by-layer fashion. The surface of the contactor media had features of about 50 µm diameter as a result of the pixel size of the 3D printing process.

Liquid holdup experiments were conducted using water mixed with blue food coloring to visualize liquid holdup. The contactor media was saturated with the liquid media at time 0 and then photographs of the contactor media were taken at different time points to determine liquid holdup over time.

Referring to FIG. 31A, a photograph of contactor media saturated with the liquid at time 0 is shown. FIG. 31B shows a photograph of the contactor media of FIG. 31A retaining liquid at 45 minutes after saturation with said liquid. The contactor media appears blue (alternatively identified by darker grey shading) due to static liquid hold-up of a liquid including blue dye for visualization, where the darker regions indicate liquid holdup in the contactor media. At 45 minutes, a portion of the liquid had been removed from the contactor media due to the force of gravity, as indicated by the lighter region 3114 of the contactor media at the top of the rectangular prism. In addition, a small amount of the liquid had evaporated from the contactor media, as indicated by the non-uniform arrangement of lighter regions of the contactor media. FIG. 31C is a photograph of the contactor media retaining liquid at 95 minutes after saturation with the liquid. At this time, a greater amount of the liquid had been removed from the contactor media by evaporation, but still greater than 75% of the liquid remains, demonstrating the contactor media has a static liquid hold-up of at least 75% at times greater than 60 minutes after saturation. FIG. 31D is a photograph of the contactor media retaining liquid at 135 minutes after saturation with the liquid. At this time, a greater amount of the liquid had evaporated from the contactor media, as indicated by the greater regions of non-uniformity of lighter regions of the contactor media. FIG. 31E is a photograph of the contactor media retaining liquid at 205 minutes after saturation with the liquid. At this time, a larger amount of the liquid had evaporated from the gyroid film.

Figure 32:
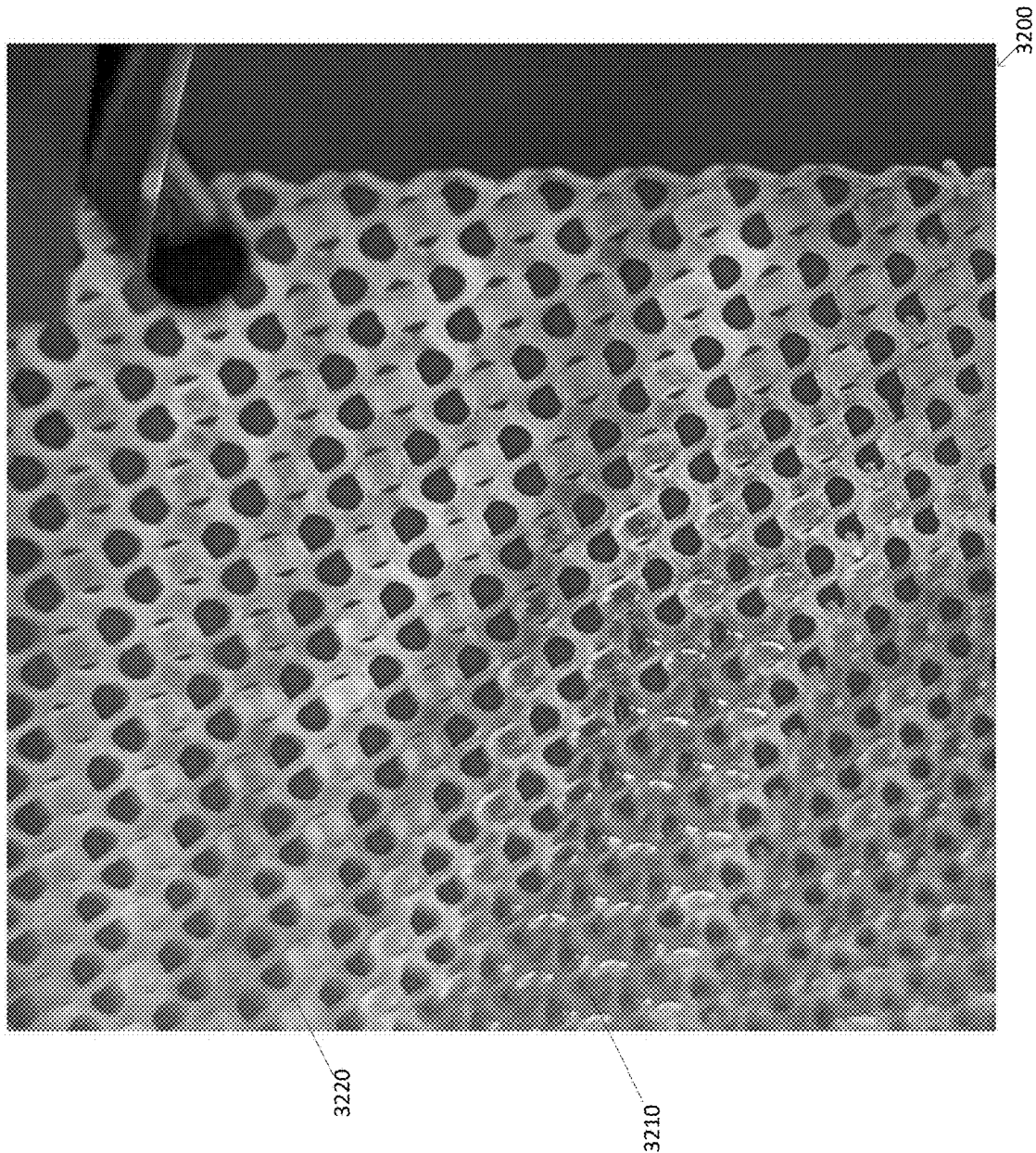
FIG. 32 is a photograph of evaporation patterns on the gyroidal contactor media of FIG. 31E. Lighter blue patterning (alternatively identified by lighter grey shading) indicates areas where the liquid has evaporated.

Referring to FIG. 32, a photograph showing a closer view of the contactor media in FIG. 31E. The photograph shows the evaporation patterns on the contactor media 3200. Darker blue patterning 3210 (alternatively identified by darker grey shading) indicates areas of liquid retention and lighter blue patterning 3220 (alternatively identified by lighter grey shading) indicates areas where the liquid has evaporated, leaving behind traces of the blue dye.

Example 2

Figure 33:
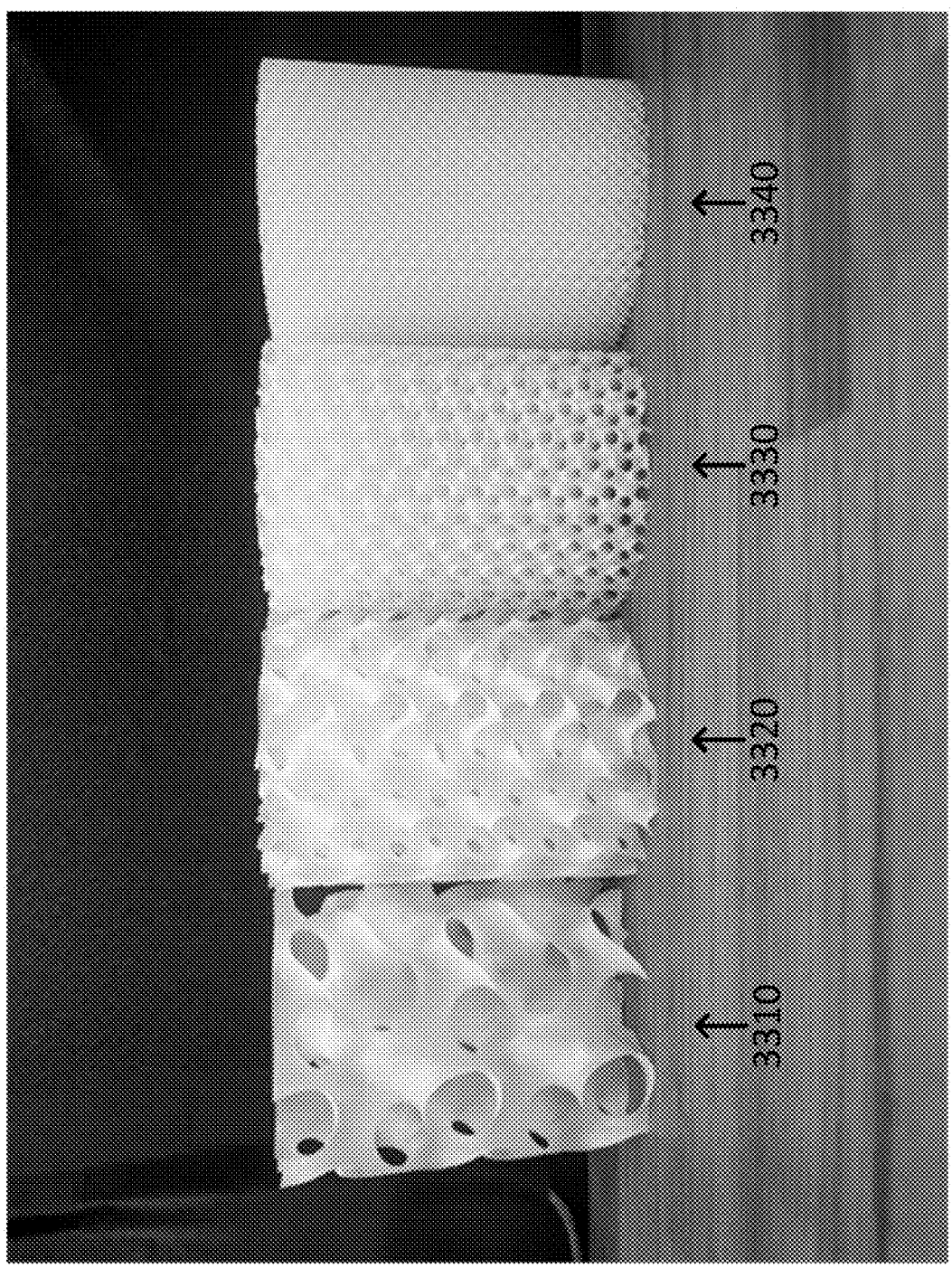
FIG. 33 is a photograph of four different gyroidal contact media that each has a continuous surface that follows a contour of a zero-thickness surface having a Gaussian curvature of decreasing values (left to right; negative values becoming larger in magnitude) and follows a contour of a zero-thickness surface having a principal curvature of decreasing values.

FIG. 33 is a photograph of different gyroidal contactor media 3310, 3320, 3330, and 3340 made of an acrylate/methacrylate based photopolymer that each have a continuous surface that follows a contour of a zero-thickness surface having a Gaussian curvature of decreasing values (left to right; negative values becoming larger in magnitude) and follow a contour of a zero-thickness surface having a principal curvature of decreasing values. Each of the gyroidal contact media 3310, 3320, 3330, and 3340 at least 50% of its surface area follow at least one of: (a) a contour of a first zero-thickness surface having a Gaussian curvature ("$G_c$") of $-400$ mm$^{-2} \leq G_c < -0.01$ mm$^{-2}$; and (b) a contour of a second zero-thickness surface having at least one principal curvature ($k_t$) of $-20$ mm$^{-1} \leq k_t < -0.1$ mm$^{-1}$.

Each of the gyroidal contactor media 3310, 3320, 3330, and 3340 were used as gas-liquid contactor media for carbon dioxide capture. With an air flow frontal velocity of 1.5 m/s through the contactor media, and a 1 M KOH liquid flow of 0.5 L·s$^{-1}$·m$^{-2}$, the observed total liquid hold-up was in the range of 30 kg/m$^3$ to 120 kg/m$^3$ and the static liquid hold-up at a time of 1 hour ranged from 10 kg/m$^3$ to 120 kg/m$^3$ for all of the contactor media.

Example 3

Figure 34:
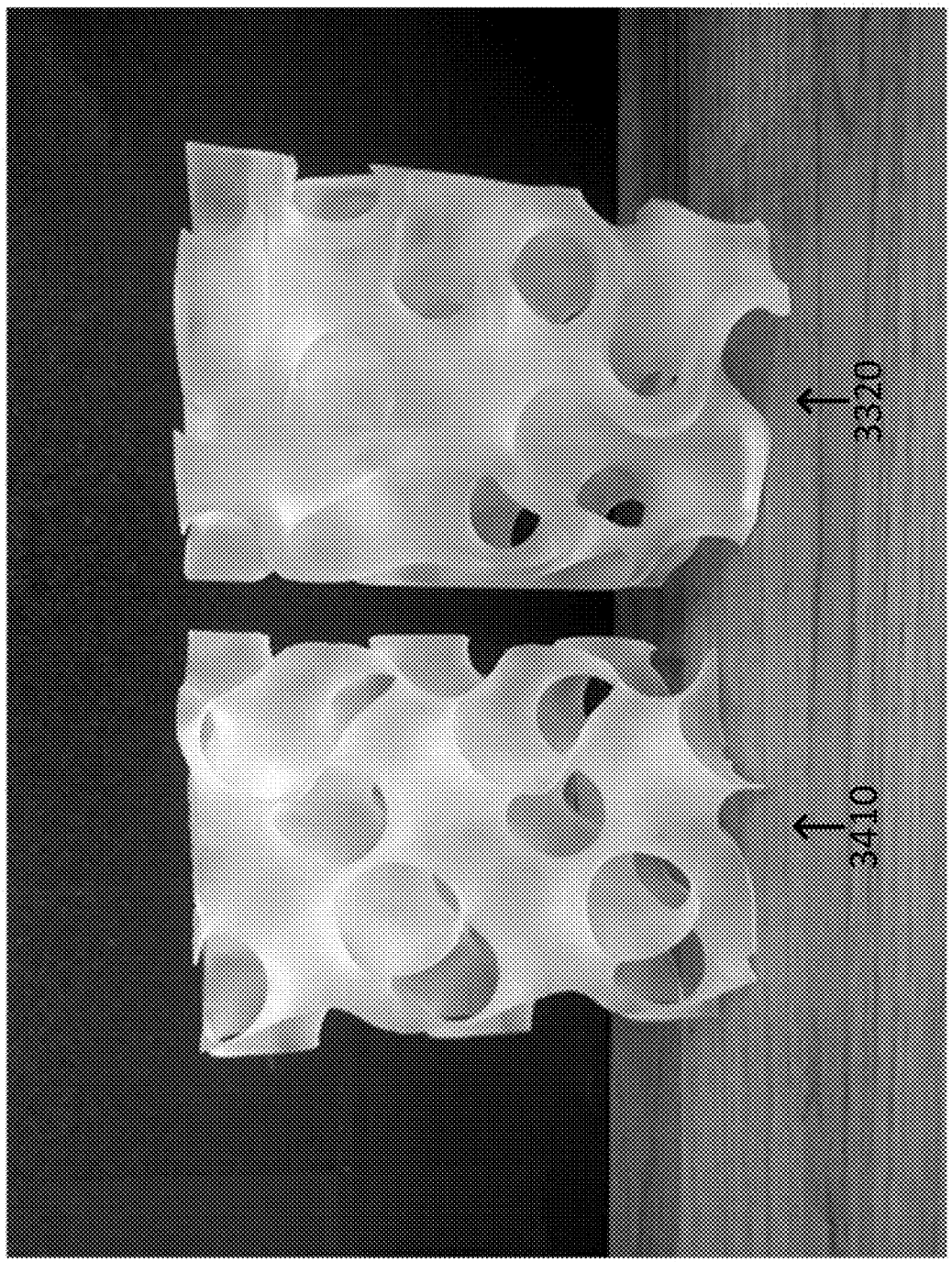
FIG. 34 is a photograph of two different gyroidal contact media that each has a continuous surface with a different thickness.

FIG. 34 is a photograph of two different gyroidal contact media that each has a continuous surface with a different thickness, where both contact media follow the same contour of a zero-thickness surface having a Gaussian curvature ("$G_c$") of $-400$ mm$^{-2} \leq G_c < -0.01$ mm$^{-2}$, but having two different thicknesses (300 µm for 3410 and 6 mm for 3320).

Example 4

Figure 35:
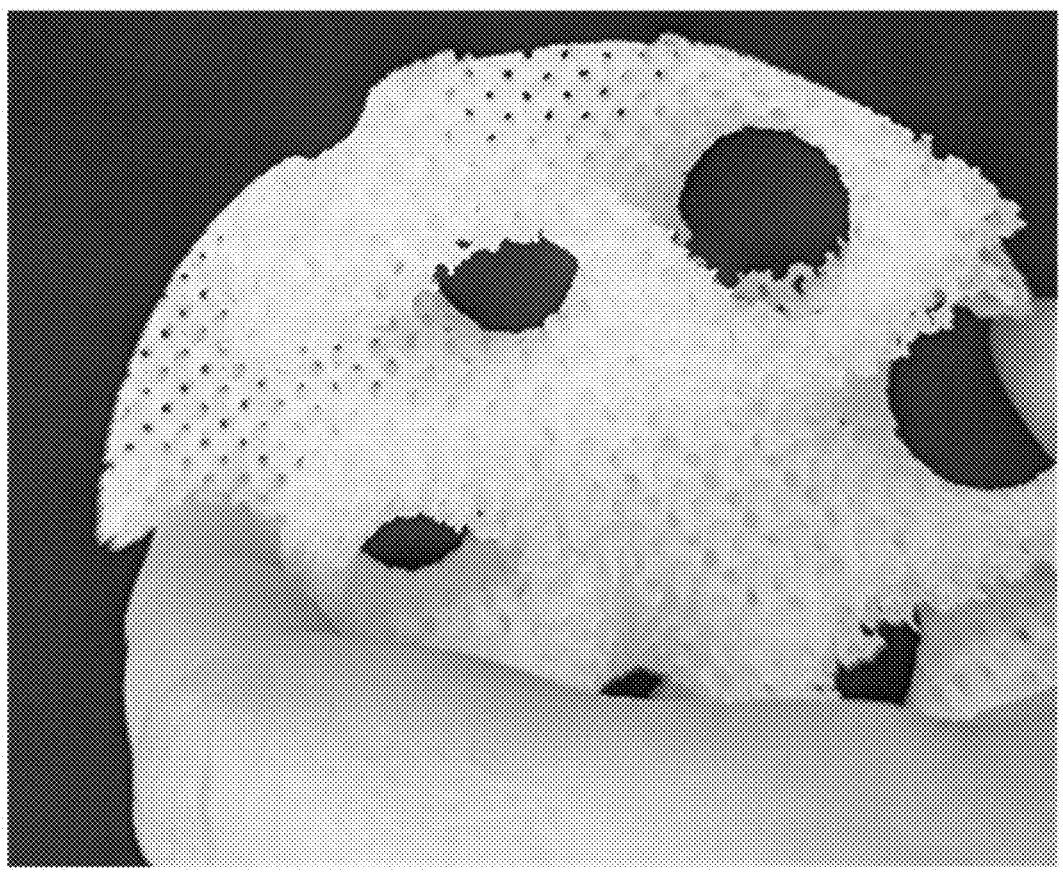
FIG. 35 shows a photograph of a gyroidal contact media that has a continuous surface that follows the contour of a zero-thickness surface having a Gaussian curvature ("$G_c$") of $-400\text{mm}^{-2} \leq G_c < -0.01\text{mm}^{-2}$, where the geometry is a gyroid of gyroids.

FIG. 35 is a photograph of a gyroidal contact media that has a continuous surface that follows the contour of a zero-thickness surface having a Gaussian curvature ("$G_c$") of $-400$ mm$^{-2} \leq G_c < -0.01$ mm$^{-2}$, where the geometry is a gyroid of gyroids. The microgeometry (about 3 mm unit cell size) is a sheet gyroid (consistent with the unit cell in FIG. 20), while the larger macro geometry (about 50 mm unit cell size) is either consistent with the skeletal gyroid unit cell in FIG. 18 or the sheet gyroid unit cell in FIG. 20. The gyroid of gyroid contact media has a microgeometry with a continuous surface that has at least 50% of its surface area follow a contour of a first zero-thickness surface having a Gaussian curvature ("$G_c$") of $-400$ mm$^{-2} \leq G_c < -0.01$ mm$^{-2}$, resulting in static liquid hold-up via capillary action. The macrogeometry may be independently defined (here as gyroids, but also may be, e.g., I-beams, tubes, rectangular prisms) so as to provide a predetermined pressure-drop across the system when gas is flowed through the contactor media. In this way, the boundary layer mass transport (e.g., >2 mm length scale) is balanced with the macroscale mass transport (e.g., transport of air over several meters of contactor packing media).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation, or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A contactor media comprising:
continuous surface segments, wherein a first continuous surface segment has at least 50% of its surface area follow at least one of: (a) a contour of a first zero-thickness surface having a Gaussian curvature ("$G_c$") of $-400$ mm$^{-2} \leq G_c < -0.01$ mm$^{-2}$; and (b) a contour of a second zero-thickness surface having at least one principal curvature ($k_i$) of $-20$ mm$^{-1} \leq k_i < -0.1$ mm$^{-1}$; and
wherein the first continuous surface segment provides at least: (a) a total liquid hold-up of between about 1 kg/m$^3$ to about 800 kg/m$^3$ or (b) a static liquid hold-up of about 0.1 kg/m$^3$ to about 800 kg/m$^3$.

2. The contactor media of claim 1, wherein the first continuous surface segment has a geometry that is different from that of a second continuous surface segment.

3. The contactor media of claim 1, wherein at least 80% of the first continuous surface segment follows the contour of the first zero-thickness surface having the Gaussian curvature of $-100$ mm$^{-2} \leq G_c < 0$ mm$^{-2}$.

4. The contactor media of claim 1, wherein the first continuous surface segment has a thickness of about 1 μm to about 100 mm.

5. The contactor media of claim 4, further comprising a second continuous surface segment joined to the first continuous surface segment, wherein the second continuous surface segment has a thickness different from that of the first continuous surface segment.

6. The contactor media of claim 1, further comprising a second continuous surface segment that has at least 50% of its surface area follow at least one of: (a) a contour of a third zero-thickness surface having a Gaussian curvature ("$G_c$") of $-400$ mm$^{-2} \leq G_c < -0.01$ mm$^{-2}$; and (b) a contour of a fourth zero-thickness surface having at least one principal curvature ($k_i$) of $-20$ mm$^{-1} \leq k_i < -0.1$ mm$^{-1}$.

7. The contactor media of claim 1, wherein at least some of the continuous surface segments comprise a periodic surface geometry.

8. The contactor media of claim 7, wherein the periodic surface geometry is a triply periodic surface geometry.

9. The contactor media of claim 1, wherein the first continuous surface segment comprises a sheet gyroid.

10. The contactor media of claim 1, wherein the first continuous surface segment forms a tube.

11. The contactor media of claim 10, comprising a plurality of the tubes arranged in a hexagonal packing structure.

12. The contactor media of claim 1, wherein the first continuous surface segment forms a rectangular prism.

13. The contactor media of claim 10, comprising a plurality of the rectangular prisms arranged parallel to one another.

14. The contactor media of claim 1, wherein each continuous surface segment comprises a unit cell; and the contactor media comprises a plurality of the unit cells arranged in a repeating pattern.

15. The contactor media of claim 1, wherein the first continuous surface segment comprises
a first repeating unit cell, a second continuous surface segment comprises a second repeating unit cell, and a third continuous surface segment comprises a third repeating unit cell; and
wherein the first continuous surface segment and the third continuous surface segment are disposed directly on opposite sides of the second continuous surface segment, forming an I-beam shape.

16. The contactor media of claim 1, further comprising a CO$_2$ capture liquid.

17. The contactor media of claim 16, wherein the CO$_2$ capture liquid comprises MEA (monoethanolamine), DEA (diethanolamine), TEA (triethanolamine), MDEA(methyl diethanolamine), piperazine, glycine, KVO$_3$ (potassium metavanadate), KOH (potassium hydroxide), NaOH (sodium hydroxide), LiOH (lithium hydroxide), Ca(OH)$_2$ (calcium hydroxide), an amino acid, or a combination of any two or more thereof.

18. The contactor media of claim 17, wherein the contactor media provides CO$_2$ capture liquid flow in a first direction and gas flow in a second direction, the second direction being cross-flow, counter-flow, or concurrent flow to the first direction.

19. The contactor media of claim 1, wherein the first continuous surface segment comprises a surface with surface features of about 1 μm to about 500 μm.

20. A contactor media, comprising a gyroidal continuous surface segment forming a channel with a bilobed-shaped cross-section;

wherein the gyroidal continuous surface segment has at least 50% of its surface area follow at least one of: (a) a contour of a first zero-thickness surface having a Gaussian curvature ("$G_c$") of $-400\ mm^{-2} \leq G_c < -0.01\ mm^{-2}$; and (b) a contour of a second zero-thickness surface having at least one principal curvature ($k_i$) of $-20\ mm^{-1} \leq k_i < -0.1\ mm^{-1}$; and wherein the gyroidal continuous surface segment provides at least: (a) a total liquid hold-up of between about 1 kg/m³ to about 800 kg/m³ or (b) a static liquid hold-up of about 0.1 kg/m³ to about 800 kg/m³.

* * * * *